US011514133B2

(12) United States Patent
Sharp et al.

(10) Patent No.: US 11,514,133 B2
(45) Date of Patent: Nov. 29, 2022

(54) MANAGING NON-DESTRUCTIVE EVALUATION DATA

(71) Applicant: Etegent Technologies Ltd., Cincinnati, OH (US)

(72) Inventors: Thomas D. Sharp, Terrace Park, OH (US); Richard A. Roth, II, Goshen, OH (US); Uriah M. Liggett, Independence, KY (US); Joseph M. Kesler, Cincinnati, OH (US)

(73) Assignee: Etegent Technologies Ltd., Cincinnati, OH (US)

( * ) Notice: Subject to any disclaimer, the term of this patent is extended or adjusted under 35 U.S.C. 154(b) by 0 days.

(21) Appl. No.: 16/875,534

(22) Filed: May 15, 2020

(65) Prior Publication Data

US 2020/0387562 A1    Dec. 10, 2020

Related U.S. Application Data

(63) Continuation of application No. 15/799,583, filed on Oct. 31, 2017, now Pat. No. 10,657,197, which is a
(Continued)

(51) Int. Cl.
*G06F 17/10* (2006.01)
*G06Q 10/04* (2012.01)
*G06Q 10/06* (2012.01)

(52) U.S. Cl.
CPC ............. *G06F 17/10* (2013.01); *G06Q 10/04* (2013.01); *G06Q 10/06* (2013.01)

(58) Field of Classification Search
CPC ......... G06F 17/10; G06Q 10/04; G06Q 10/06
See application file for complete search history.

(56) References Cited

U.S. PATENT DOCUMENTS 4,141,347 A    2/1979    Green et al.
4,649,380 A    3/1987    Penna
(Continued)

OTHER PUBLICATIONS

International Searching Authority, International Search Report and Written Opinion of the International Searching Authoirty; or the Declaration, dated Mar. 10, 2010, 20 pgs.
(Continued)

*Primary Examiner* — Tung S Lau
(74) *Attorney, Agent, or Firm* — Wood Herron & Evans LLP

(57) ABSTRACT

Methods manage non-destructive evaluation ("NDE") data. NDE data for an asset is received and at least one alignment algorithm to align the NDE data to a simulated model associated therewith is determined. The NDE data is automatically aligned to the simulated model, a display representation that visually represents the aligned NDE data on the simulated model is generated, and information about the aligned NDE data is exported. Additionally, second NDE data associated with the at least a portion of the asset may also be received, at least one alignment algorithm to align the data determined, and the second NDE data aligned. Respective indications associated with the first and second NDE data may be determined and visually represented on the simulated model. Moreover, a shot descriptor file may be analyzed to determine whether additional NDE data is required to complete an alignment of NDE data.

16 Claims, 26 Drawing Sheets

Related U.S. Application Data continuation of application No. 13/926,517, filed on Jun. 25, 2013, now Pat. No. 9,804,997, which is a continuation of application No. 12/617,315, filed on Nov. 12, 2009, now Pat. No. 8,521,480, which is a continuation-in-part of application No. 12/403,274, filed on Mar. 12, 2009, now Pat. No. 8,108,168, said application No. 13/926,517 is a continuation of application No. 12/557,136, filed on Sep. 10, 2009, now Pat. No. 8,473,236, which is a continuation of application No. 12/403,274, filed on Mar. 12, 2009, now Pat. No. 8,108,168, said application No. 13/926,517 is a continuation of application No. 12/403,274, filed on Mar. 12, 2009, now Pat. No. 8,108,168.

(56) References Cited

U.S. PATENT DOCUMENTS

| | | |
|---|---|---|
| 4,872,130 A | 10/1989 | Pagano |
| 4,876,728 A | 10/1989 | Roth |
| 5,027,110 A | 6/1991 | Chang et al. |
| 5,028,100 A | 7/1991 | Valleau et al. |
| 5,042,305 A | 8/1991 | Takishita |
| 5,088,045 A | 2/1992 | Shimanaka et al. |
| 5,146,556 A | 9/1992 | Hullot et al. |
| 5,168,530 A | 12/1992 | Peregrim et al. |
| 5,293,326 A | 3/1994 | Arima et al. |
| 5,371,462 A | 12/1994 | Hedengren et al. |
| 5,459,410 A | 10/1995 | Henley |
| 5,475,613 A | 12/1995 | Itoga et al. |
| 5,541,846 A | 7/1996 | Secrest |
| 5,550,376 A | 8/1996 | Gupta et al. |
| 5,568,263 A | 10/1996 | Hanna |
| 5,608,814 A | 3/1997 | Gilmore et al. |
| 5,619,429 A | 4/1997 | Aloni et al. |
| 5,640,199 A | 6/1997 | Garakani et al. |
| 5,655,084 A | 8/1997 | Pinsky et al. |
| 5,706,213 A | 1/1998 | Takakura et al. |
| 5,734,742 A | 3/1998 | Asaeda et al. |
| 5,848,115 A | 12/1998 | Little et al. |
| 6,064,759 A | 5/2000 | Buckley et al. |
| 6,259,960 B1 | 7/2001 | Inokuchi |
| 6,314,379 B1 | 11/2001 | Hu et al. |
| 6,378,387 B1 | 4/2002 | Froom |
| 6,508,403 B2 | 1/2003 | Arsenault et al. |
| 6,546,137 B1 | 4/2003 | Lai et al. |
| 6,549,820 B1* | 4/2003 | Barrett ............... G01N 29/0609 700/169 |
| 6,567,729 B2* | 5/2003 | Betters ................ G01C 23/005 701/33.9 |
| 6,714,679 B1 | 3/2004 | Scola et al. |
| 6,732,027 B2* | 5/2004 | Betters .................. G06Q 10/06 701/33.9 |
| 6,760,639 B2 | 7/2004 | Kallela et al. |
| 6,820,023 B1 | 11/2004 | Klassen et al. |
| 6,848,081 B1 | 1/2005 | Yoda et al. |
| 6,882,745 B2 | 4/2005 | Brankner et al. |
| 6,985,238 B2 | 1/2006 | Isaacs et al. |
| 7,024,032 B2 | 4/2006 | Kidd et al. |
| 7,027,642 B2 | 4/2006 | Rubbert et al. |
| 7,069,263 B1 | 6/2006 | Yee et al. |
| 7,116,825 B2 | 10/2006 | Lee et al. |
| 7,149,342 B2 | 12/2006 | Biazik et al. |
| 7,162,373 B1 | 1/2007 | Kadioglu et al. |
| 7,327,869 B2 | 2/2008 | Boyer |
| 7,359,777 B2* | 4/2008 | Betters .................. G06Q 10/06 244/75.1 |
| 7,409,081 B2 | 8/2008 | Ogi |
| 7,801,353 B2 | 9/2010 | Almogy et al. |
| 7,865,316 B2 | 1/2011 | Turner et al. |
| 8,108,168 B2 | 1/2012 | Sharp et al. |
| 8,473,236 B2 | 6/2013 | Kesler et al. |
| 8,521,480 B2 | 8/2013 | Kesler et al. |
| 9,804,997 B2 | 10/2017 | Sharp et al. |
| 9,864,366 B2* | 1/2018 | Kesler .................. G06Q 10/06 |
| 10,520,452 B2* | 12/2019 | Van Dael ............. G01N 23/083 |
| 11,132,479 B1* | 9/2021 | Tyson, II ............ G05B 19/4068 |
| 2002/0088282 A1 | 7/2002 | Zayicek et al. |
| 2002/0118892 A1 | 8/2002 | Nguyen et al. |
| 2004/0073411 A1 | 4/2004 | Alston et al. |
| 2004/0117133 A1 | 6/2004 | Burkhardt et al. |
| 2004/0121496 A1 | 6/2004 | Brankner et al. |
| 2004/0122790 A1* | 6/2004 | Walker ................... G16H 30/40 |
| 2005/0220335 A1 | 10/2005 | Budd |
| 2007/0003117 A1 | 1/2007 | Wheeler et al. |
| 2007/0078618 A1* | 4/2007 | Wilcox ...................... B64F 5/60 702/113 |
| 2007/0112539 A1 | 5/2007 | Kirchner |
| 2007/0176312 A1* | 8/2007 | Clark ..................... B29C 64/153 264/40.1 |
| 2007/0280527 A1 | 12/2007 | Almogy et al. |
| 2008/0263469 A1 | 10/2008 | Nasle et al. |
| 2008/0306709 A1 | 12/2008 | Fisker et al. |
| 2009/0048789 A1 | 2/2009 | Yu et al. |
| 2009/0287427 A1 | 11/2009 | Dubois et al. |
| 2010/0097662 A1 | 4/2010 | Churilla et al. |
| 2010/0235111 A1* | 9/2010 | Sharp ...................... G06F 17/10 702/35 |
| 2011/0029114 A1* | 2/2011 | Rose ....................... G06F 30/00 700/97 |
| 2011/0106734 A1 | 5/2011 | Boult et al. |
| 2011/0125477 A1 | 5/2011 | Lightner et al. |
| 2014/0277662 A1 | 9/2014 | Kesler et al. |
| 2016/0239584 A1* | 8/2016 | Steele, Jr. ............... G06T 11/60 |
| 2020/0034498 A1* | 1/2020 | Avdovic .................. G06F 30/00 |
| 2021/0270755 A1* | 9/2021 | De Beenhouwer .... G01N 23/04 |

OTHER PUBLICATIONS

Roth, D.J., Tokars, R.P., Martin, R.E., Rauser, R.W., Aldrin, J.C., Ultrasonic Phased Array Inspection Simulations of Welded Components at NASA, Mar. 3, 2009, retrieved from the Internet Feb. 22, 2010, 19 pgs.

Buckley, J., Servent, R., "Improvements in Ultrasonic Inspection of Resistance Spot Welds," The British Institute of Non-Destructive Testing, Feb. 2009, retrieved from the Internet Feb. 22, 2010, 11 pgs.

Deng, W., Matuszewski, B.J., Shark, L-K., Smith, J.P. and Cavaccini, G., Multi-Modality NDT Image Fusion and It's Mapping on Curved 3D CAD Surface, Wrold Conference NDT, 2004. (8 pages).

Matuszewski, B.J., Shark, L-K, Smith, J.P and Varley, M.R., Automatic Fusion of Multiple Non-Destructive Testing Images and CAD Models, Image Processing and it's Applications, Conference Publication No. 465, 1999. (5 pages).

Deng, W., Shark, L-K, Matuszewski, B.J., Smith J.P. and Cavaccini, G., CAD Model-Based Inspection and Visualisation for 3D Non-Destructive Testing of Complex Aerostructures, Insight vol. 46, Mar. 2004, pp. 157-161. (5 pages).

Noble, A., Gupta, R., Mundy, J., Schmitz, A., Hartley, R. and Hoffman, W., CAD-Based Inspection Using X-Ray Stereo, IEEE International Conference on Robotics and Automation 0-7803-1965-6195, 1995. (6 pages).

Power INSPECT, dowloaded from www.delcam. com on Sep. 2008. (2 pages).

Kesler, Joseph M., Automated Alignment of Aircraft Wing Radiography Images Using a Modified Rotation, Scale, and Translation Invariant Phase Correlection Algorithm Employing Local Entropy for Peak Detection, Thesis submitted to Department of Electrical and Computer Engineering, Unversity of Cincinnati, College of Engineering, Division of Graduate Studies, Aug. 12, 2008. (79 pages).

(56) References Cited

OTHER PUBLICATIONS

F. Lu, Globally consistent range scan alignment for environment mapping, Apr. 17, 1997, p. 1-31.
http:/www.merriam-webster.com/dictionary/asset, p. 1, Dec. 7, 2012.
Supplementary European Search Report, European Search Report and Written Opinion of the European Patent Office, dated Dec. 13, 2012.

* cited by examiner

MANAGING NON-DESTRUCTIVE EVALUATION DATA

CROSS-REFERENCE TO RELATED APPLICATION

This application is a continuation of U.S. application Ser. No. 15/799,583, filed on Oct. 31, 2017 (pending) which is a continuation of U.S. application Ser. No. 13/926,517, filed on Jun. 25, 2013 (now U.S. Pat. No. 9,804,997) which is a continuation of U.S. application Ser. No. 12/617,315, filed on Nov. 12, 2009 (now U.S. Pat. No. 8,521,480) which is a continuation-in-part of U.S. application Ser. No. 12/403,274, filed Mar. 12, 2009 (now U.S. Pat. No. 8,108,168), said U.S. application Ser. No. 13/926,517 is a continuation of U.S. application Ser. No. 12/557,136, filed Sep. 10, 2009 (now U.S. Pat. No. 8,473,236) which is a continuation of U.S. application Ser. No. 12/403,274, filed Mar. 12, 2009 (now U.S. Pat. No. 8,108,168), said U.S. application Ser. No. 13/926,517 is a continuation of U.S. application Ser. No. 12/403,274, filed on Mar. 12, 2009 (now U.S. Pat. No. 8,108,168). The disclosures of all of these applications are hereby incorporated by reference herein.

GOVERNMENT RIGHTS

Certain aspects of this invention were made with government support under Grant/Contract No. FA8650-07-C-5210 awarded by the United States Air Force/Air Force Material Command DET 1 Air Force Research Laboratory/PKMM. The U.S. Government may have certain rights in the invention.

FIELD OF THE INVENTION

The present invention relates to computing systems, and more particularly to the management and automatic alignment of non-destructive evaluation ("NDE") data.

BACKGROUND OF THE INVENTION

Non-destructive Evaluation and Inspection ("NDE/I") technologies generally provide ways to nondestructively scan, image, sense or otherwise evaluate characteristics of materials and/or components. In particular, NDE/I technologies may be used to detect minute flaws and defects in those materials and/or component parts. As such, NDE/I technologies have become increasingly used to help assure structural and functional integrity, safety, and cost effective sustainment of various assets, during both initial manufacture and operational service. More specifically, NDE/I technologies have been increasingly used in determining the wear and tear of assets that are pushed to their physical limits, such as military vehicles. As the average age of the various assets increases, particularly beyond the originally contemplated design life, the importance of using NDE/I technologies to detect structural damage before that damage advances to structural failure is paramount.

Non-destructive evaluation ("NDE") data is often gathered from NDE data collection devices and may include x-ray images of at least a portion of an asset, such as the wing of an aircraft. By analyzing a dataset of NDE data, defects or other structural irregularities of the asset at the location associated with that dataset of NDE data can be detected. However, this NDE data is typically difficult to manage and handle. For example, the NDE data is often large in size, associated with merely a portion of the asset, and also must be matched with a particular location on the asset. To determine wear and tear, structural damage and/or other irregularities of an entire component of an asset may require the analysis of tens (if not hundreds) of individual datasets of NDE data. This results in numerous datasets of NDE data for each asset, and thus even more datasets of NDE data for a fleet of assets. As each dataset of NDE data is often inspected, this results in large amounts of data that are difficult to categorize and otherwise analyze in whole. Moreover, the NDE data may be discarded after it has been analyzed, and thus there is often little NDE data for an asset over time. Thus, when a potential problem is indicated, it is often difficult to track that indication on an asset through time, analyze that indication in relation to other indications of the asset, and analyze that indication in relation to indications of a plurality of similar assets.

As the amount of NDE data increases, so do associated costs and needs for users trained to perform inspections. Although NDE data collection devices may produce digital data, the digital data is being generated without systems in place to manage and archive the collected information. Moreover, the analysis of NDE data is often laborious and crude. Some conventional systems receive NDE data and align it to a simulated model of a portion of an asset through the use of manual tools. However, these manual tools require human interaction and generally require a user experienced with that NDE data and/or asset to align and analyze that NDE data. Although some conventional systems have used automatic alignment of the NDE data, these methods often fail as a method of alignment for one dataset of NDE data is typically not useful for another dataset of NDE data. Thus, conventional systems are typically unable to align datasets of NDE data that are in turn associated multiple modalities (e.g., datasets of NDE data captured with various NDE data collection devices). This often has the effect of tying particular method of alignments to particular NDE data collection devices, and thus increases the cost of NDE data capture and analysis.

Consequently, there is a continuing need to manage datasets of NDE data of an asset or fleet of assets over time, as well as a continuing need to support the alignment of multiple modalities of NDE data in an extensible platform that supports NDE data fusion.

SUMMARY OF THE INVENTION

Embodiments of the invention provide for a method, apparatus, and program product to manage non-destructive evaluation ("NDE") data associated with at least a portion of an asset. In particular, embodiments of the invention provide for a method to manage NDE data associated with at least a portion of an asset in a system of the type that includes at least one processing unit and a memory. The method comprises receiving NDE data for at least a portion of an asset, including receiving inspection information associated with the at least a portion of the asset. The method further comprises determining at least one alignment algorithm to align the NDE data to a simulated model of the at least a portion of the asset based upon at least one of the NDE data and the inspection information. The method further comprises automatically aligning the NDE data to the simulated model with the at least one alignment algorithm and generating a display representation that visually represents the aligned NDE data on the simulated model, and exporting information associated with the aligned NDE data for analysis.

In additional embodiments, a method of managing NDE data comprises receiving first NDE data for at least a portion of an asset, including receiving first inspection information associated with the at least a portion of the asset, as well as receiving second NDE data for the at least a portion of the asset, including receiving second inspection information associated with the at least a portion of the asset. The method further comprises determining a first alignment algorithm to align the first NDE data to a simulated model of the at least a portion of the asset based upon at least one of the first NDE data and the first inspection information and determining a second alignment algorithm to align the second NDE data to the simulated model of the at least a portion of the asset based upon at least one of the second NDE data and the second inspection information. The method additionally comprises automatically aligning the first NDE data and second NDE data to the simulated model with the respective first alignment algorithm and second alignment algorithm, determining a first indication of a first potential problem associated with the first NDE data based upon the first inspection information, and determining a second indication of a second potential problem associated with the second NDE data based upon the second inspection information. The method further comprises generating a display representation that visually represents the first indication and the second indication on the simulated model.

In still further embodiments, a method of managing NDE data comprises receiving first NDE data for at least a portion of a first asset, including receiving first inspection information associated with the at least a portion of the first asset as well as receiving second NDE data for the at least a portion of a second asset, including receiving second inspection information associated with the at least a portion of the second asset. The method further comprises retrieving a simulated model associated with the at least a portion of the first asset and the at least a portion of the second asset, determining a first alignment algorithm to align the first NDE data to the simulated model based upon at least one of the first NDE data and the first inspection information, and determining a second alignment algorithm to align the second NDE data to the simulated model based upon at least one of the second NDE data and the second inspection information. The method additionally comprises automatically aligning the first NDE data and second NDE data to the simulated model with the respective first alignment algorithm and second alignment algorithm, determining a first indication of a first potential problem associated with the first NDE data based upon the first inspection information, and determining a second indication of a second potential problem associated with the second NDE data based upon the second inspection information. The method further comprises generating a display representation that visually represents the first indication and the second indication on the simulated model In additional embodiments, a method of managing NDE data comprises receiving NDE data for at least a portion of an asset, including receiving inspection information associated with the at least a portion of the asset, and selecting a shot descriptor data structure from among a plurality of shot descriptor data structures based upon at least one of the NDE data and the inspection information. The method further comprises determining whether additional NDE data is required to complete an alignment of the NDE data to a simulated model of the at least a portion of the asset based upon the shot descriptor data structure and providing a message that additional NDE data is required to complete the alignment of the NDE data to the simulated model in response to determining additional NDE data is required to complete the alignment of the NDE data to the simulated model.

In another embodiment, a method of managing NDE data comprises retrieving NDE data for at least a portion of an asset, the NDE data having previously been aligned to a simulated model of the at least a portion of the asset, and exporting information associated with the retrieved NDE data for analysis.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Embodiments of the invention provide for a method, apparatus, and program product to manage non-destructive evaluation ("NDE") data associated with at least a portion of an asset. In particular, embodiments of the invention provide for aligning NDE data with a simulated model associated with the at least a portion of the asset for inspection thereof. In some embodiments, the NDE data is associated with inspection information. The inspection information may include at least one indication of a potential problem and a location thereof on the NDE data. In some embodiments, the at least one indication is aligned to the simulated model and viewed. In additional embodiments, a plurality of datasets of NDE data (e.g., a plurality of individual instances of NDE data), at least some of which is associated with inspection information, is aligned to the simulated model. As such, indications in turn associated with the inspection information of the plurality of datasets may be viewed for trends of indications, including trends of indications of one or more assets over time.

Hardware and Software Environment

Figure 1:
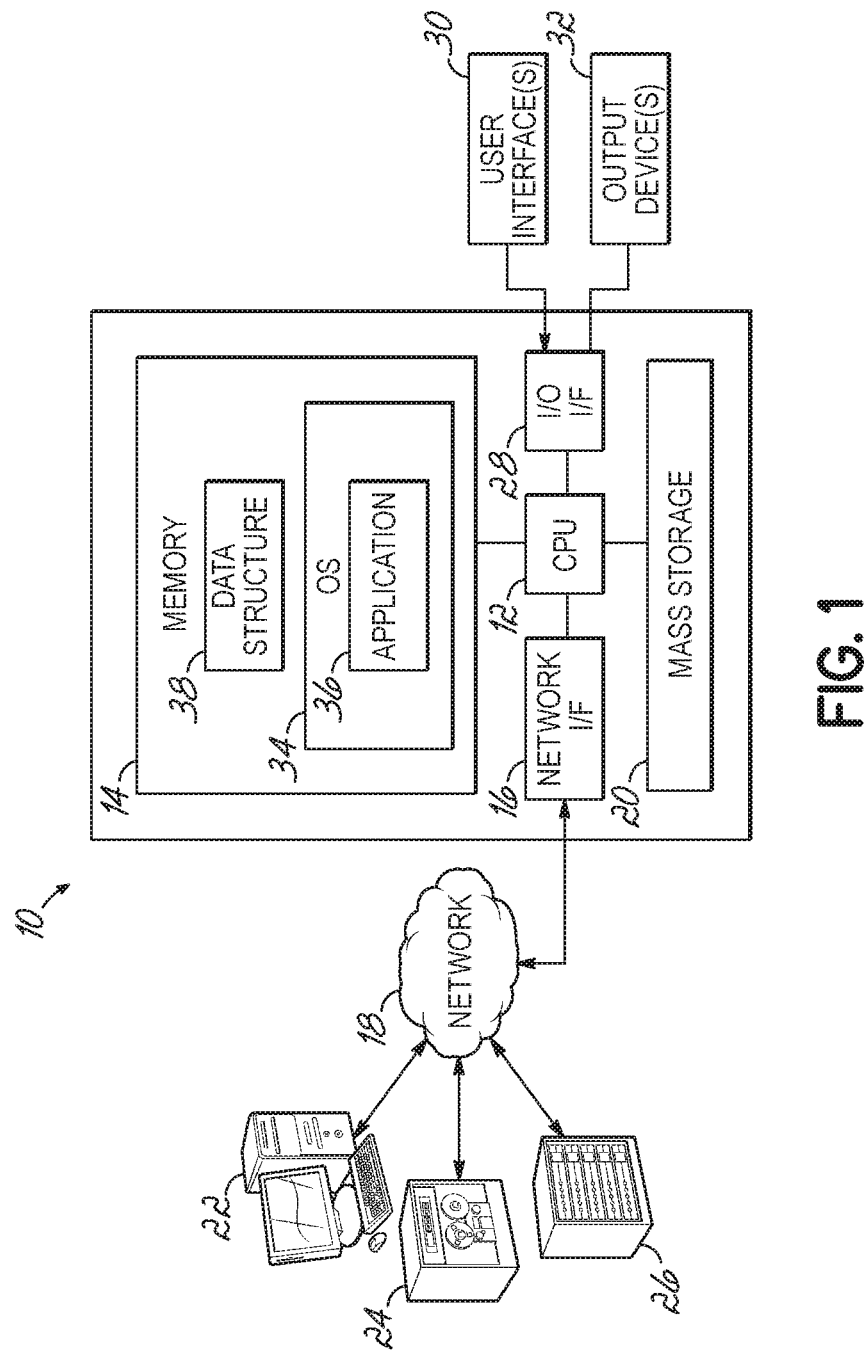
FIG. 1 is a diagrammatic illustration of a computer configured to accomplish the management of non-destructive evaluation ("NDE") data consistent with embodiments of the invention.

Turning to the drawings, wherein like numbers denote like parts throughout the several views, FIG. 1 illustrates a hardware and software environment for an apparatus 10 for managing non-destructive evaluation data consistent with embodiments of the invention. Apparatus 10, for purposes of this invention, may represent any type of computer, computing system, server, disk array, or programmable device such as a multi-user computer, single-user computer, handheld device, networked device, mobile phone, gaming system, etc. Apparatus 10 may be implemented using one or more networked computers, e.g., in a cluster or other distributed computing system. Apparatus 10 will be referred to as "computer" for brevity sake, although it should be appreciated that the term "apparatus" may also include other suitable programmable electronic devices consistent with the invention.

Computer 10 typically includes at least one central processing unit ("CPU") 12 coupled to a memory 14. Each CPU 12 may be one or more microprocessors, micro-controllers, field programmable gate arrays, or ASICs, while memory 14 may include random access memory (RAM), dynamic random access memory (DRAM), static random access memory (SRAM), flash memory, and/or another digital storage medium. As such, memory 14 may be considered to include memory storage physically located elsewhere in computer 10, e.g., any cache memory in the at least one CPU 12, as well as any storage capacity used as a virtual memory, e.g., as stored on a mass storage device, a computer, or another controller coupled to computer 10 through a network interface 16 (illustrated as, and hereinafter, "network I/F" 16) by way of a network 18. The computer may include a mass storage device 20, which may also be a digital storage medium, and in specific embodiments includes at least one hard disk drive. Additionally, mass storage device 20 may be located externally to computer 10, such as in a separate enclosure or in one or more networked computers 22, one or more networked storage devices 24 (including, for example, a tape drive), and/or one or more other networked devices 26 (including, for example, a server). The computer may communicate with networked computers 22, networked storage devices 24, and/or networked devices 26 through network 18.

The computer 10 may also include peripheral devices connected to the computer through an input/output device interface 28 (illustrated as, and hereinafter, "I/O I/F" 28). In particular, the computer 10 may receive data from a user through at least one user interface 30 (including, for example, a keyboard, mouse, and/or other user interface) and/or output data to a user through at least one output device 32 (including, for example, a display, speakers, and/or another output device). Moreover, in some embodiments, the I/O I/F 28 communicates with a device that includes a user interface 30 and at least one output device 32 in combination, such as a touchscreen (not shown).

Computer 10 may be under the control of an operating system 34 and execute or otherwise rely upon various computer software applications, components, programs, files, objects, modules, etc. (illustrated as "application" 36) for managing non-destructive evaluation ("NDE") data consistent with embodiments of the invention as described herein. Moreover, computer 10 may include at least one data structure 38 to store various data consistent with embodiments of the invention. The data structure 38 in turn may include at least one database, list, array, table, data entry, file, and/or another data structure for use by the application 36, computer 10, and/or components thereof. It will be appreciated that various applications, components, programs, objects, modules, etc. may also execute on one or more processors in another networked device coupled to computer 10 via the network 18, e.g., in a distributed or client-server computing environment.

Figure 2:
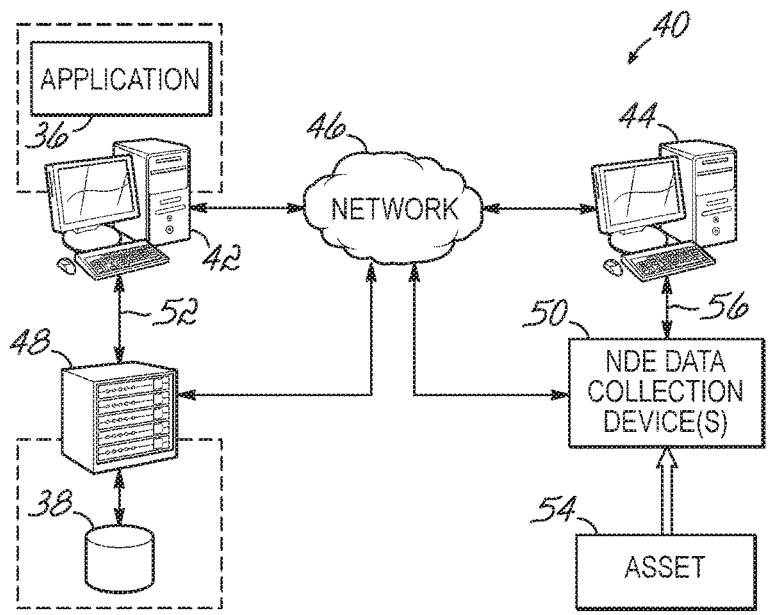
FIG. 2 is a diagrammatic illustration of an alternative embodiment of a computer configured to accomplish the management of NDE data consistent with alternative embodiments of the invention.

FIG. 2 is an alternative embodiment of a computing system 40 for managing non-destructive evaluation and inspection data consistent with alternative embodiments of the invention. As illustrated, the computing system 40 may include a first computer 42, which may be substantially similar to computer 10 illustrated in FIG. 1 and operate as an application, web, and/or NDE data server for the computing system 40. In specific embodiments, the first computer 42 may be accessed by a second computer 44 through a network 46. As such, the first computer 42 may provide access to the application 36 and/or at least one data structure 38 for that second computer 44 to access, view, add, modify, and/or delete NDE data. In some embodiments, the network 46 is a wide area network (such as, for example, the internet) such that the first computer 42 communicates with the second computer 44 through a wide area network using a secure TCP/IP connection (e.g., a secure internet connection), while in alternative embodiments network 46 is a local area network.

In addition to second computer 44, the computing system may include at least one storage server 48 and at least one NDE data collection device 50 which may in turn be in communication with the network 46. The storage server 48 may be configured with the at least one data structure 38 consistent with embodiments of the invention. In some embodiments, and as illustrated in FIG. 2, the at least one data structure 38 is a database. The storage server 48 may be accessed by the first computer 42 in response to a request from second computer 44. The storage server 48 may be in communication with the first computer 42 through the network 46 or through a direct communication link as at 52. In some embodiments, the at least one storage server 48 is configured to store NDE data and inspection information associated therewith in the at least one data structure 38. The at least one storage server 48 may be configured as a picture archiving and communication system ("PACS") and store the NDE data as a digital image in the digital imaging and communication in non-destructive evaluation ("DI-CONDE") standard as is well known in the art.

NDE data from at least a portion of an asset 54 may be captured by the at least one NDE data collection device 50 and provided to the first computer 42, the second computer as at 56, and/or the storage server 48. The NDE data may be in various modalities, including a one-dimensional representation (e.g., a waveform), a two-dimensional representation (e.g., an image), a three-dimensional representation (e.g., a volumetric image), temporal data, text, an audio recording, a video recording, a binary representation (e.g., for example, a logic high signal for a passing condition or a logic low signal for a failing condition), or combinations thereof. Similarly, the simulated model may be in various modalities, including a one-dimensional representation (e.g., a waveform), a two-dimensional representation (e.g., an image), a three-dimensional representation (e.g., a volumetric image), temporal data, or combinations thereof. In specific embodiments, the simulated model is a second dataset of NDE data.

The NDE data collection device 50 may include one or more cameras (e.g., to capture still images for visualization, videos for visualization, and/or for sherography, etc.), thermographic cameras (e.g., to capture a thermographic image), borescopes, fiberscopes, x-ray machines (e.g., to capture still images, to use with computed radiography, to use with direct and/or digital radiography, etc.), ultrasound machines, CT scanners, MRI machines, eddy current detectors, liquid penetrant inspection systems, and/or magnetic-particle inspection systems. Thus, the NDE data may be captured as a specific type of NDE data associated with a respective type of NDE data collection device 50. The asset 54 may be a machine, component, or other physical object, and in some embodiments may be an aircraft (e.g., a drone, a balloon, an airplane, a helicopter, etc.), a land vehicle (e.g., a trailer, a car, a truck, a tractor, a tank, a snowmobile, etc.), a sea vehicle (e.g., a skiff, a personal watercraft, a boat, a speedboat, a yacht, a cruiser, a destroyer, etc.), a pipeline, an industrial plant (e.g., a power plant, a chemical plant, an electrical plant, etc.), a bridge, and/or a component thereof. In specific embodiments, the asset 54 is a military aircraft.

NDE data may be associated with inspection information that associates the NDE data with particular information that may be useful to align the NDE data, indicate potential problems, and/or otherwise provide data about the portion of the asset. In addition to capturing the NDE data, the at least one NDE data collection device 50 may be configured to capture inspection information associated with that captured NDE data. For example, the NDE data collection device 50 may include a user interface (not shown) in which to enter inspection information. In those embodiments, the inspection information may include data associated with a location of the asset 54 from which the NDE data was captured, an identification of the asset 54, a history of the asset 54, a time at which the NDE data was captured, a date at which the NDE data was captured, an identification of an NDE session associated with the NDE data, an annotation associated with the NDE data (e.g., such as an annotation that includes an indication of a potential problem), an identification of an inspector associated with the NDE data, an identification of a series of NDE data in which the NDE data was captured, an identification of the location of the NDE data in the series of NDE data, an orientation associated with the NDE data, a unique identification of the NDE data, an identification of the modality of NDE data collection device 50 used to capture the NDE data, and/or combinations thereof. The inspection information may be determined automatically, captured by the first computer 42, and/or captured by the second computer 44 before, during, or after the capture of the NDE data. For example, NDE data may captured by the at least one NDE data collection device 50 and viewed on the second computer 44. At least a portion of the inspection information for the NDE data may then be entered by a user at the second computer.

A "session" may include an inspection session during which NDE data is captured from an asset 54. A session may include the capture of a plurality of datasets of NDE data, and in particular a sequence to capture those datasets of NDE data. During a session, at least one dataset of NDE data associated with the asset 54 may be captured with at least one NDE data collection device 50, and each dataset of NDE data may be associated with at least a portion of the asset 54 as well as the time at which that NDE data was captured. Thus, NDE data may be associated with a session and, in some embodiments of the invention, NDE data from the same session may be aligned to a simulated model to provide a snapshot of at least a portion of an asset 54 at a particular time. For example, a session may include the capture of a plurality of datasets of NDE data with an x-ray machine from a spar of a wing of a plane. Specifications for the session may indicate that at least seven datasets of NDE data be captured along the length of the spar in an attempt to capture NDE data for the entire length of the spar. Aspects of the invention provide for aligning NDE data associated with the session, and thus aligning NDE data associated with the spar, then generating a display representation of the aligned NDE data to provide a snapshot of the spar at the time of the session. As a further example, aligned NDE data from previous sessions may be compared with the aligned NDE data from example session to compare the spar over time.

Figure 3:
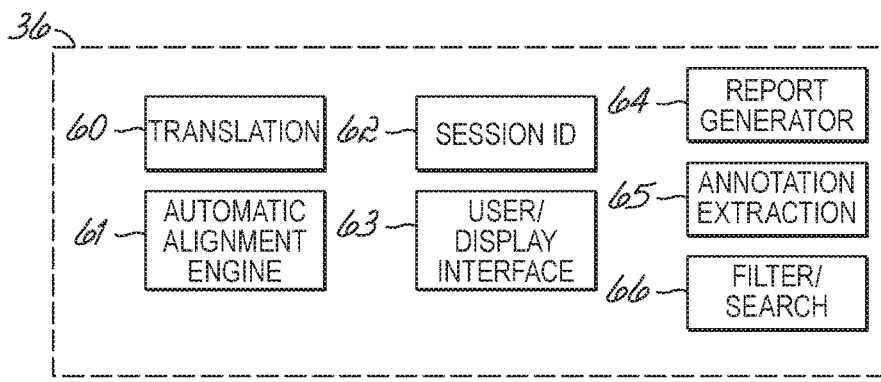
FIG. 3 is a diagrammatic illustration of the primary components of an application configured to manage NDE data in the computer of FIG. 1 or FIG. 2.

FIG. 3 is a diagrammatic illustration of one embodiment of a plurality of components of an application 36 consistent with embodiments of the invention. The application 36 may include various components, modules, or program code to manage NDE data and/or inspection information. In particular, the application 36 may include a translation component 60, an automatic alignment engine 61, a session identification component 62, a user and/or display interface 63, a report generator 64, an annotation extraction component 65, a filter and/or searching component 66, and/or additional components with which to manage NDE data. The translation component 60 may be configured to translate information associated with NDE data and/or inspection information into standardized information. The standardized information, in turn, may be utilized to assist in the alignment of the NDE data. For example, the standardized information may indicate an asset 54 with which the NDE data and/or inspection information is associated, indicate a portion of the asset 54 with which the NDE data and/or inspection information is associated, indicate a location (e.g., for example, an approximate location) of the at least a portion of the asset with which NDE data and/or inspection information is associated, be utilized to help choose a shot descriptor file to associate with the NDE data and/or otherwise be utilized to assist in the alignment of the NDE data and/or indications of the inspection information. The automatic alignment engine 61 may be used to align NDE data to a simulated model, while the session identification component 62 may be used to determine a session associated with the NDE data. The user and/or display interface 63 may be used to provide a display representation for the application 36, the NDE data, the simulated model, and/or the golden NDE data. In particular, the user and/or display interface 63 may be used to provide a display representation for the NDE data, the simulated model, and/or the golden NDE image in response to an automatic alignment and/or for manual alignment. The report generator 64 may be used to generate a report about the NDE data, and thus a report about at least a portion of the asset 54. Moreover, the application 36 may include an annotation extraction component 65 that may be configured to extract and standardize annotations about the NDE data. For example, an operator may input inspection information associated with NDE data indicating that a potential problem was detected, the location of the potential problem, and the type of the potential problem. The annotation extraction component 65 may be configured to analyze the indication and convert annotations to standardized annotations suitable for searching and indexing.

Additionally, the application 36 may include a filtering and/or searching component 66 with which to filter, and/or search through, NDE data, indications thereof, particular assets, serial numbers, inspection times, etc. In particular, the filter and/or searching component may be used to filter or search through a plurality of datasets of NDE data. For example, the data structure 38 may include a plurality of datasets of NDE data from a plurality of portions of a plurality of assets 54 over a plurality of sessions. The plurality of datasets may be filtered to align only NDE data for a particular portion of a particular asset 54 during a particular session to a simulated model. Thus, the portion of the asset 54 at a particular time (e.g., at the time of the particular session) may be viewed. Also for example, the data structure 38 may include a plurality of datasets of NDE data from a plurality of portions of a plurality of assets 54 over a plurality of sessions. In turn, at least a portion of the plurality of datasets of NDE data may be associated with respective inspection information that in turn includes at least one indication of a potential problem. The plurality of datasets may be filtered to align indications for a particular portion of the plurality of assets on the simulated model. Thus, indications of potential problems (e.g., for example, cracks, corrosion, etc.) associated with a particular portion of the plurality of assets 54 (e.g., for example, each asset may be a plane, and the particular portion may be a wing of the planes) over time (e.g., over the course of the plurality of sessions) may be viewed. Thus, a display representation that visually represents potential problems in a specific wing across a fleet of planes may be generated.

Although several components of the application 36 are illustrated in FIG. 3, one having ordinary skill in the art will appreciate that the application 36 may include more or fewer components without departing from the scope of the invention. For example, the application 36 may include an HTML generator (not shown), a shot descriptor parser to access and search through shot descriptor data structures (not shown), and/or another component as may be apparent to one having ordinary skill in the art. Moreover, one having ordinary skill in the art will appreciate that the application 36 may include fewer components and one or more of the individual components 61-66 may be separate applications without departing from the scope of the invention.

Figure 4:
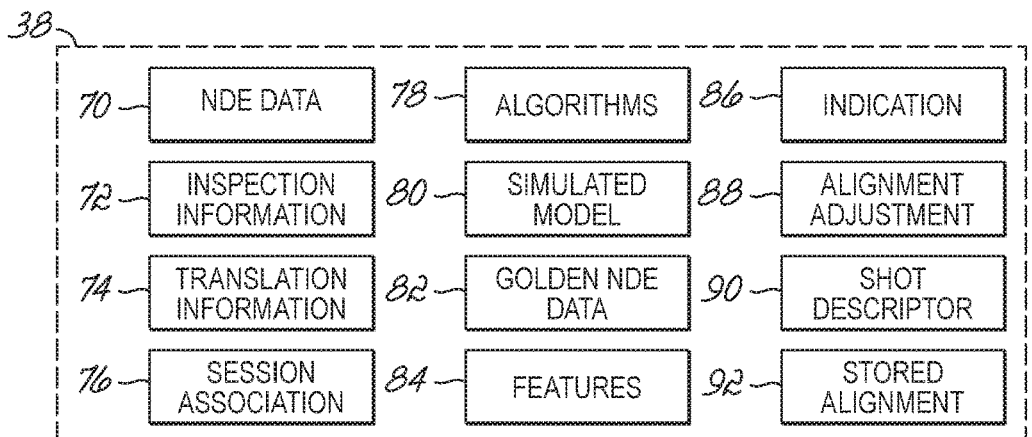
FIG. 4 is a diagrammatic illustration of a data structure and the primary components thereof of the computer of FIG. 1 or FIG. 2 configured to store data and/or information for the management of NDE data.

FIG. 4 is a diagrammatic illustration of one embodiment of the at least one data structure 38 consistent with embodiments of the invention. The at least one data structure 38 may include a plurality of individual data structures, including at least one NDE data data structure 70, at least one inspection information data structure 72, at least one translation information data structure 74, at least one session association data structure 76, at least one algorithms data structure 78, at least one simulated model data structure 80, at least one golden NDE data structure 82, at least one features data structure 84, at least one indications data structure 86, at least one alignment adjustment data structure 88, at least one shot descriptor data structure 90, at least one stored alignment data structure 92 and/or combinations thereof. Moreover, the data structure 38 may include additional data structures without departing from the scope of the invention. In some embodiments, the NDE data data structure 70 is configured to store at least one dataset of NDE data while the inspection information data structure 72 is configured to store inspection information associated with NDE data. The translation information data structure 74 may be configured with a lexicon, a plurality of semantic concepts, individualized translation information, and/or other translation information for the translation component 62 to translate information associated with NDE data and/or inspection information into standardized information. In alternative embodiments, translation information may be provided in a translation information data structure that may be otherwise separate from the translation information data structure 74, such as in a translation information file and/or data structure supplied by a user or otherwise accessible by the translation component 62.

The algorithms data structure 78 may include a plurality of alignment algorithms from which to choose an alignment algorithm with which to automatically align NDE data (as well as indications associated with inspection information that is in turn associated with NDE data) to a simulated model. Embodiments of the invention support multiple alignment algorithms to automatically align NDE data to the simulated model. For example, the alignment algorithms may include alignment algorithms to align a dataset of NDE data to the simulated model through feature based alignments, area based alignments, parallel projection algorithms and/or other manners of alignment known to one having ordinary skill in the art. For example, feature based alignment algorithms may extract feature sets from a dataset of NDE data and the simulated model and attempt to align the two feature sets through best fit. Specifically, the features may include straight-line segments, corners, points, intensity of particular areas, etc. The feature set of the NDE data may then be compared to the feature set of the simulated model and aligned through best fit to register the NDE data to the simulated model. The alignment may include a rotation, translation, scale transformation and/or other registration of the feature set and/or NDE data.

Alternatively, and also for example, area matching alignment algorithms may set up a matrix to compare an area of a dataset of NDE data (e.g., the entire dataset of NDE data or a portion thereof) to an area of the simulated model (e.g., the entire simulated model or a portion thereof). Specifically, a Fourier transform of an area of the dataset of NDE data may be compared to a Fourier transform of an area of the simulated model. A translation between the two datasets may correspond to a phase shift between the two Fourier transforms thereof. As such, a function may be run on both of the Fourier transforms to align the Fourier transforms, and thus the datasets of NDE data. For example, a cross power spectrum of the two Fourier transforms may be taken, and an inverse Fourier transform of the cross power spectrum may provide an indication of at least one location that corresponds between the two datasets of NDE data. The datasets may then be aligned with reference to the at least one location. As such, the Fourier transforms may be manipulated, processed or otherwise analyzed to provide a translation, rotation and/or scale change between the two datasets.

Also for example, the area matching algorithms may attempt to align NDE data through mutual matching of an area of a dataset of NDE data to an area of the simulated model. Specifically, the area matching algorithms may attempt to maximize mutual information between an area of the NDE data and an area of the simulated model. Although some alignment algorithms are disclosed, it will be apparent to one having ordinary skill in the art that additional alignment algorithms and alignment methods may be used without departing from the scope of the invention.

Additionally, the algorithms data structure 78 may include a plurality of auditing algorithms to audit an alignment of NDE data on a simulated model. The simulated model, in turn, may be stored in the simulated model data structure 80. Golden NDE data, which may be a blueprint, schematic, NDE data, and/or other technical information about at least a portion of an asset 54, may be used to generate the simulated model. Alternatively, the simulated model may be supplied by a user without generating that simulated model from golden N DE data. Golden NDE data may be stored in the golden NDE data structure 82. In some embodiments, NDE data and/or a simulated model may be aligned with its respective golden NDE data.

The features data structure 84 may include data associated with a plurality of features of respective portions of an asset. For example, one portion of an asset may have a feature that may be used to align NDE data to a simulated model. An alignment algorithm may use information about features of NDE data to align that NDE data to a simulated model. The indications data structure 86 may include a plurality of potential problems as indicated from inspection information or as determined from the inspection of the NDE data. The alignment adjustment data structure 88 may include adjusted algorithm parameters for various alignment algorithms. In particular, the alignment adjustment data structure 88 may include adjusted algorithm parameters as determined from input by a user in response to an alignment of NDE data to a simulated model, or the adjusted algorithm parameters may be automatically determined by the application 36 and stored in the alignment adjustment data structure 88 in response to an audit of the alignment of NDE data to the simulated model. The shot descriptor data structure 90 may include a plurality of shot descriptor data structures which may in turn be used to determine an alignment algorithm, if any, with which to align NDE data. The stored alignment data structure 92 may include stored parameters for a plurality of previous alignments of a respective plurality of NDE data. For example, the stored parameters may indicate input parameters for one or more alignment algorithms as well as specify the alignment algorithms with which to align previously aligned NDE data. Upon subsequent retrieval and/or alignment of that NDE data, the stored alignment data structure 92 may provide parameters to align that NDE data. Referring to FIG. 4, each of the data structures 70-92 may be disposed in at least one database, list, array, table, data entry, file, and/or another data structure for use by the application 36, computer 10, and/or a component thereof.

In general, the routines executed to implement the embodiments of the invention, whether implemented as part of an operating system or a specific application, component, algorithm, program, object, module or sequence of instructions, or even a subset thereof, will be referred to herein as "computer program code" or simply "program code." Program code typically comprises one or more instructions or sequence of operations that are resident at various times in memory and storage devices in a computer, and that, when read and executed by at least one processor in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, recordable type media such as volatile and non-volatile memory devices, floppy and other removable disks, hard disk drives, tape drives, optical disks (e.g., CD-ROM's, DVD's, HD-DVD's, Blu-Ray Discs), among others, and transmission type media such as digital and analog communications links.

In addition, various program code described hereinafter may be identified based upon the application or software component within which it is implemented in specific embodiments of the invention. However, it should be appreciated that any particular program nomenclature that follows is merely for convenience, and thus embodiments of the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, Application Programming Interfaces [APIs], applications, applets, etc.), it should be appreciated that embodiments of the invention are not limited to the specific organization and allocation of program functionality described herein.

Moreover, various program code described hereinafter may be referred to as being able to align NDE data. However, it should be appreciated that the program code is configured to align not only NDE data to a simulated model, but is also configured to align indications of potential problems to a simulated model, align first NDE data to second NDE data, align additional information to a simulated model and/or align other data. It should therefore be appreciated that embodiments of the invention are not limited to the alignment of NDE data described herein.

Those skilled in the art will recognize that the environments illustrated in FIGS. 1-4 are not intended to limit the embodiments of the invention. Indeed, those skilled in the art will recognize that other alternative hardware and/or software environments may be used without departing from the scope of the invention.

Software Description and Flows

Figure 5:
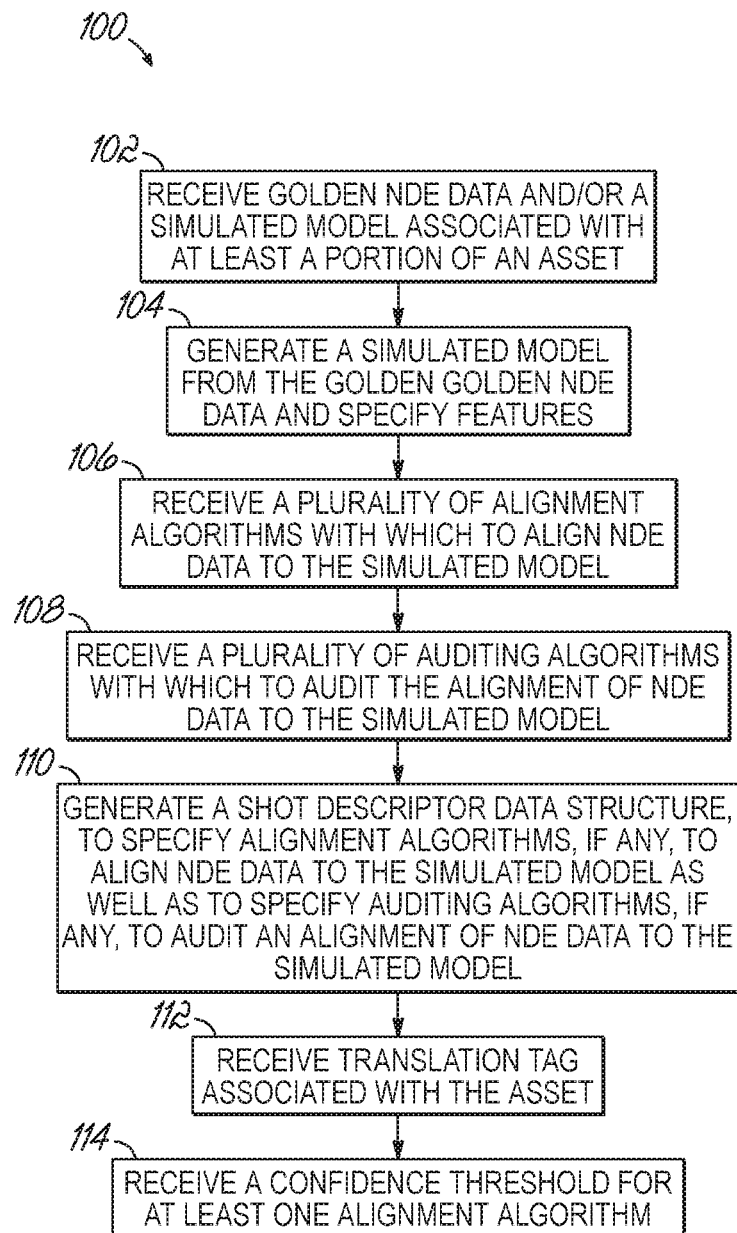
FIG. 5 is a flowchart illustrating a sequence of operations that may be executed by the application of FIG. 3 to accomplish the management of NDE data.

FIG. 5 is a flowchart 100 illustrating a sequence of operations that may be performed by the computer 10 of FIG. 1 and/or the computing system 40 of FIG. 2 to configure management of NDE data consistent with embodiments of the invention. Returning to FIG. 5, golden NDE data and/or a simulated model associated with at least a portion of an asset may be received (block 102). In various embodiments, golden NDE data may be blueprints, schematics, or other technical information about at least a portion of an asset. As such, and when golden NDE data is received, a simulated model of at least a portion of an asset may be generated from golden NDE data (block 104). In various embodiments, a simulated model includes a one-dimensional waveform, a two-dimensional image, and/or a three-dimensional representation of at least a portion of the asset. In specific embodiments, the two-dimensional and/or a three-dimensional simulated model is a computer aided design (CAD) and/or computer aided design and drafting (CADD) model generated through a respective CAD and/or CADD program, although different design software may be used without departing from the scope of the invention. NDE data and/or golden NDE data associated with a portion of an asset may be aligned with a simulated model associated with the same portion of the asset. The NDE data may then be inspected to determine if there are potential problems with that NDE data. For example, potential problems from at least one asset of a plurality of assets that is associated with the same portion of the respective at least one asset may be aligned to a simulated model. As such, trends in potential problems may be determined. Similarly, a plurality of datasets of NDE data from the same portion of the same asset may be aligned to a simulated model to determine a trend of the potential problems of that portion over time. Thus, potential problems may be displayed on a simulated model of at least a portion of an asset to determine if that particular portion of an asset is experiencing excessive potential problems across a plurality of assets or over time.

In addition to generating the simulated model or in response to receiving the simulated model, a plurality of features for that simulated model may be specified (block 104). These features may be used to align NDE data to the simulated model. For example, a feature may include a seam, a weld, a location of a bolt, a particular straight, curved, round, and/or other uniquely shaped area of the asset, and/or another feature that may be used to align the NDE data to the simulated model. The computer 10 of FIG. 1 and/or computing system 40 of FIG. 2 may also receive a plurality of alignment algorithms with which to align NDE data to the simulated model (block 106) as well as a plurality of auditing algorithms with which to audit an alignment of NDE data to the simulated model (block 108).

It may be advantageous to use various alignment algorithms to align NDE data collected from various types of NDE data collection devices, use various alignment algorithms to align NDE data associated with various parts of an asset and/or otherwise have various alignment algorithms with which to align NDE data. For example, a first alignment algorithm may be more effective at aligning NDE data collected from an x-ray machine, but that first alignment algorithm may not be as effective at aligning NDE data collected from an ultrasound machine. As such, shot descriptor data structures may be generated that specify alignment algorithms, if any, to align NDE data to the simulated model (block 110). In specific embodiments, a shot descriptor configuration tool may be configured to analyze a simulated model and/or NDE data and determine from that analysis, or from manual interaction with that shot descriptor configuration tool, the alignment algorithms, if any, to align NDE data to the simulated model, and thus generate the shot descriptor data structures to align NDE data to the simulated model. A shot descriptor data structure may be associated with each NDE data collection device and list, in an order, the preferred alignment algorithms with which to align NDE data from the respective NDE collection device. Thus, for example, if a first alignment algorithm to align the NDE data produces an unsatisfactory alignment of that NDE data to the simulated model, a second alignment algorithm to align the NDE data to the simulated model may be used. In addition to specifying at least one alignment algorithm, the shot descriptor data structure may specify at least one auditing algorithm to audit an alignment of the NDE data to the simulated model to determine whether that alignment has produced a satisfactory alignment (block 110). In the event that an alignment algorithm is not specified to align NDE data to a simulated model, the shot descriptor data structure may indicate that the NDE data is to be manually aligned by a user.

In addition to receiving golden NDE data, simulated models, alignment algorithms and auditing algorithms, translation information may be received (block 112). For example, if the asset is an airplane a portion of the inspection information associated with NDE data may indicate that the NDE data is associated with "wing2," which in turn may indicate that the NDE data is associated with a left wing of the airplane. As such, translation information may be used by a translation component to convert "wing2" to "LWING," or another identifier. Also for example, at least some portion of the NDE data may indicate the NDE data collection device that captured that NDE data. As such, translation information may be used by the translation component to indicate the type of NDE data collection device that captured the NDE data. This, in turn, may be used to determine a shot descriptor data structure associated with that NDE data.

Finally, a confidence threshold for at least one alignment algorithm may be received (block 114). In particular, the confidence threshold may be used to audit an alignment of NDE data to a simulated model. When an audit alignment determines that an alignment of NDE data to a simulated model has not reached a particular confidence threshold, the alignment may be discarded and/or adjusted. In one embodiment, when the confidence threshold of an alignment has not been met, the alignment of NDE data to the simulated model with a first alignment algorithm is discarded and a second alignment algorithm with which to align the NDE data to the simulated model is chosen. In an alternative embodiment, when the confidence threshold of an alignment has not been met, the parameters for the alignment algorithm used to align the NDE data to the simulated model is adjusted. In a further alternative embodiment, when the confidence threshold of an alignment has not been met, a user is given the opportunity to manually adjust the alignment of that NDE data to the simulated model.

Figure 6:
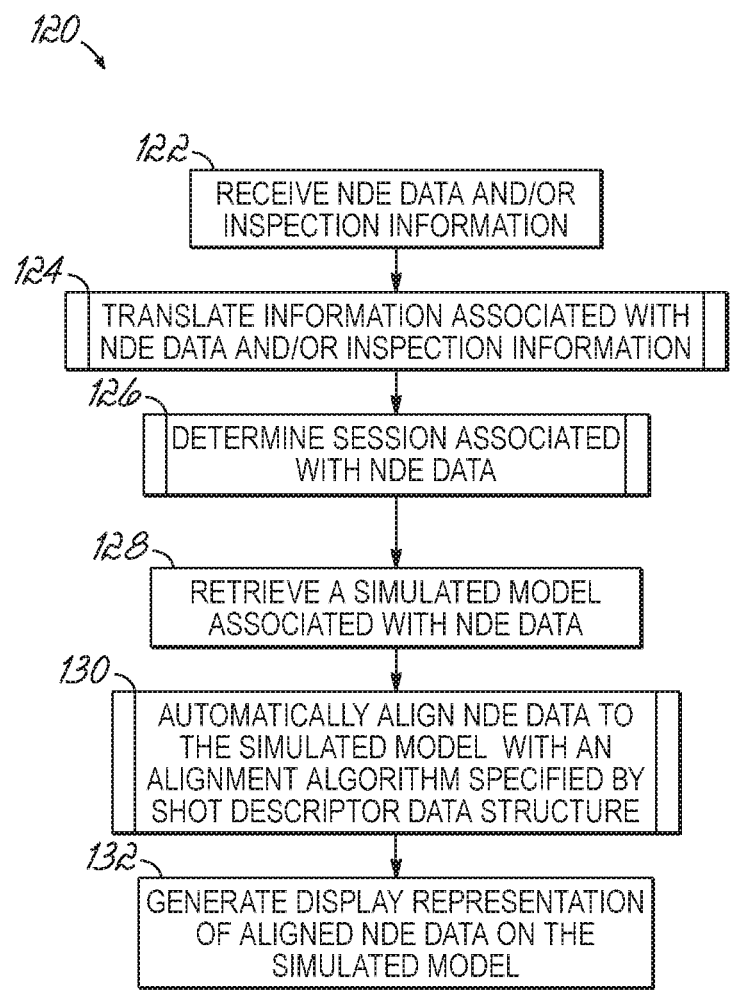
FIG. 6 is a flowchart illustrating a sequence of operations that may be executed by the application of FIG. 3 generally illustrating the management of NDE data.

FIG. 6 is a flowchart 120 illustrating a sequence of operations configured to be performed by the computer 10 of FIG. 1 and/or the computing system 40 of FIG. 2 to manage NDE data consistent with embodiments of the invention. As illustrated in FIG. 6, the sequence of operations includes receiving NDE data and/or inspection information associated with at least a portion of an asset (block 122). In response to receiving the NDE data and/or the inspection information, data associated with the NDE data and/or the inspection information may be translated into tagged information (block 124) and a session associated with the NDE data may be determined (block 126). In response to determining the session associated with the NDE data, a simulated model associated with the NDE data may be retrieved (block 128). Once the simulated model has been retrieved, the NDE data may be automatically aligned to the simulated model with at least one alignment algorithm specified by a shot descriptor data structure associated with the NDE data (block 130). A display representation of the aligned NDE data on the simulated model may be generated in response to alignment of the NDE data to the simulated model (block 132).

Figure 7:
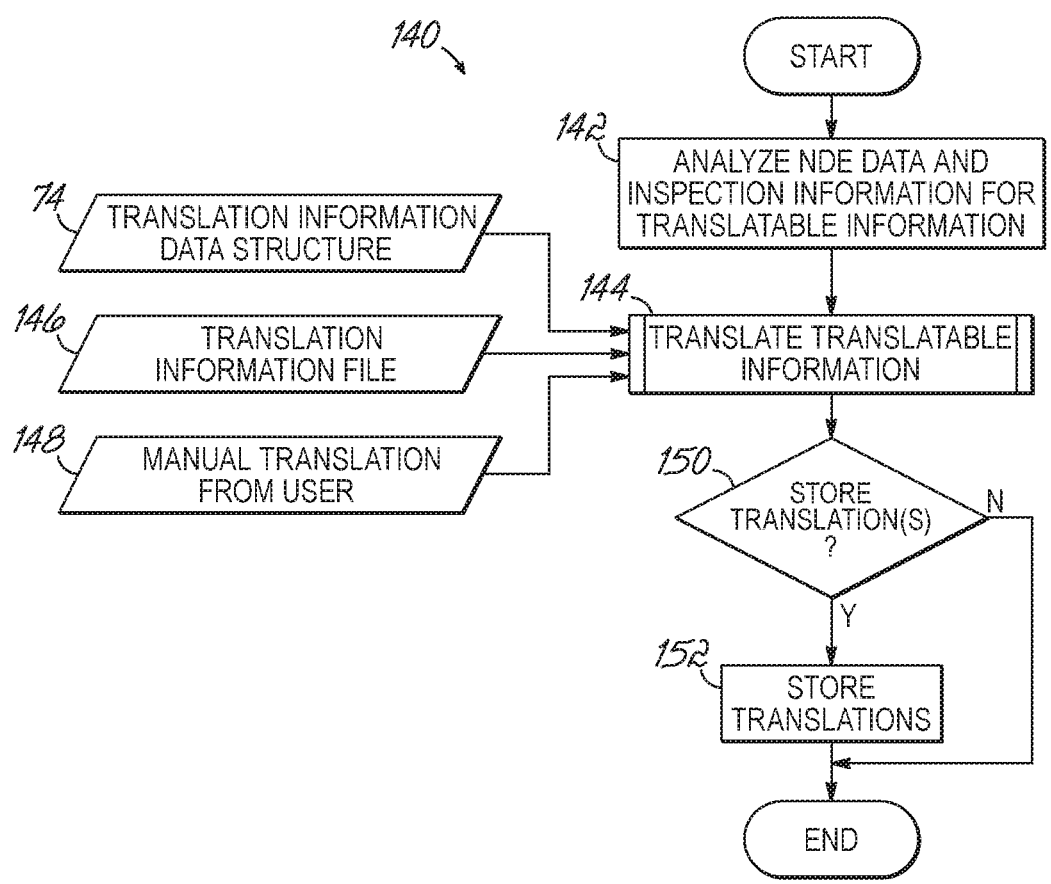
FIG. 7 is a flowchart illustrating in more detail the tag translation process of FIG. 6.

FIG. 7 is a flowchart 140 illustrating the translation process of block 124 in FIG. 6. Referring to FIG. 7, the NDE data and/or the inspection information may be analyzed for translatable information (block 142). In some embodiments, translatable information includes a location on the asset from which the NDE data was captured, an identification of the asset, an identification of a component of the asset, a history of the asset, a time at which the NDE data was captured, a date at which the NDE data was captured, an identification of an inspection location at which the NDE data was captured, an identification of a service location associated with the NDE data, an identification of an NDE session associated with the NDE data, an indication associated with the NDE data, an annotation associated with the NDE data, an identification of an inspector associated with the NDE data, an identification of an NDE data collection device associated with the NDE data, an orientation associated with the NDE data, a unique identification of the NDE data, a pixel spacing of the NDE data, a photometric interpretation of the NDE data, a bit depth of the NDE data, color mapping of the NDE data, intensity settings of the NDE data, a status of the NDE data, an uncertainty of a measurement associated with the NDE data and/or combinations thereof. This translatable information, in specific embodiments, is determined from data associated with the NDE data and/or the inspection information. When there is translatable information, information may be translated (block 144) with reference to the translation information data structure 74, a translation information file 146 separate from the translation information data structure 74 (e.g., a translation information file 146 separately supplied by the user and/or otherwise available to translate information) and/or manual translation of the information from the user 148. In response to translating the information, it may be determined whether to store the translation (block 150). When it is determined to store the translation (e.g., for example, the translation was performed with reference to manual translation from the user 148) ("Yes" branch of decision block 150) the translation may be stored (block 152) for future reference. When it is determined not to store the translation ("No" branch of decision block 150) and/or after storing the translation (block 152) tag translation process may end.

Figure 8:
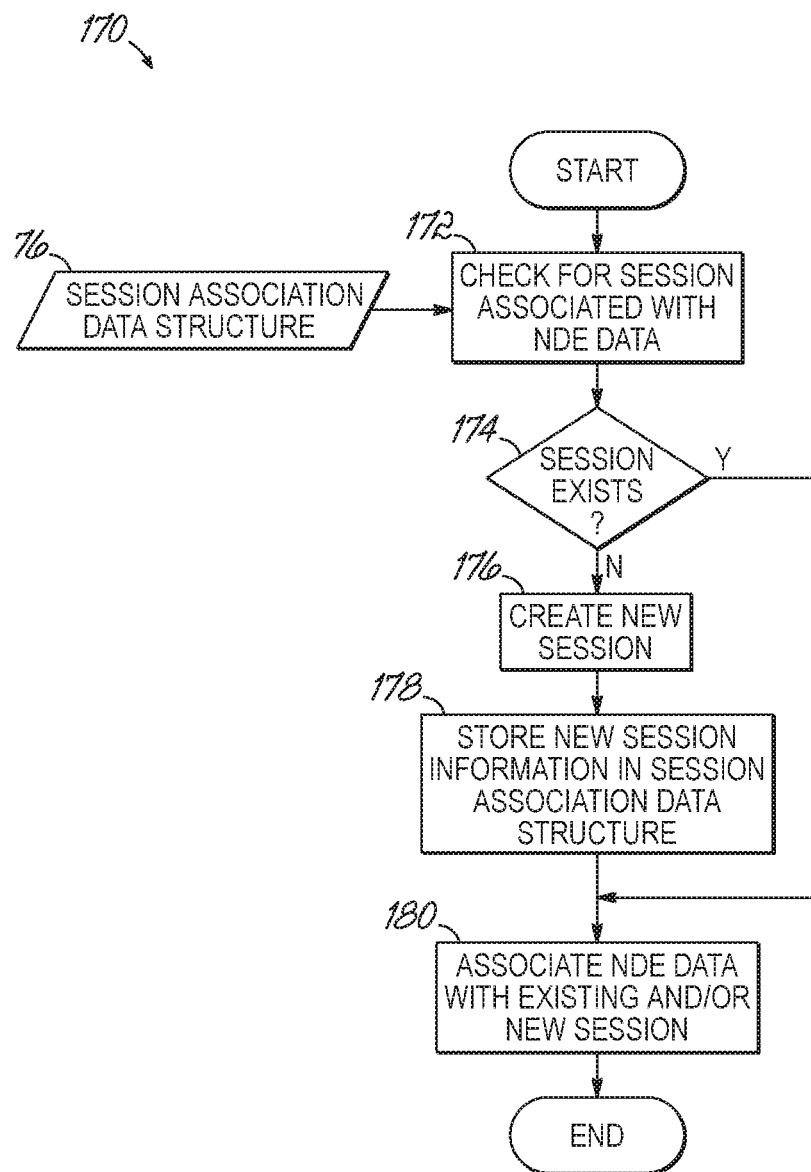
FIG. 8 is a flowchart illustrating in more detail the session association process of FIG. 6.

FIG. 8 is a flowchart 170 illustrating in more detail the session association process of block 126 of FIG. 6. Referring to FIG. 8, a session associated with NDE data may be determined by comparing translated tags associated with that NDE data and/or inspection information with sessions in the session association data structure (block 172). The session association data structure (block 76) may include a list of sessions during which NDE data may have been captured from an asset, each of which may include the times and/or dates of that session, the serial number of the asset inspected in that session, an identification of the portions of the asset inspected in that session, an identification of the inspector who captured the NDE data, and/or an identification of datasets of required and/or optional NDE data that may have been captured during that session. Thus, in the event that a session includes the capture of a plurality of datasets of NDE data (e.g., from the same portion of an asset or from various portions of the asset, as well as from various NDE data collection devices) and/or a sequence to capture that plurality of datasets of NDE data, each dataset of NDE data captured during that session may be associated with that session. As such, it may be determined whether a session associated with the NDE data exists (block 174). When there is no session associated with the NDE data ("No" branch of decision block 174), a new session may be created and associated with the NDE data (block 176) and data associated with the new session may be stored in the session association data structure (block 178). When there is a session associated with the NDE data ("Yes" branch of decision block 174), or after storing new session data in the session association database (block 178), the NDE data may be associated with the existing session or new session, respectively (block 180).

Figure 9:
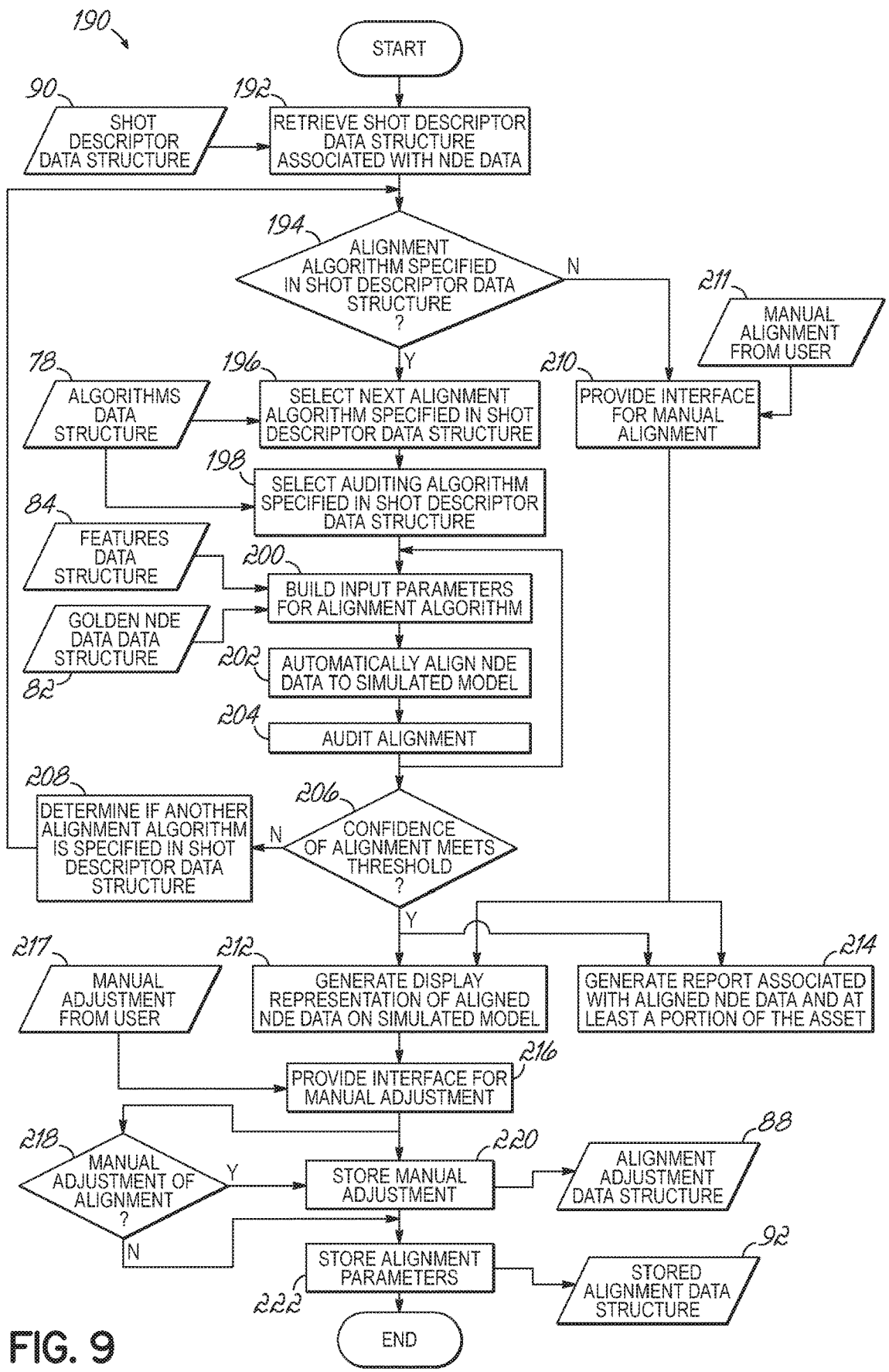
FIG. 9 is a flowchart illustrating in more detail the alignment algorithm selection process and automatic alignment process of FIG. 6.

FIG. 9 is a flowchart 190 illustrating in more detail the alignment algorithm selection and automatic alignment process of block 130 in FIG. 6. Translated information associated with a dataset of NDE data may be used to determine a particular shot descriptor data structure associated with that dataset of NDE data. As such, a shot descriptor data structure associated with that NDE data may be retrieved (block 192). In response to retrieving the shot descriptor data structure, it may be determined whether an alignment algorithm is specified in that shot descriptor data structure (block 194). In particular, the shot descriptor data structure may be accessed, and it may be determined whether that shot descriptor data structure includes at least one alignment algorithm for the NDE data. When the shot descriptor data structure includes at least one alignment algorithm ("Yes" branch of decision block 194), the next alignment algorithm specified in the shot descriptor data structure may be selected from the algorithm data structure (e.g., in one example, the first alignment algorithm specified in the shot descriptor data structure) (block 196). In an optional step, an auditing algorithm specified in the shot descriptor data for auditing an alignment with the alignment algorithm selected in block 196 may also be selected from the algorithm data structure (block 198).

Upon selecting the alignment algorithm with which to align the NDE data to a simulated model, input parameters for that alignment algorithm may be built (block 200). Input parameters for various alignment algorithms may be determined based on the translated tags associated with the NDE data (e.g., the type of NDE data collection device used to capture the NDE data) and/or the inspection information (e.g., data concerning the asset, component, angle, orientation, or other information associated with the NDE data). The input parameters for a particular dataset of NDE data may include that the NDE data should be decimated, filtered using edge detection, rotated, oriented, noise filtered, that seed values be applied to the NDE data, that the scale of the NDE data should be adjusted (e.g., the NDE data should be enlarged or reduced), that portions of the NDE data should be deformed (e.g., some portion of the NDE data should include local distortion to account for manufacturing variances, parallax distortion, and/or other variances), and/or that other input parameters should be applied to the NDE data for alignment to the simulated model. Moreover, input parameters may be built at least partly based upon input parameters and/or an alignment adjustment of a previous alignment (e.g., input parameters for a second alignment algorithm may be built or otherwise based upon the input parameters for a first alignment algorithm and/or the alignment adjustments to an alignment by the first alignment algorithm). The input parameters may also include NDE data features and/or a golden NDE data. Using the input parameters, the NDE data may be automatically aligned to the simulated model with the alignment algorithm (block 202). As illustrated in FIG. 9, after the NDE data has been aligned to a simulated model (block 202) the input parameters for that alignment may be fed back to build new input parameters for a subsequent alignment algorithm as at 203.

In response to aligning the NDE data to the simulated model, the alignment may be audited (block 204). In particular, auditing the alignment may include determining a confidence of the alignment of the NDE data to the simulated model and comparing that confidence to a confidence threshold associated with the alignment algorithm and specified by a shot descriptor data structure associated with that NDE data. When the confidence of the alignment of the NDE data to the simulated model is unsatisfactory and/or when the confidence threshold associated with the alignment algorithm has not been met or exceeded ("No" branch of block 206) it may be determined whether another alignment algorithm in the shot descriptor data structure associated with the NDE data has been specified (block 208) and the sequence of operations may return to block 194.

Returning to block 194, when an alignment algorithm is not specified in a shot descriptor data structure associated with the NDE data, when the confidence of a an alignment is unsatisfactory and there is no other alignment algorithm specified in the shot descriptor data structure associated with the NDE data, and/or when the confidence threshold of an alignment has not been met and there is no other alignment algorithm specified in the shot descriptor data structure associated with the NDE data ("No" branch of decision block 194), a user interface may be provided to a user for manual alignment of the NDE data to the simulated model (block 210). That user interface may receive a manual alignment of the NDE data to the simulated model (block 211). When the confidence of an alignment of NDE data to a simulated model is satisfactory, when the confidence threshold of an alignment algorithm has been met or exceeded ("Yes" branch of block 208), and/or after the manual alignment of NDE data to the simulated model (block 210), a display representation of the aligned NDE data to the simulated model may be generated (block 212) and/or a report associated with the aligned NDE data, and thus at least a portion of the asset, may be generated (block 214). In an optional step and in response to generating a display representation of the aligned NDE data to the simulated model (block 212), and in particular after an automatic alignment of the NDE data to the simulated model (block 202), a user interface may be provided to a user for an adjustment of the alignment (block 216), and that user interface may receive an adjustment of the alignment of the NDE data to the simulated model (block 217). When the user tunes an automatic alignment of the NDE data to the simulated model ("Yes" branch of decision block 218) the adjustment of the alignment may be stored in an alignment adjustment data structure associated with that alignment algorithm (block 220). When the user does not tune an automatic alignment of the NDE data to the simulated model ("No" branch of decision block 218) the alignment parameters of the alignment may be stored (block 222) and the alignment of the NDE data to the simulated model may end.

Figure 10:
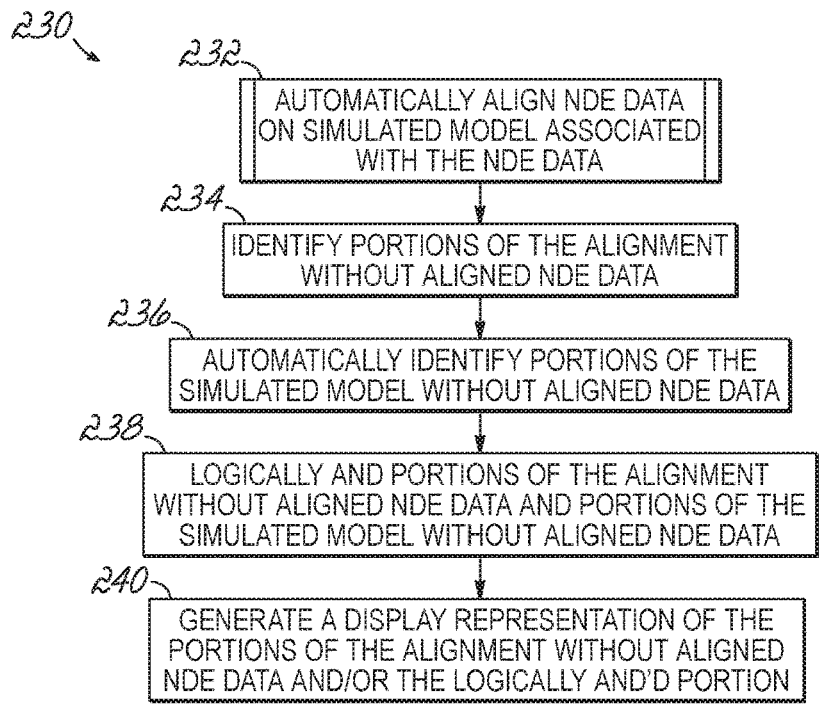
FIG. 10 is a flowchart illustrating a sequence of operations that may be executed by the application of FIG. 3 to determine missed coverage of at least a portion of a simulated model.

FIG. 10 is a flowchart 230 illustrating detection of missed coverage of at least a portion of a simulated model consistent with embodiments of the invention. In some embodiments, the missed coverage is indicated identifying those portions of the simulated model which are not associated with a dataset of NDE data and generating a display of those portions. Thus, NDE data may be automatically aligned to a simulated model associated with that NDE data (block 232) and at least a portion of the alignment without aligned NDE data may be identified (block 234). In a specific example, the portion of the alignment without aligned NDE data are identified by changing a color of the background of the display representation upon which aligned NDE data and the simulated model are displayed. In this manner, a user may simply look for those parts of the alignment which have the color to determine those parts of the simulated model that are not associated with NDE data. In an optional step, at least a portion of the simulated model that are not associated with aligned NDE data may be automatically identified (block 236). In specific embodiments, the portion of the simulated model may be determined through a filler algorithm configured to identify a part of the simulated model that are not associated with aligned NDE data, then associate that part with a color. In some embodiments, the identified at least a portion of the alignment without the aligned NDE data and the at least a portion of the simulated model without aligned NDE data may be logically AND'd (block 238) and a display representation of the at least a portion of the alignment without aligned NDE data and/or the logically AND'd portions may be generated (block 240). As such, a user may be able to view portions of a simulated model, or portions of an alignment, that are not associated with aligned NDE data. Thus, the user may be able to determine whether the coverage of at least a portion of an asset associated with that simulated model was acceptable, in that the coverage may be unacceptable when there is at least a portion of the simulated model that is not associated with aligned NDE data.

Figure 11:
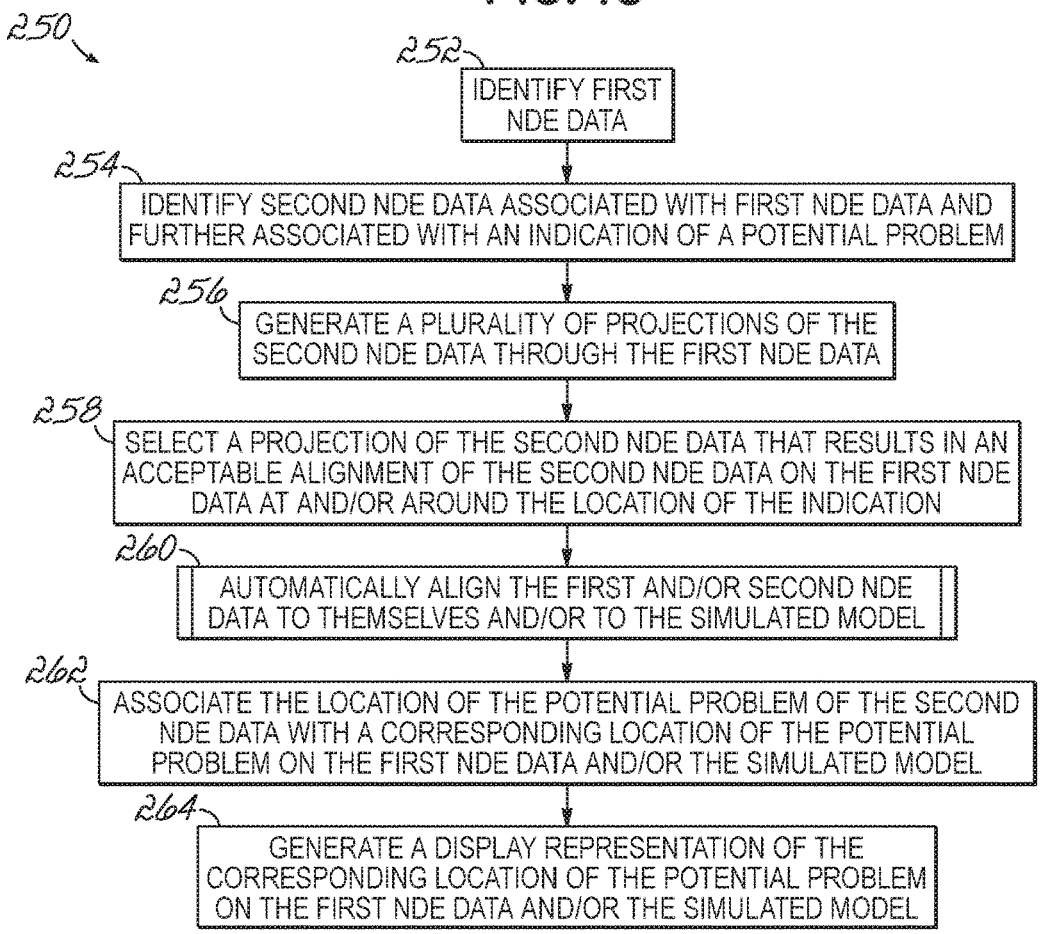
FIG. 11 is a flowchart illustrating a sequence of operations that may be executed by the application of FIG. 3 to align two datasets of NDE data with each other and determine the location of an indication.

FIG. 11 is a flowchart 250 illustrating a sequence of operations to align two datasets of NDE data with each other and determine the location of an indication of a potential problem. In particular a first dataset of NDE data that may include an indication of a potential problem may be identified (block 252). For example, the first NDE data may be an x-ray image of at least a portion of an asset. A second dataset of NDE data associated with the first NDE data and that is further associated with an indication of a potential problem may also be identified (block 254). For example, the second NDE data may be a CT slice of the at least a portion of the asset. Moreover, the second NDE data may be associated with an indication that may not be in turn associated with the first NDE data. As such, a plurality of projections of the second NDE data may be generated through the first NDE data (block 256) and a projection from among the plurality of projections that results in an acceptable alignment (e.g., a projection of the second NDE data that substantially matches the first NDE data at and/or around the location of the indication) may be selected (block 258). For example, a plurality of projections of the CT slice may be generated through the x-ray image, and the projection with the most minimal difference, or smallest error, between the slice and image may be selected.

In response to selecting the projection, the second NDE data may be automatically aligned to first NDE data and/or the first and second NDE data may be aligned to a simulated model associated with both the first and second NDE data consistent with embodiments of the invention (block 260). For example, the x-ray image and CT slice may be of a fan blade of a turbine engine, and the x-ray image and/or CT slice may be aligned to themselves and/or a simulated model of the fan blade of the turbine engine. In response to automatically aligning the first and/or second NDE data, the location of the indication associated with the first NDE data may be associated with a corresponding location on the first NDE data and/or the simulated model (block 262) and a display representation of the corresponding location of the indication on the first NDE data and/or the simulated model may be generated (block 264). Thus, for example, the location of an anomaly of the CT slice may be associated with a location on the x-ray image. By aligning both the CT slice to the x-ray image, the location of the anomaly may be located on the x-ray image. Similarly, by aligning both the x-ray image and the CT slice to the simulated model, the location of the anomaly may be located within the three dimensional space of the simulated model.

Figure 12:
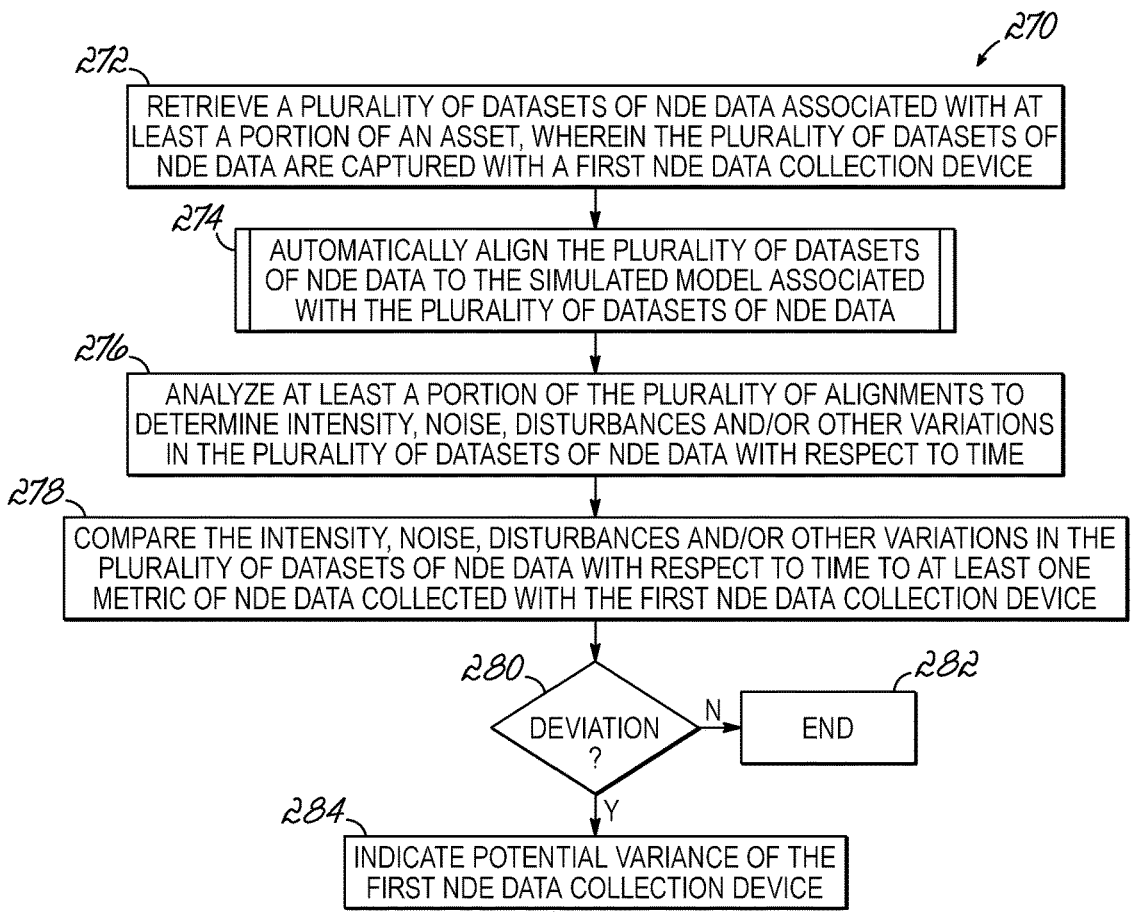
FIG. 12 is a flowchart illustrating a sequence of operations that may be executed by the application of FIG. 3 to maintain data integrity of NDE data captured from an NDE data collection device.

FIG. 12 is a flowchart 270 illustrating a sequence of operations to maintain data integrity of NDE data captured from an NDE data collection device consistent with embodiments of the invention. Over time, NDE data collection devices may experience wear and otherwise experience malfunctions that are evident in the NDE data that they capture. In particular, NDE data collection devices that utilize computed radiography are typically configured with phosphor plates instead of film. These phosphor plates are often prone to wear from the absorption of radiation over time as well as to rough handling often associated with industrial settings. In some embodiments of the invention, by trending NDE data collected from an NDE data collection device that utilizes computed radiography and a phosphor plate, the wear to that phosphor plate can be identified. Thus, a plurality of datasets of NDE data associated with at least a portion of an asset, and captured with a first NDE data collection device, may be retrieved (block 272) and automatically aligned to a simulated model associated with that plurality of datasets of NDE data (block 274). The plurality of alignments may be analyzed to determine a trend in the intensity of those NDE datasets over time, noise in NDE datasets, a common disturbance in NDE datasets and/or a trend of that disturbance over time, as well as other variations in the plurality of datasets of NDE with respect to time (block 276).

The intensity, noise, disturbances and/or other variations in the plurality of datasets of NDE data may be compared to some metric of expected NDE data collected with the first NDE data collection device to determine a deviation of the plurality of datasets of NDE data (block 278). When there is no deviation in the plurality of NDE datasets ("No" branch of decision block 280) the sequence of operations 270 may end (block 282). When there is a deviation in the plurality of NDE datasets ("Yes" branch of decision block 282), the deviation, and thus a potential variance of the first NDE data collection device, may be indicated (block 284). This, in turn, may be transferred to an inspector that utilizes the NDE data collection device and thus informs that inspector of wear of at least a portion of the NDE data collection device.

Figure 13:
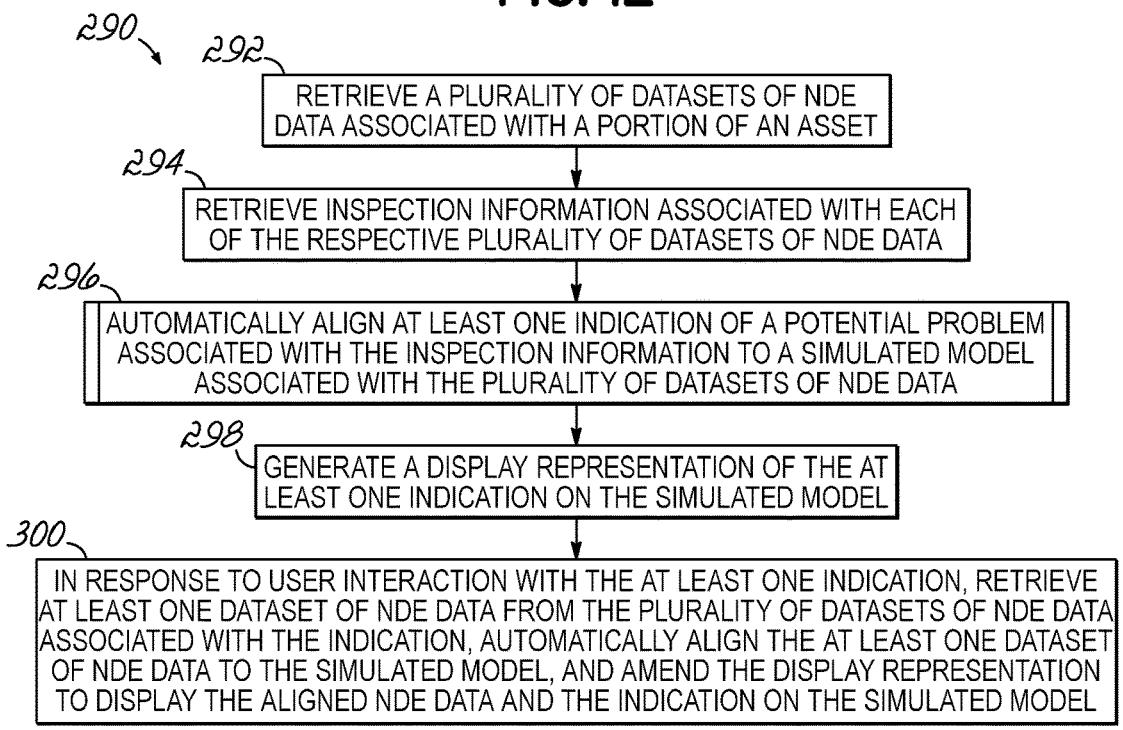
FIG. 13 is a flowchart illustrating a sequence of operations that may be executed by the application of FIG. 3 to retrieve NDE data associated with an first indication in response to the selection of that first indication from among a plurality of indications.

FIG. 13 is a flowchart 290 illustrating a sequence of operations to retrieve NDE data associated with an indication from among a plurality of indications consistent with embodiments of the invention. In particular, the sequence of operations may be used when a plurality of indications associated with a plurality of datasets of NDE data are aligned and displayed on a simulated model associated with the plurality of datasets of NDE data. In response to a user selecting a particular indication, the NDE data associated with that particular indication may be retrieved. Thus, the plurality of datasets of NDE data associated with at least a portion of an asset may be retrieved (block 292). In response, the inspection information associated with each of the respective plurality of datasets of NDE data may also be retrieved (block 294). In response to retrieving the inspection information, at least one indication associated with inspection information is automatically aligned to a simulated model associated with the plurality of datasets of NDE data (block 296). A display representation of the at least one indication on the simulated model is then generated (block 298). In response to user interaction with the at least one indication (e.g., a user clicking, tabbing to and/or otherwise selecting the at least one indication), each dataset of NDE data from among the plurality of datasets of NDE data associated with the at least one indication are retrieved and automatically aligned with the simulated model, and the display representation is amended to display the aligned NDE data and the at least one indication on the simulated model (block 300).

Figure 14:
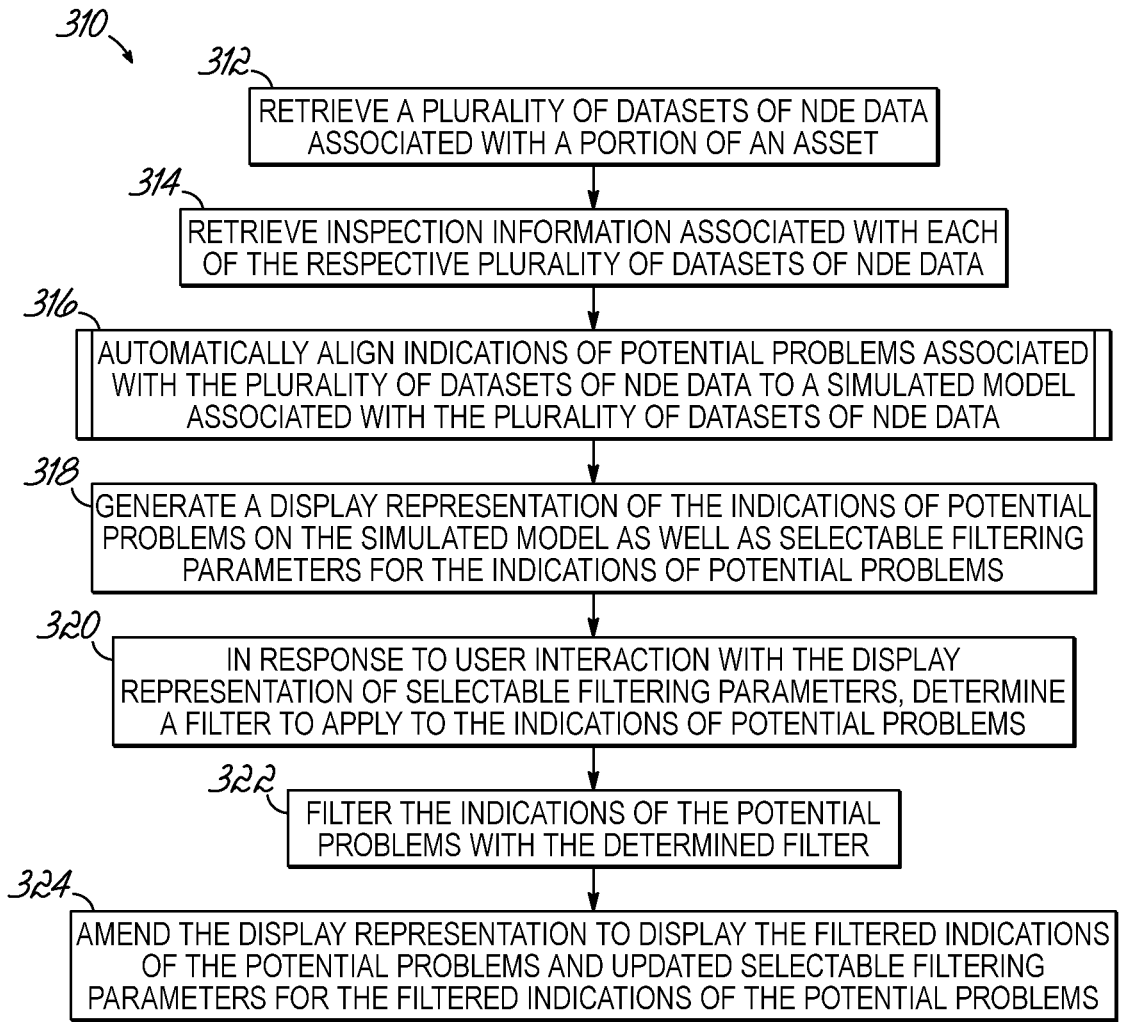
FIG. 14 is a flowchart illustrating a sequence of operations that may be executed by the application of FIG. 3 to filter a plurality of indications.

FIG. 14 is a flowchart 310 illustrating a sequence of operations to filter indications consistent with embodiments of the invention. Initially, a plurality of datasets of NDE data associated with at least a portion of an asset are retrieved (block 312). Similarly, inspection information associated with each of the respective plurality of datasets of NDE data may be retrieved (block 314). The plurality of datasets of NDE data and respective inspection information may be retrieved in response to user interaction to specify the at least a portion of the asset. Indications of potential problems associated with the plurality of datasets of NDE data may be automatically aligned to a simulated model associated with the plurality of datasets of NDE data (block 316). In turn, a display representation of the indications on the simulated model may be generated, along with selectable filtering parameters for the indications (block 318). For example, the selectable filtering parameters may be interacted with to select the type of indications to display (e.g., cracks, abrasions, etc.), more specific portions of the at least a portion of the asset, indications associated with a particular NDE data collection device, a time (e.g., an hour, a day, a week, a month, a year and/or a range thereof) associated with that indication, and/or indications to display based upon another selectable filtering parameter.

In response to user interaction with the display representation of selectable filtering parameters, a filter to apply to the indications to selectively filter at least one indication is determined (block 320) and applied to the plurality of indications to remove that at least one indication from the aligned plurality of indications (block 322). In turn, the display representation is amended to display those indications that have not been removed (e.g., the "filtered indications), and the selectable filtering parameters for the filtered indications are updated (block 324).

Figure 15:
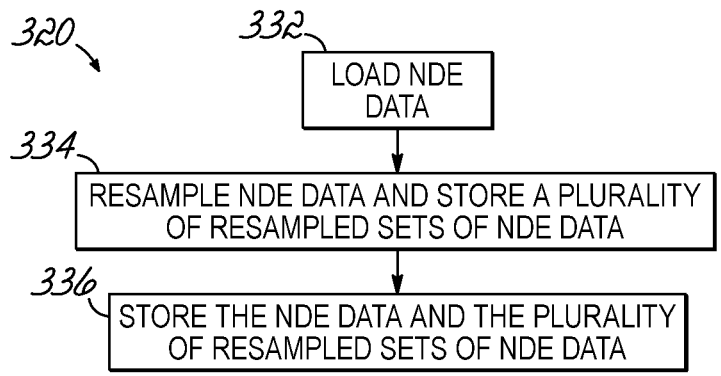
FIG. 15 is a flowchart illustrating a sequence of operations that may be executed by the application of FIG. 3 to sample NDE data and produce a plurality of resolutions of that NDE data.

FIG. 15 is a flowchart 330 illustrating a sequence of operations to resample NDE data and produce a plurality of resolutions of that NDE data for subsequent display consistent with embodiments of the invention. For example, a dataset of NDE data may approach several hundred megabytes in size. This, in turn, may be difficult to display. As such, the NDE data may be resampled using bilinear interpolation to generate a plurality of resamples of NDE data from a dataset of NDE data. In particular, a resample of NDE data may be smaller than the NDE data and thus require less resources to view. As such, a first resample of NDE data that is smaller in size than the NDE data may be viewed at a lower magnification of view of an alignment when it is unnecessary to illustrate all details of the NDE data, while a second resample of NDE data that is larger in size than the first resample of NDE data may be viewed at a higher magnification of view of the alignment to illustrated finer details. Thus, NDE data may be loaded (block 332) and that NDE data may be sampled using bilinear interpolation into a plurality of resampled sets of NDE data (block 334). For example, the NDE data may be decimated or otherwise sampled to produce resampled sets of NDE data. More specifically, the NDE data may be an image and the plurality of resampled sets of the NDE data may include a resampled set of NDE data at one-half the resolution of the NDE data, a resampled set of NDE data at one-fourth the resolution of the NDE data, and so on. It will be appreciated that any fraction of the NDE data may be specified for a resampled set of NDE data, including three-fourths, seven-eighths, one-tenth, one-thousandth, etc. Upon generating the plurality of resampled sets of NDE data, the NDE data as well as the plurality of resampled sets of NDE data may be stored (block 336).

Figure 16:
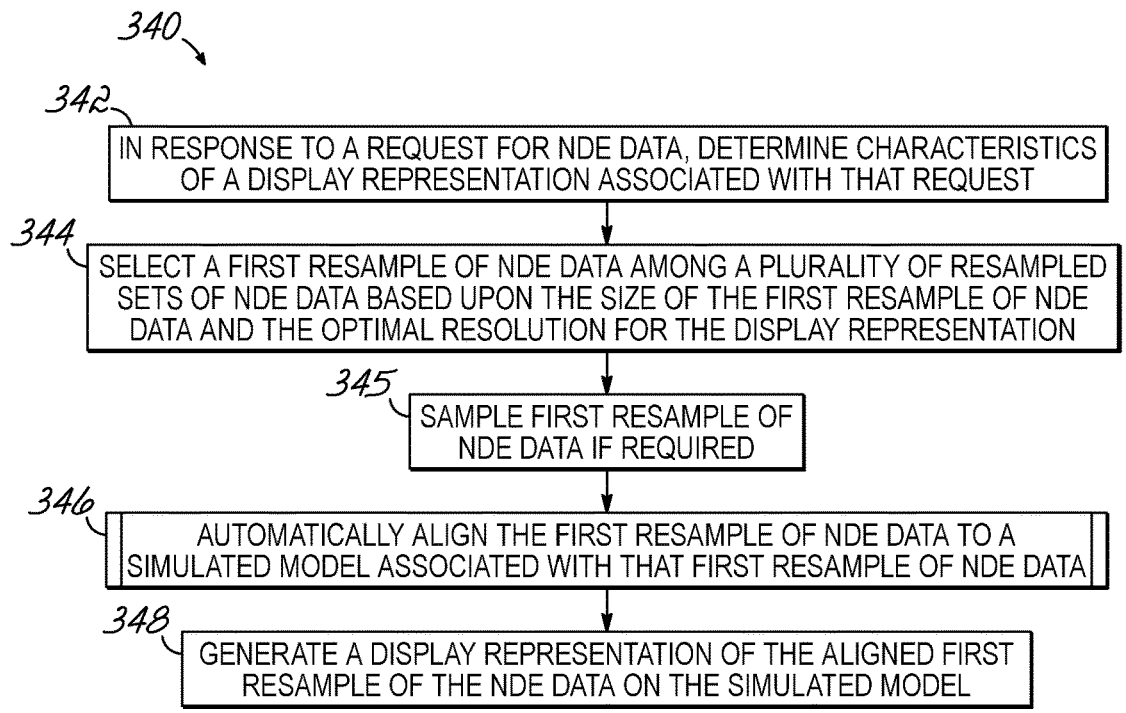
FIG. 16 is a flowchart illustrating a sequence of operations that may be executed by the application of FIG. 3 to display a dataset of NDE data or a sub-dataset thereof.

FIG. 16 is a flowchart 340 illustrating a sequence of operations to display a dataset of NDE data or a resampled set thereof consistent with embodiments of the invention. In response to a request for the NDE data (e.g., in response to a request from a user to view a portion of an asset associated with the NDE data, or otherwise align the NDE data), the characteristics of a display representation associated with that request (e.g., a display representation that includes the NDE data) are determined (block 342). In particular, the display representation characteristics may include the current zoom level at which to display the NDE data. Thus, a first resample of NDE data from among a plurality of resampled sets of NDE data may be selected based upon a size of the first resample of NDE data and/or an optimal resolution for the display representation (block 344). In an optional step, the first resample of NDE data may then be sampled using nearest neighbor interpolation (block 345). For example, if it is determined that the optimal resolution for the display representation should be a resampled set of NDE data that is one-third the resolution of the original NDE data, the sequence of operations may select the resampled set of NDE data that is one-half the resolution of the original NDE data (e.g., the resampled set of NDE data that is closest to the desired resolution and that is also larger than the desired resolution for more accurate re-sampling) and sample that NDE data to one-third the resolution of the original NDE data. After selecting the first resample of NDE data, or after re-sampling the first resample of NDE data, the first resample is automatically aligned to a simulated model associated with that first resample of NDE data (block 346) and a display representation of the aligned first resample of NDE data on the simulated model is generated (block 348).

Figure 17:
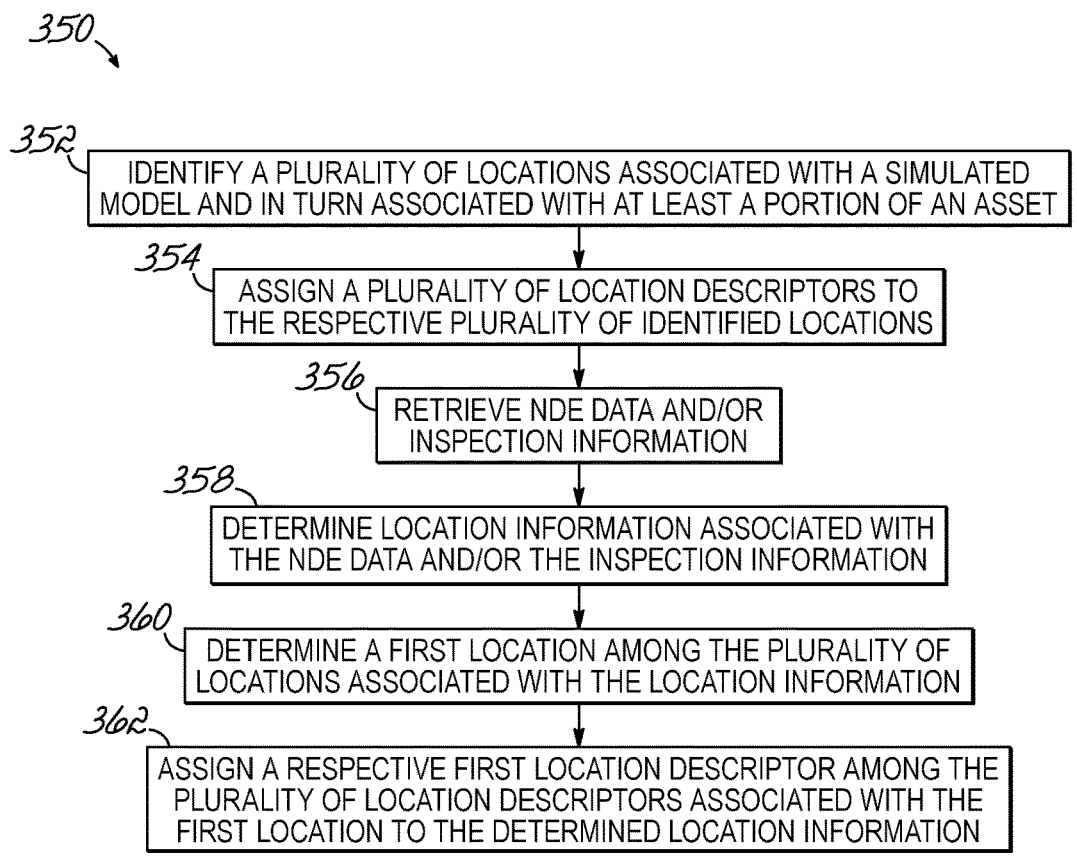
FIG. 17 is a flowchart illustrating a sequence of operations that may be executed by the application of FIG. 3 to assign a location descriptor to at least a portion of an asset and translate location information associated therewith.

FIG. 17 is a flowchart 350 illustrating a sequence of operations to assign a location descriptor to at least a portion of an asset and translate location information associated with NDE data (e.g., location information specifying the location of an indication, asset, portion of an asset, sub-portion of an asset, etc.) consistent with embodiments of the invention. Initially, a plurality of locations associated with a simulated model, and in turn associated with at least a portion of an asset, are identified (block 352). For example, one location may identify that the simulated model is associated with the left wing of an asset, a second location may identify a portion of the simulated model that is associated with a slat of the left wing, a third location may identify a portion of the simulated model that is associated with a spoiler of the left wing, a fourth location may identify that a portion of the simulated model is associated with a bolt of the left wing, the slat or the spoiler, etc. A plurality of location descriptors may then be assigned to at least some of the respective identified locations (block 354). For example, a location descriptor may describe the left wing as "WING2," the slat as "SLAT1," the spoiler as "SPOIL1," and the bolt as "BOLT289."

In response to retrieving NDE data and/or inspection information associated therewith (block 356), location information associated with the NDE data and/or the inspection information may be determined (358). In particular, the determined location information may include location information specifying the at least a portion of the asset associated with the NDE data and/or the inspection information. Additionally and/or alternatively, the determined location information may include a location information specifying the location of an indication of a potential problem in turn associated with the NDE data and/or the inspection information. In response to determining the location information, a first location among the plurality of locations associated with the location information may be determined (block 360) and a respective first location descriptor among the plurality of location descriptors associated with the first location may be assigned to the determined location information (block 362). Thus, a location associated with the NDE data and/or the location of an indication may be automatically determined and assigned to that NDE data.

Figure 18:
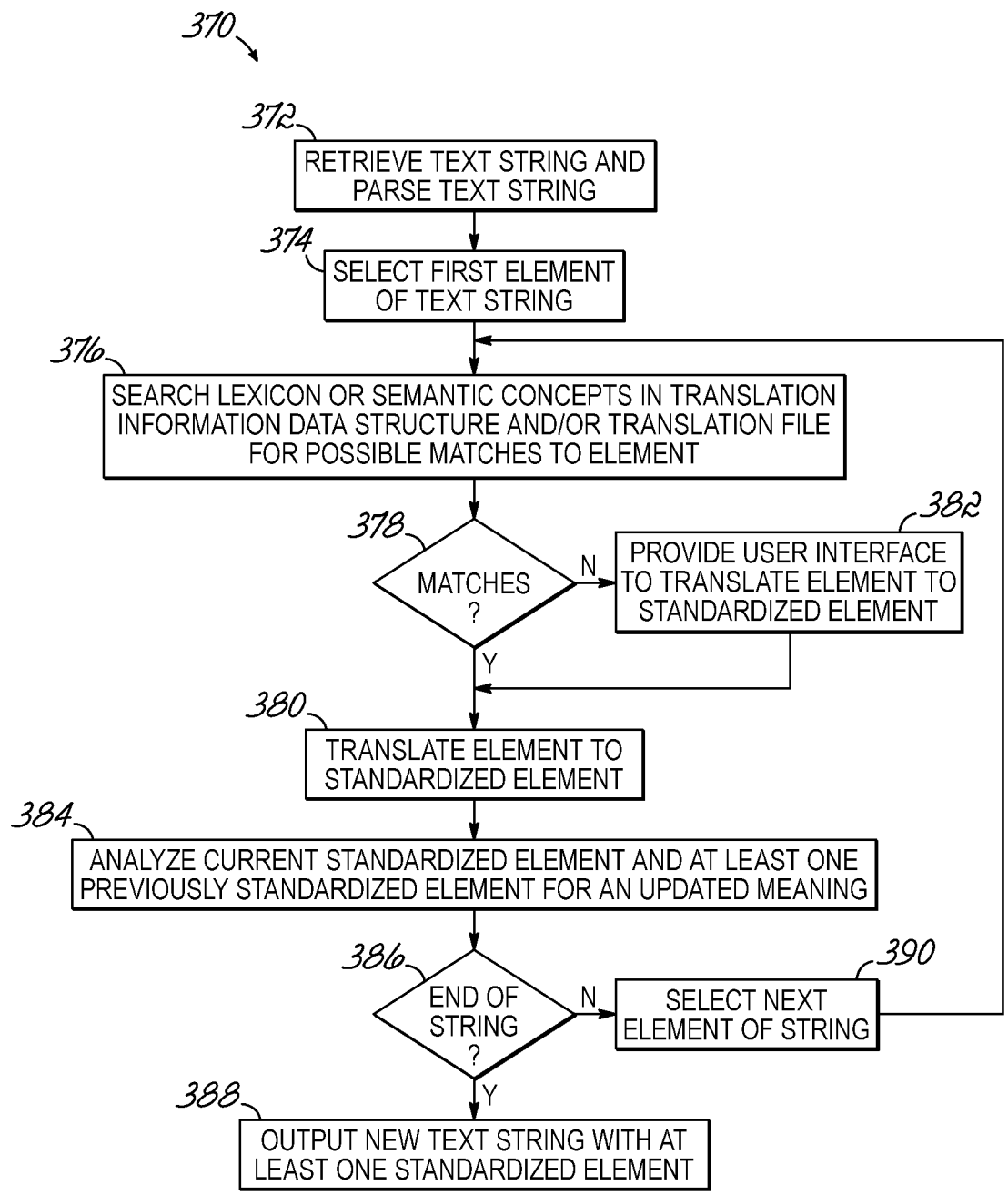
FIG. 18 is a flowchart illustrating a sequence of operations that may be executed by the application of FIG. 3 to standardize text strings associated with NDE data and/or inspection information.

FIG. 18 is a flowchart 370 illustrating in more detail the translation process 144 of FIG. 7. In response to determining that there is translatable information to translate, a text string of the translatable information is retrieved and parsed (block 372). In some embodiments, the text string is parsed by separating each element of the text string (e.g., each element of the text string separated by at least one space character). In this manner, the first element of the text string is selected (block 374) and a lexicon or other semantic concept in the translation information data structure and/or translate file is searched for that first element (block 376). When there is a match for the element ("Yes" branch of decision block 378) that element is automatically translated to the standardized element (block 380). When there is not a match ("No" branch of decision block 378) a user interface may be provided to translate the element to a standardized element (block 382) and the element may be translated to the standardized element manually (block 380).

In response to translating the element either manually or automatically, the most recently standardized element and at least one previously standardized element may be analyzed for an updated meaning (block 384). In particular, the most recently standardized element and at least one previously standardized element may be compared to the semantic concepts to determine if their meaning should be updated. The sequence of operations may then determine whether the end of the string has been reached (block 386). When the end of the string has been reached ("Yes" branch of decision block 386) a new text string with at least one standardized element is output (block 388). In particular, the new text string may be output and stored in inspection information associated with NDE data. When the end of the string has not been reached ("No" branch of decision block 386) the next element of the text string is selected (block 390) and the sequence of operations returns to block 376. It will be appreciated that the flowchart 370 may be repeated for at least a portion of translatable information associated with NDE data and/or inspection data associated therewith consistent with embodiments of the invention.

Figure 19:
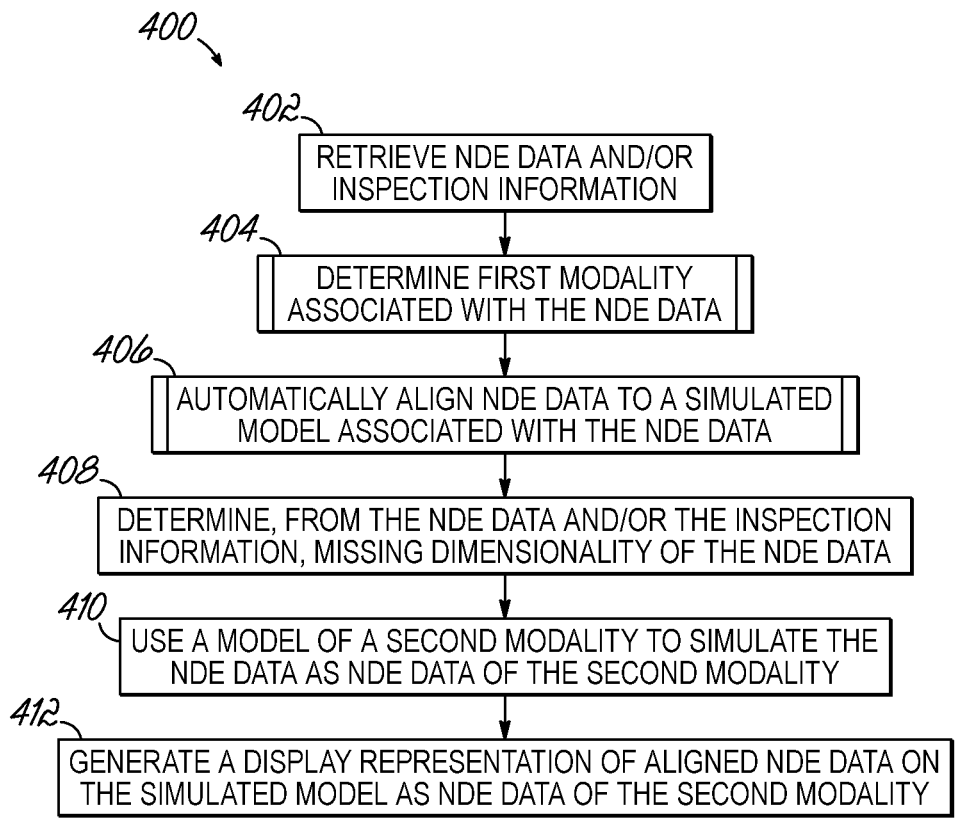
FIG. 19 is a flowchart illustrating a sequence of operations that may be executed by the application of FIG. 3 to display NDE data of a first modality as NDE data of a second modality.

FIG. 19 is a flowchart 400 illustrating a sequence of operations to display NDE data of a first modality as NDE data of a second modality consistent with embodiments of the invention. In particular, it may be useful to display the NDE data of the first modality as NDE data of the second modality for ease of users by users familiar and trained to interpret NDE data of the second modality. Thus, NDE data and/or inspection information associated therewith is retrieved (block 402) and the modality of the NDE data (e.g., the "first" modality) is determined (block 404). In an optional step, the NDE data may be automatically aligned to a simulated model associated therewith (block 406). Using a model of the NDE data collection device that collected the NDE data, the known structure of the at least a portion of the asset with which the NDE data is associated and/or data from the inspection information, a missing dimensionality of the NDE data may be determined (block 408). A model of a second modality to simulate the NDE data as NDE data of the second modality may be used (block 410) and a display representation of the aligned NDE data on the simulated model as NDE data of the second modality may be generated (block 412).

Figure 20:
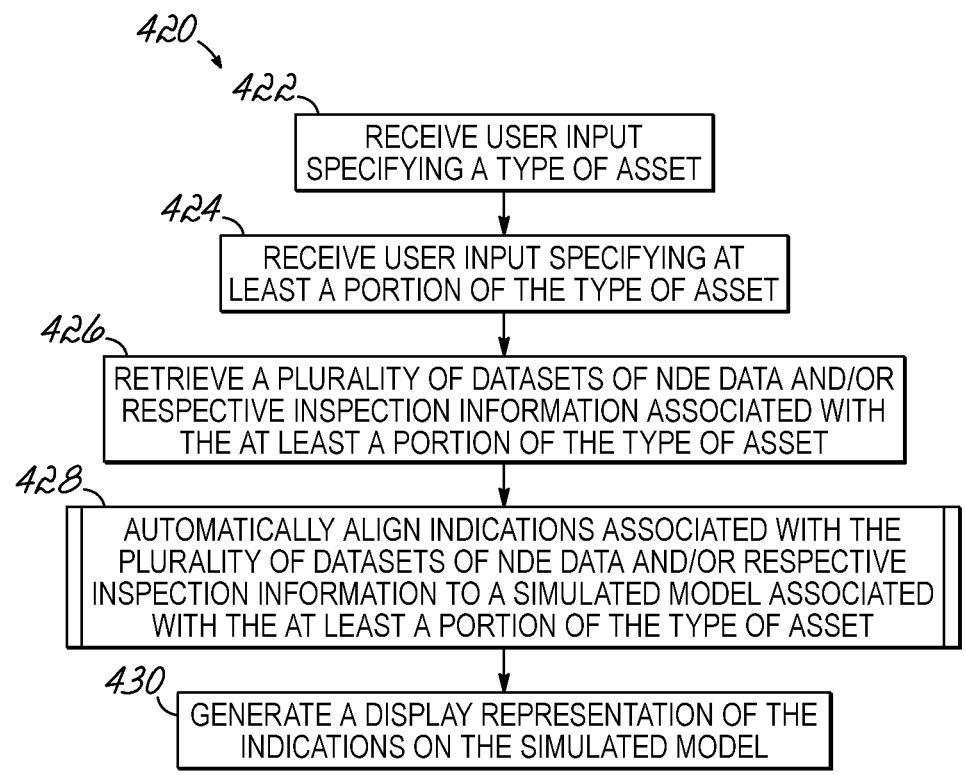
FIG. 20 is a flowchart illustrating a sequence of operations that may be executed by the application of FIG. 3 to display indications from a plurality of datasets of NDE data associated with a similar portion of a plurality of assets.

FIG. 20 is a flowchart 420 illustrating a sequence of operations to display indications from a plurality of datasets of NDE data associated with a similar portion of a plurality of assets consistent with embodiments of the invention. For example, user input specifying a type of asset is received (block 422) and user input specifying at least a portion of that type of asset is also received (block 424). In response to the specification of at least a portion of the type of asset, a plurality of datasets of NDE data and/or respective inspection information associated with the at least a portion of the type of asset may be retrived (block 426) and indications associated with the plurality of datasets of NDE data and/or respective inspection information may be automatically aligned to a simulated model associated with the at least a portion of the type of asset (block 428). As such, a display representation of the indications associated with the plurality of datasets of NDE data and/or the respective inspection information on the simulated model is generated (block 430).

For example, a user may wish to view indications associated with a population of a particular type of asset. The asset may be a tank, and the user may wish to view indications for all right front turret armor sections of a plurality of tanks. Thus, the user may specify a tank as the type of asset and the portion of the tanks (e.g., right front turret armor sections) that they wish to view indications for. The datasets of NDE data and inspection information associated with the right front turret armor sections of a plurality of tanks may be retrieved, and any indications therein automatically aligned to a simulated model of the right front turret armor sections of a tank. Thus, a display representation of the indications associated with the respective right front turret armor sections of a plurality of tanks may be displayed for the user to view potential population-wide problems, and any trends for indications of that particular population may be determined.

Figure 21:
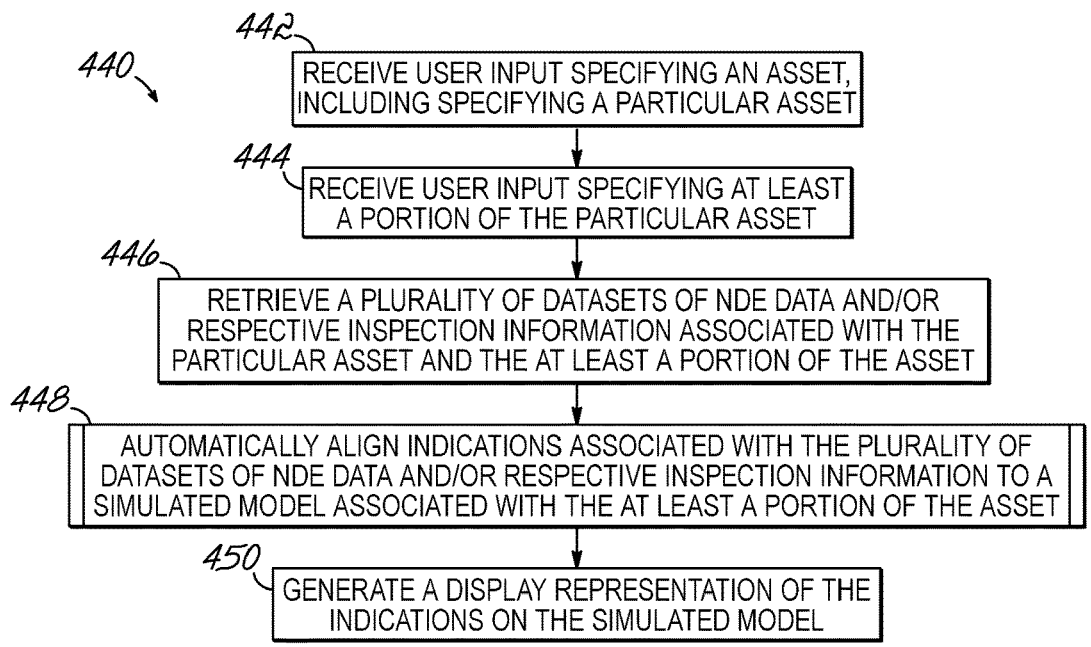
FIG. 21 is a flowchart illustrating a sequence of operations that may be executed by the application of FIG. 3 to display indications from a plurality of datasets of NDE data associated with at least a portion of a particular asset.

FIG. 21 is a flowchart 440 illustrating a sequence of operations to display indications from a plurality of datasets of NDE data associated with at least a portion of a particular asset consistent with embodiments of the invention. For example, user input specifying an asset, and specifically a particular asset, is received (block 442) and user input specifying at least a portion of the particular asset is also received (block 444). In some embodiments, the particular asset may be identified by a unique identification, such as a serial number of that particular asset. In response to the user input, a plurality of datasets of NDE data and/or respective inspection information associated with the at least a portion of the particular asset are retrieved (block 448) and a display representation of the indications associated with the plurality of datasets of NDE data and/or the respective inspection information on the simulated model is generated (block 450).

For example, a user may wish to view indications associated with a particular asset. The asset may be a particular tank, and the user may wish to view indications for the right front turret armor section of that tank. Thus, the user may specify the tank by serial number and the portion of the tank (e.g., right front turret armor section) that they wish to view indications for. The datasets of NDE data and inspection information associated with the right front turret armor section of the particular tank may be retrieved, and any indications therein automatically aligned to a simulated model of the right front turret armor section of that type of tank. Thus, a display representation of the indications associated with the respective right front turret armor section of a particular tank may be displayed for the user to view potential problems of that tank, and any trends in indications for that particular tank may be determined.

Figure 22:
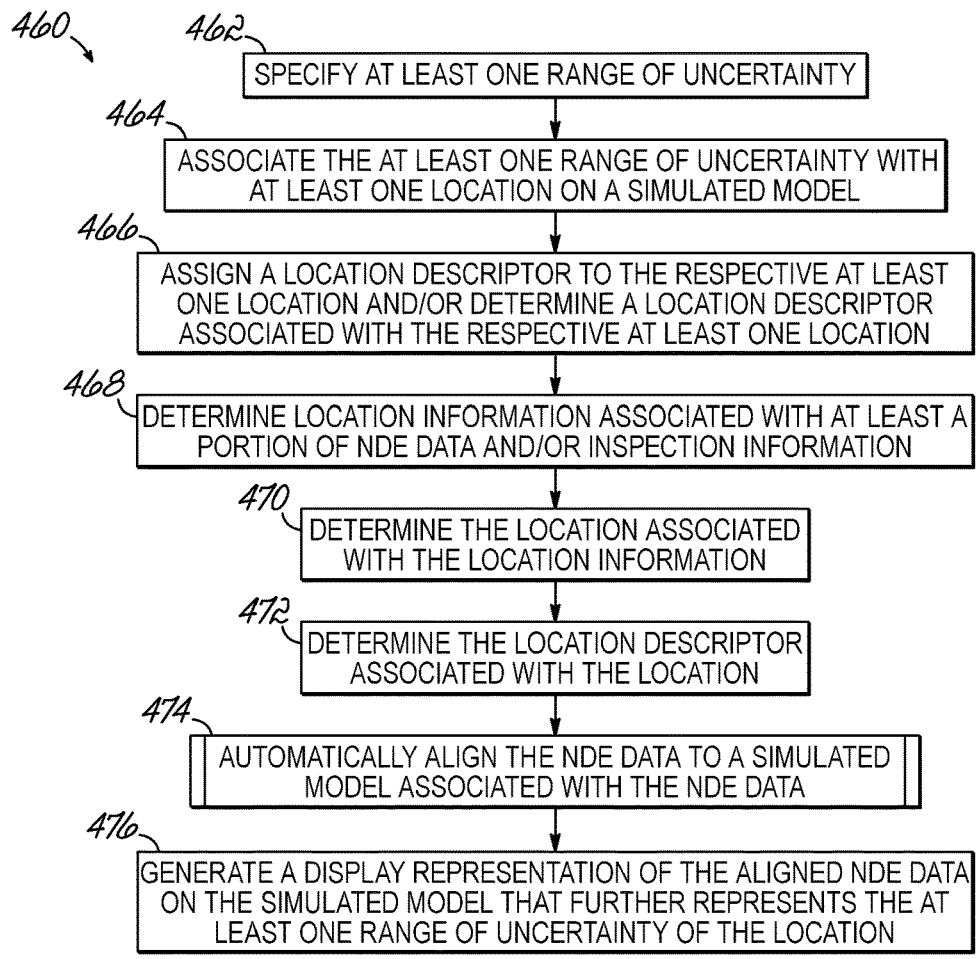
FIG. 22 is a flowchart illustrating a sequence of operations that may be executed by the application of FIG. 3 to determine the uncertainty of a location on a simulated model.

FIG. 22 is a flowchart 460 illustrating a sequence of operations to determine uncertainty of a location on a simulated model consistent with embodiments of the invention. In particular, the sequence of operations 460 may be used to specify a range of uncertainty of a location, such as the location of an indication. As such, at least one range of uncertainty may be specified (block 462) and that at least one range of uncertainty may be associated with at least one location on a simulated model (block 464). For example, the range of uncertainty for a particular location may be associated with a portion of an asset or a sub-portion thereof. More specifically, and also for uncertainty, the range of uncertainty for an axle beam of a landing gear on an aircraft may include a first range for the axle beam itself, a second range for the axle beam and couplers of the axle beam to a tire, or the entire axle beam assembly in which that axle beam is disposed. Alternatively, the range of uncertainty may be specified as a probability distribution function such that the further from the center of the location, the smaller the probability of the location being encompassed in the probability distribution function. Alternatively, the uncertainty may not be specified, and instead may be determined from at least one of the inspection information associated with NDE data, the modality of NDE data, and/or the alignment of the NDE data to the simulated model.

In response to associating the at least one range of uncertainty with at least one location on a simulated model, a location descriptor is assigned to the respective at least one location and/or a location descriptor previously associated with the respective at least one location is determined (block 466). Thus, and in some embodiments, various ranges of uncertainty may be associated with various locations, and thus various location descriptors, on a simulated model. Also in this manner, an indication specifying a location on the simulated model may be automatically associated with not only a location descriptor but also a range of uncertainty. For example, location information associated with at least a portion of NDE data and/or location information may be determined (block 468). In particular, the location information may be determined in response to receiving the NDE data and/or location information. In response to determining the location information, a location associated with the location information may be determined (block 472) and, in response to determining the location, a location descriptor associated with the location may be determined (block 472). As such, the NDE data may be automatically aligned to a simulated model associated with the NDE data (block 474) and a display representation of the aligned NDE data on the simulated model that includes the at least one range of uncertainty of the location may be generated (block 476).

Figure 23:
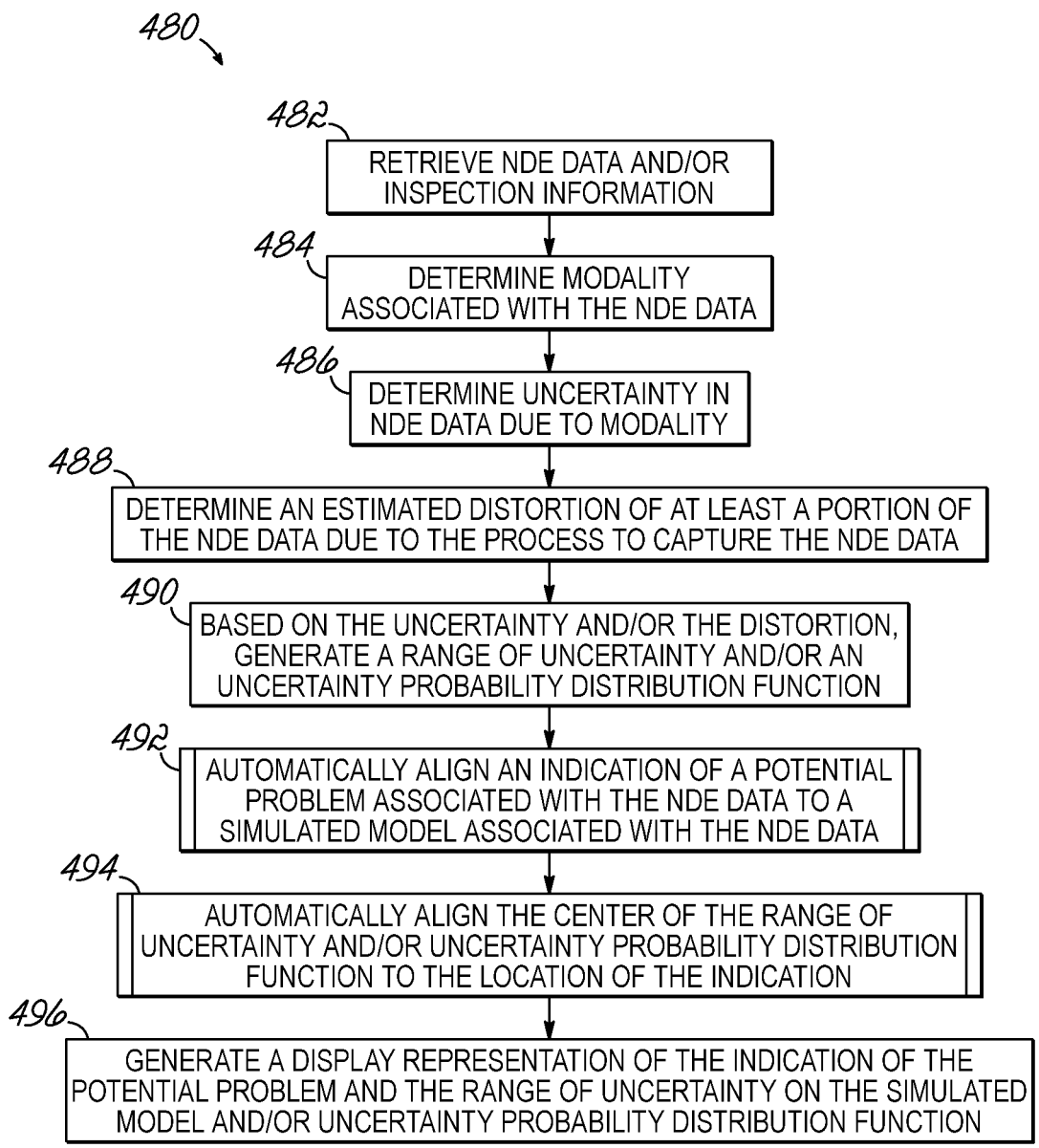
FIG. 23 is a flowchart illustrating a sequence of operations that may be executed by the application of FIG. 3 to determine the uncertainty of a location on a simulated model due to the inspection process, and in particular due to the various modalities associated with NDE data.

FIG. 23 is a flowchart 480 illustrating a sequence of operations to determine uncertainty of a location on a simulated model due to the inspection process, and particular due to the various modalities associated with NDE data, consistent with embodiments of the invention. In particular, it may be useful to display a range of uncertainty associated with a particular modality of NDE data, or otherwise display a range of uncertainty associated with the capture of NDE data with an NDE data collection device. Thus, NDE data and/or inspection information associated therewith is retrieved (block 482) and the modality of the NDE data is determined (block 484). Thereafter, an uncertainty (e.g., a range of uncertainty) in the NDE data due to the modality of the NDE data may be determined (block 486) and an estimated distortion of at least a portion of the NDE data due to the process to capture the NDE data may be determined (block 488). In some embodiments, the uncertainty in the NDE data due to the modality of the NDE data is specified by a user. Alternatively, the uncertainty in the NDE data due to the modality of the NDE data may be retrieved from a previous specification by the user. The distortion, however, may be determined by how NDE data is captured. For example, NDE data may be two-dimensional NDE data captured from a three-dimensional portion of an asset. Thus, there is distortion between the two-dimensional NDE data and the simulated model associated therewith. Thus, the distortion and/or the uncertainty may be used to generate a range of uncertainty and/or an uncertainty probability distribution function associated with that NDE data (block 490).

After determining the range of uncertainty and/or the uncertainty probability distribution function associated with NDE data, an indication of a potential problem associated with the NDE data may be automatically aligned to a simulated model associated with the NDE data (block 492) and the center of the range of uncertainty and/or the uncertainty probability distribution function may be automatically aligned to the location of the indication (block 494). Thus, the location of the indication as well as the range of uncertainty and/or the uncertainty probability distribution function associated with the location of the indication may be generated on a display representation (496). In this manner, the uncertainty in the location of an indication due to the capture of the NDE data with the NDE data collection device may be determined and displayed.

Figure 24:
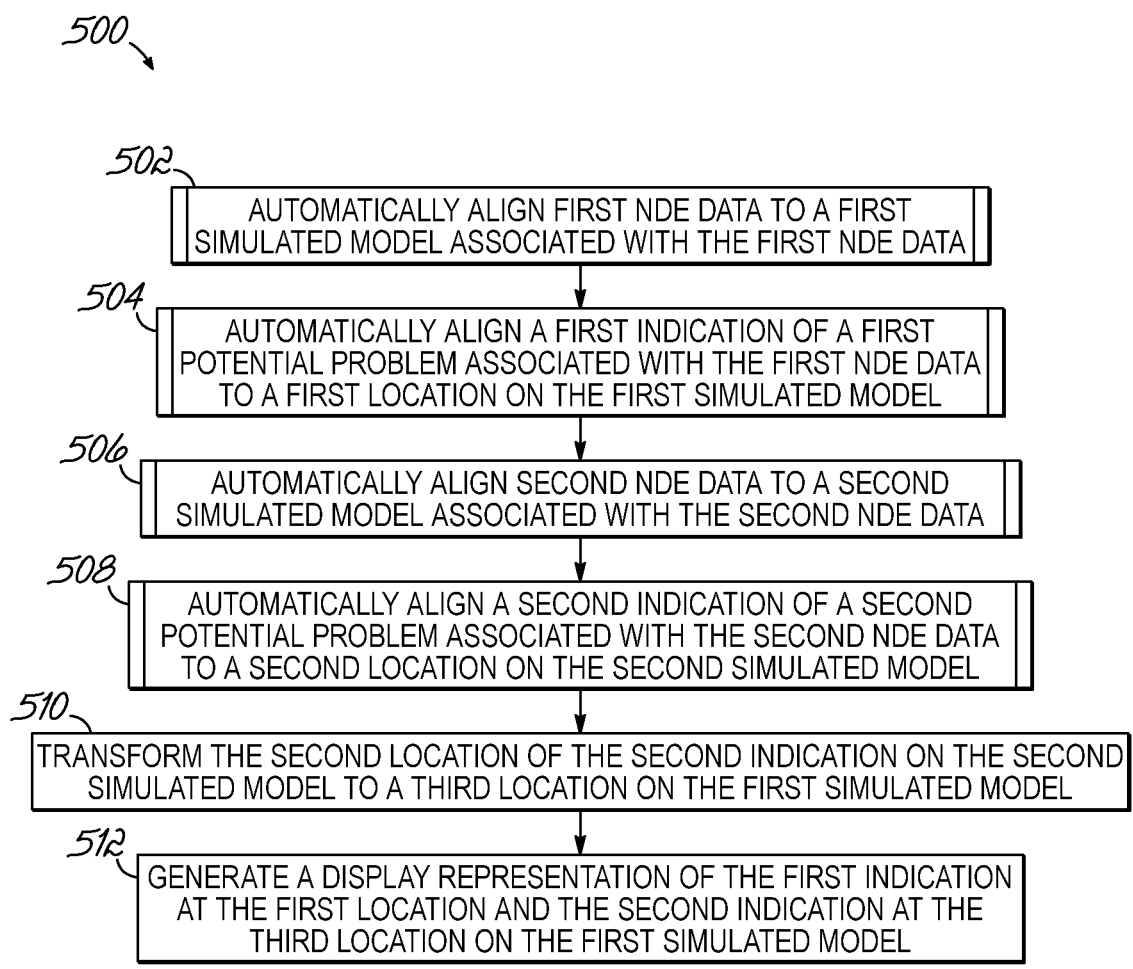
FIG. 24 is a flowchart illustrating a sequence of operations that may be executed by the application of FIG. 3 to display a plurality of indications of portions of at least one asset that are substantially structurally similar, but that may be located at different locations on the at least one asset or that are oriented in different manners respective to each other.

FIG. 24 is a flowchart 500 illustrating a sequence of operations to display a plurality of indications of portions of at least one asset that are substantially structurally similar, but that may be located at different locations on the at least one asset or that are oriented in different manners respective to each other. For example, the sequence of operations 500 may be used to display a first and second indication associated with a respective first and second wing (e.g., of the same or different assets) on a simulated model of the first wing by transforming the location of the second indication on the second wing into a location on the first wing. Thus, first NDE data is automatically aligned to a first simulated model associated with the first NDE data (block 502) and a first indication associated with the first NDE data is automatically aligned to a first location on the first simulated model (block 504). Similarly, second NDE data is automatically aligned to a second simulated model associated with the second NDE data (block 506) and a second indication associated with the second NDE data is automatically aligned to a second location on the second simulated model (block 508). The second location of the second indication on the second simulated model is then transformed to a corresponding third location on the first simulated model (block 510). For example, when the first NDE data is NDE data from a right wing of an asset and the second NDE data is NDE data from a left wing of the asset, the transformation between the simulated models associated with the respective first and second NDE data may include a mirror reflection transformation between the simulated models associated with the respective first and second NDE data. Also for example, the transformation may include transforming a location across at least one axis of transformation between the simulated model associated with the respective first and second NDE data. A display representation of the first indication at the first location on the first simulated model, as well as the second indication at the third location on the first simulated model, is then generated (block 512). In this manner, indications of portions of at least one asset that are substantially structurally similar but otherwise oriented in different manner respective to each other may be viewed on a single simulated model. Thus, a user may view trends for at least two different portions of at least one asset on one simulated model.

Figure 25:
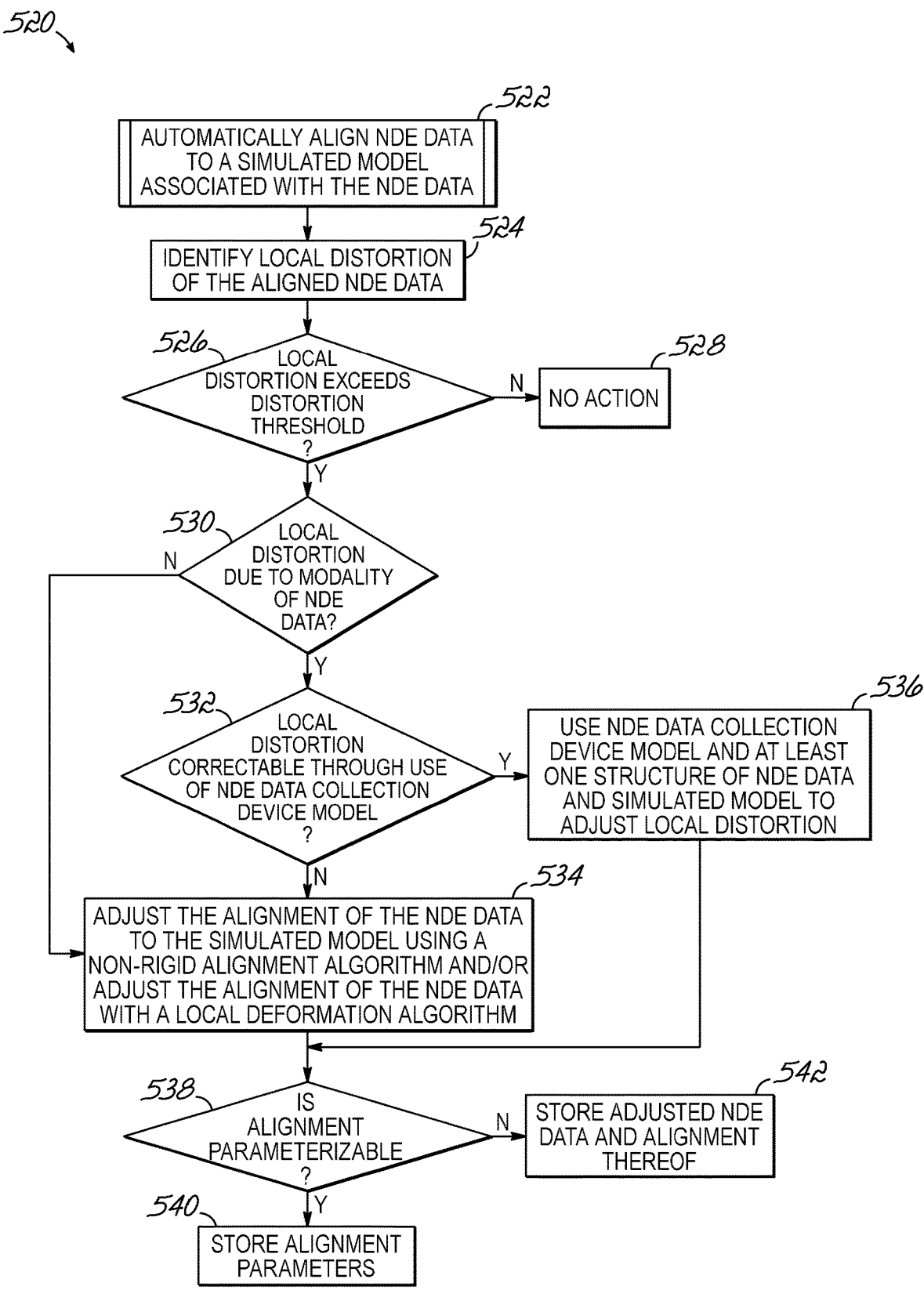
FIG. 25 is a flowchart illustrating a sequence of operations that may be executed by the application of FIG. 3 to locally deform at least a portion of NDE data.

FIG. 25 is a flowchart 520 illustrating a sequence of operations to locally deform at least a portion of the NDE data. Initially, NDE data may be automatically aligned to a simulated model associated with the NDE data with an alignment algorithm that rigidly attempts to align the NDE data with the simulated model (e.g., a "rigid" alignment algorithm that only rotates, translates and/or scales NDE data) (block 522). For example, and not intending to be limiting, a rigid alignment algorithm may attempt to align the NDE data to the simulated model based on matching at least one straight-line section of the NDE data to at least one corresponding straight-line section on the simulated model regardless of other portions of the NDE data. However, the alignment of a portion of the NDE data may be slightly distorted in relation to the simulated model and/or the asset. In particular, the NDE data may be slightly distorted due to the manner in which that NDE data is captured from the asset, human error and/or the NDE data collection device used to capture the NDE data, for a few examples. As such, local distortion of the aligned NDE data may be identified (e.g., the local distortion between at least one and/or all portions of the NDE data that were not used to align the NDE data) (block 524) and it may be determined whether that local distortion exceeds a distortion threshold for distortion (block 526). When the local distortion (e.g., the local distortion of at least one and/or all portions of the NDE data that were not used to align the NDE data) does not exceed a distortion threshold ("No" branch of decision block 526) no action may be taken (block 528). However, when the local distortion exceeds the distortion threshold ("Yes" branch of decision block 528), the local distortion may be analyzed to determine if that local distortion is due to the modality of the NDE data (block 530). When the local distortion is due to the modality of the NDE data ("Yes" branch of decision block 530), the local distortion may be analyzed to determine if the local distortion is correctable through the use of a model of the NDE data collection device used to capture the NDE data (block 532). When the local distortion is not correctable through the use of the model of the NDE data collection device used to capture the NDE data ("No" branch of decision block 532), the NDE data may be automatically re-aligned to the simulated model using an alignment algorithm that does not rigidly attempt to align the NDE data with the simulated model (e.g., a "non-rigid" alignment algorithm) and/or the aligned NDE data may be adjusted with a local deformation algorithm (block 534).

In some embodiments, the non-rigid alignment algorithm attempts to align at least two portions of NDE data with at least two corresponding portions of a simulated model associated with the NDE data. The non-rigid alignment algorithm may include at least one local deformation algorithm that may be used when a first portion of the NDE data aligns with the simulated model but a second portion does not. Thus, the alignment algorithm may utilize the local deformation algorithm on the second portion and/or the first portion in an attempt to align the NDE data to the simulated model. In alternative embodiments, a local deformation algorithm is utilized to align at least a portion of aligned NDE data to the simulated model to reduce local distortion. As such, the local deformation algorithm may be applied to at least one portion of the NDE data to more closely align that at least one portion to the simulated model. Returning to block 530, when the local distortion is not due to the modality of the NDE data ("No" branch of decision block 530), the NDE data may be automatically re-aligned to the simulated model using the non-rigid alignment algorithm and/or the aligned NDE data may be adjusted with a local deformation algorithm (block 534). In some embodiments, the non-rigid alignment algorithm is utilized to re-align the NDE data to the simulated model (block 534) when the alignment algorithm used in block 522 is a rigid alignment algorithm. In corresponding embodiments, the local deformation algorithm is used to adjust the aligned NDE data (block 534) when the alignment algorithm used in block 522 is a non-rigid alignment algorithm.

Returning to block 532, when the local distortion is correctable through the use of the NDE data collection device model ("Yes" branch of decision block 532), the model of the NDE data collection device and at least one structure of the NDE data and simulated model (e.g., at least one structure of the at least a portion of the asset that is associated with both the NDE data and the simulated model) may be used to adjust the local distortion of the NDE data (block 536). In some embodiments, the model of the NDE data collection device includes at least one parameter to adjust NDE data associated with the respective modality of NDE data captured with that NDE data collection device. Thus, the alignment of a portion of the NDE data to the simulated model may be adjusted using the NDE data collection device model and at least one known structure common to the NDE data and the simulated model to correct local distortion.

In response to automatically re-aligning the NDE data to the simulated model using a non-rigid alignment algorithm (block 534), adjusting the aligned NDE data with a local deformation algorithm (block 534), or using the NDE data collection device model and at least one known structure of the NDE data and the simulated model to adjust local distortion (block 536), the alignment of the NDE data to the simulated model may be analyzed to determine if the alignment is parameterizable (e.g., whether the alignment of the NDE data to the simulated model can be expressed through at least one parameter to align subsequent NDE data to the simulated model) (block 538). When the alignment of the NDE data to the simulated model is parameterizable ("Yes" branch of decision block 538) the alignment parameters for that alignment of the NDE data to the simulated model are stored (block 540). When the alignment of the NDE data to the simulated model is not parameterizable (e.g., such as when a portion of the NDE data is adjusted in blocks 534 or 536) ("No" branch of decision block 538) the adjusted NDE data itself, as well as the alignment of that adjusted NDE data, are stored (block 542).

Further details and embodiments of the present invention will be described by way of the following examples.

Example 1

Figure 26:
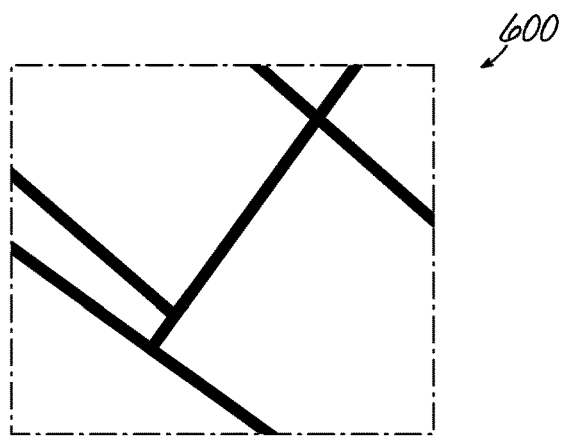
FIG. 26 is a display representation of at least a portion of a dataset of NDE data consistent with embodiments of the invention.
Figure 27:
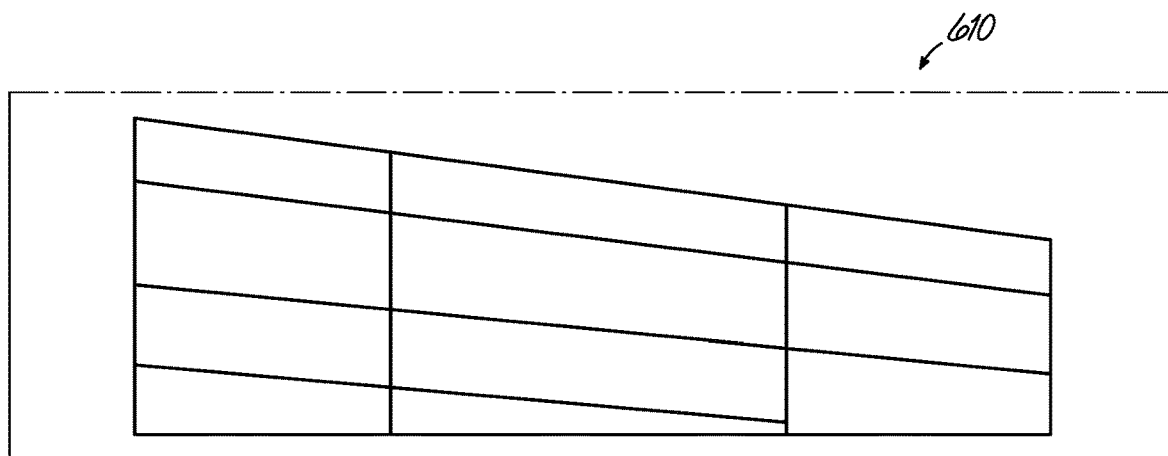
FIG. 27 is a display representation of a simulated model consistent with embodiments of the invention.
Figure 28:
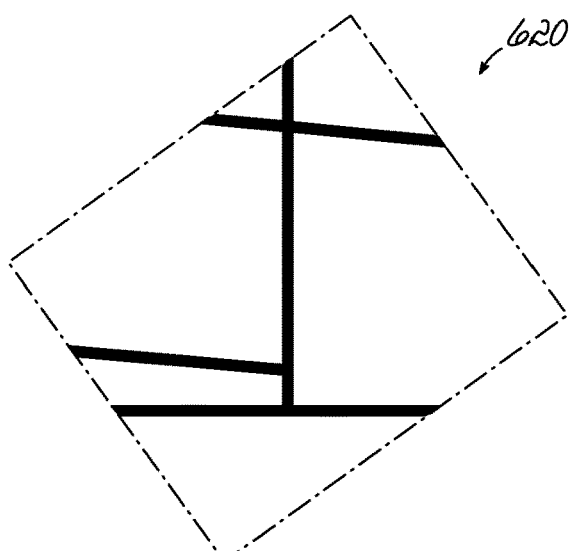
FIG. 28 is a display representation of the NDE data of FIG. 26 rotated to align with the simulated model of FIG. 27.
Figure 29:
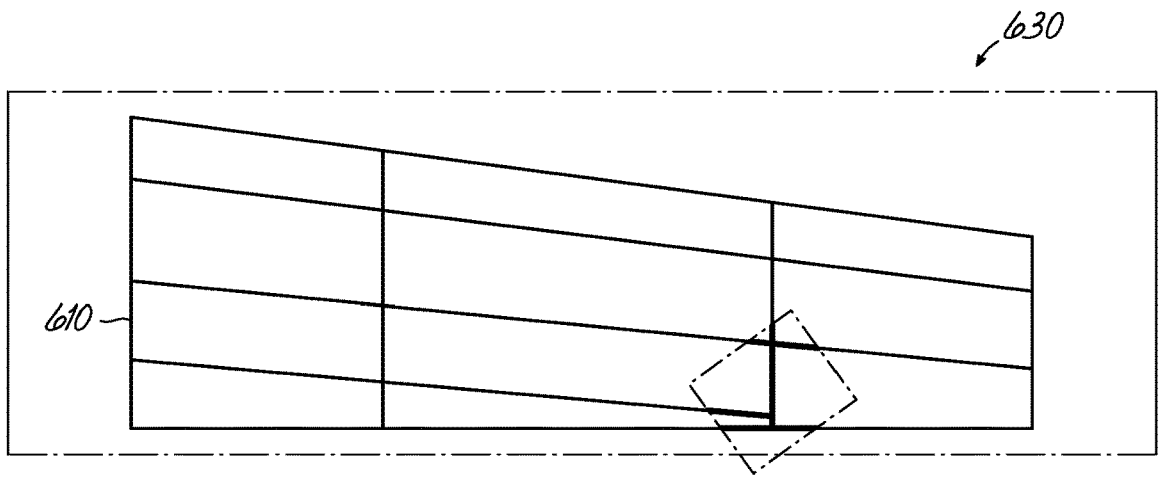
FIG. 29 is a display representation of the aligned NDE data of FIG. 28 on the simulated model of FIG. 27.

By way of example, FIG. 26 illustrates a display representation of at least a portion of a dataset of NDE data 600 that may be captured consistent with embodiments of the invention. In particular, the NDE data 600 of FIG. 26 may be captured from at least a portion of an asset, and for this example may be captured from at least a portion of a right wing of an aircraft. FIG. 27 illustrates a display representation of a simulated model 610 of that right wing of the aircraft. Consistent with embodiments of the invention, it may be advantageous to align the NDE data 600 on the simulated model 610. As such, an alignment algorithm to align the NDE data 600 to the simulated model 610 may be determined from the NDE data 600 and/or inspection information associated therewith. The NDE data 600 may then be automatically aligned to the simulated model 610 with that alignment algorithm. FIG. 28 illustrates a display representation of aligned NDE data 620, and in particular illustrates the NDE data 600 of FIG. 26 rotated to align with the simulated model 610 of FIG. 27. FIG. 29 is a display representation 630 that visually represents the aligned NDE data 620 of FIG. 28 on the simulated model 610 of FIG. 27.

It will be appreciated by one having skill in the art that a plurality of datasets of NDE data may be automatically aligned with the simulated model 610 without departing from the scope of the invention. Subsequently, a display representation of the plurality of aligned datasets of NDE data on the simulated model may be generated. Thus, first and second NDE data may be received, a first alignment algorithm to align the first and second NDE data to the simulated model may be determined, and the first and second NDE data may be automatically aligned to the simulated model. A display representation of the simulated model with the first and second NDE data may be generated. In some embodiments, a second alignment algorithm to align the second NDE data may be determined and the second NDE data may be automatically aligned to the simulated model. In those embodiments, the display representation of the simulated model with the first and second NDE data may still be generated.

Example 2

Figure 30:
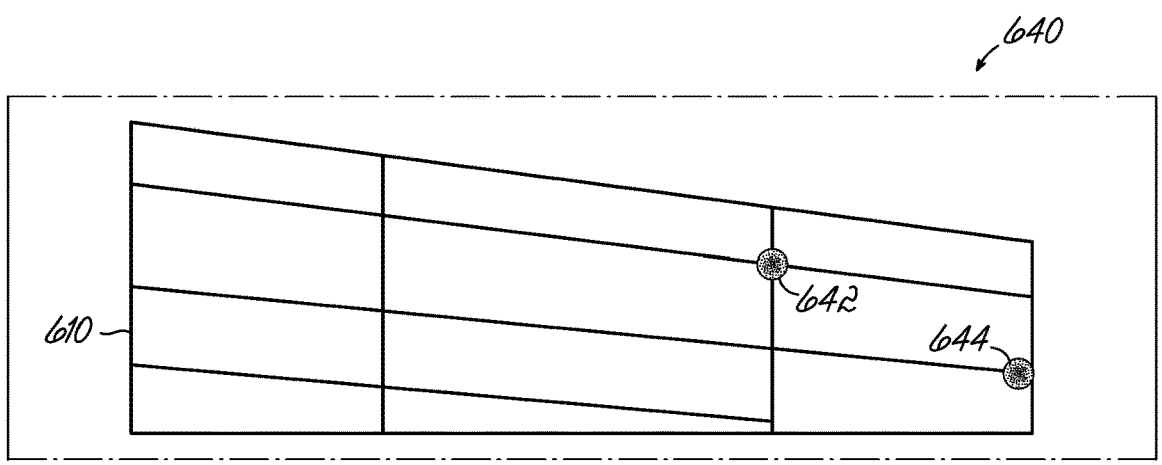
FIG. 30 is a display representation that illustrates an uncertainty of a determined location for an indication on the simulated model of FIG. 27 by displaying a probability density of the location at the location.

Due to the capture and transformation of NDE data, the exact location of an indication may be unknown, and the approximate location of an indication may be represented. By way of example, FIG. 30 illustrates a display representation 640 that illustrates uncertainty of a determined location for an indication on a simulated model 610. The display representation 640 visually represents two indications as at 642 and 644, and more specifically illustrates a probability density as at 642 and 644 of a distance from the determined location for the indication. Simply put, the closer to the center of the probability density 642 and/or 644 (e.g., which may be a Gaussian distribution density), the more likely that is the actual location of the indication. For example, NDE data and/or inspection information may indicate the location of an indication. The location of the indication may thus be indicated as a point on the simulated model 610 and/or a probability density 642, 644 at the point. In this manner, relative locations of indications may be determined.

Figure 31:
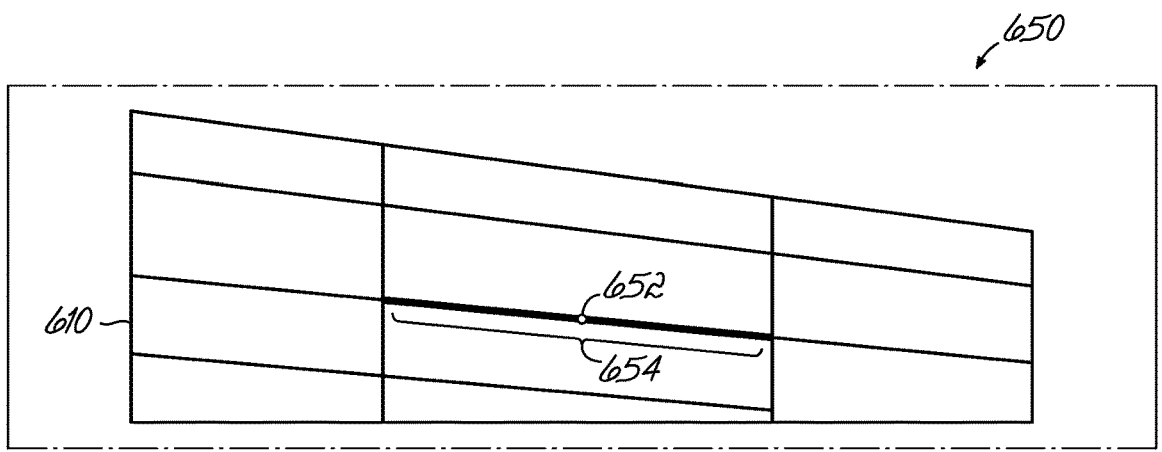
FIG. 31 is a display representation that illustrates an uncertainty of a determined location for an indication on the simulated model of FIG. 27 by adjusting a color component of at least a portion of the simulated model at the location.

Similarly, and by way of an alternative example, FIG. 31 illustrates a display representation 650 that illustrates an uncertainty of a determined location for an indication on a simulated model 610. The display representation 650 visually represents an indication as at 652, and more specifically illustrates that at least a portion 654 of the simulated model 610 may be highlighted to indicate that the portion 654 is associated with an uncertainty of the exact location for the indication 652. Specifically, a color component of at least a portion 654 of the simulated model 610 may be adjusted to indicate that the portion 654 is associated with an uncertainty of the exact location for the indication 652. For example, NDE data and/or inspection information may indicate the location of an indication. The location of the indication may thus be indicated as a point 652 on the simulated model 610 and/or as a portion 654 of the simulated model 610.

Example 3

Figure 32:
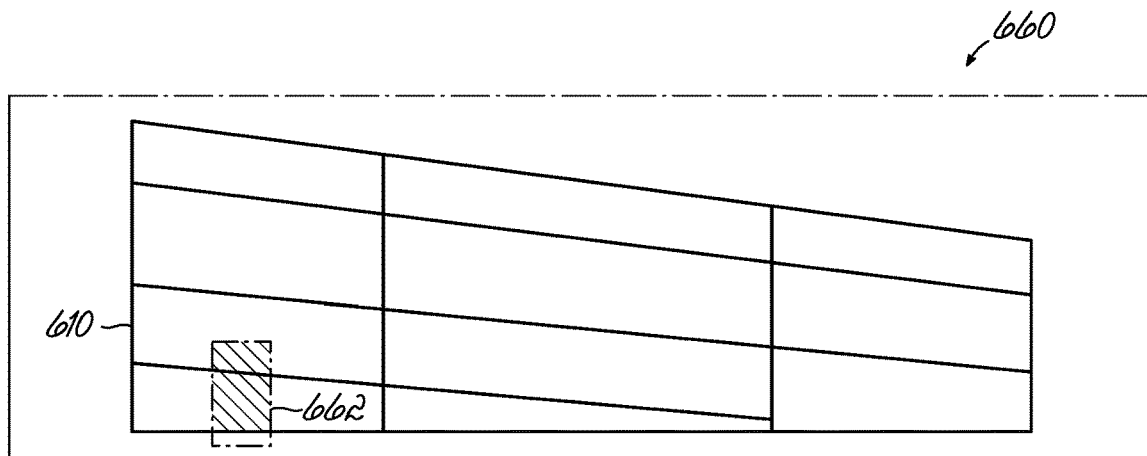
FIG. 32 is a display representation that illustrates a display representation of the simulated model of FIG. 27 in which a color component of at least a portion of a background of the display representation has been adjusted to indicate a lapse in coverage of aligned NDE data with the simulated model.
Figure 33:
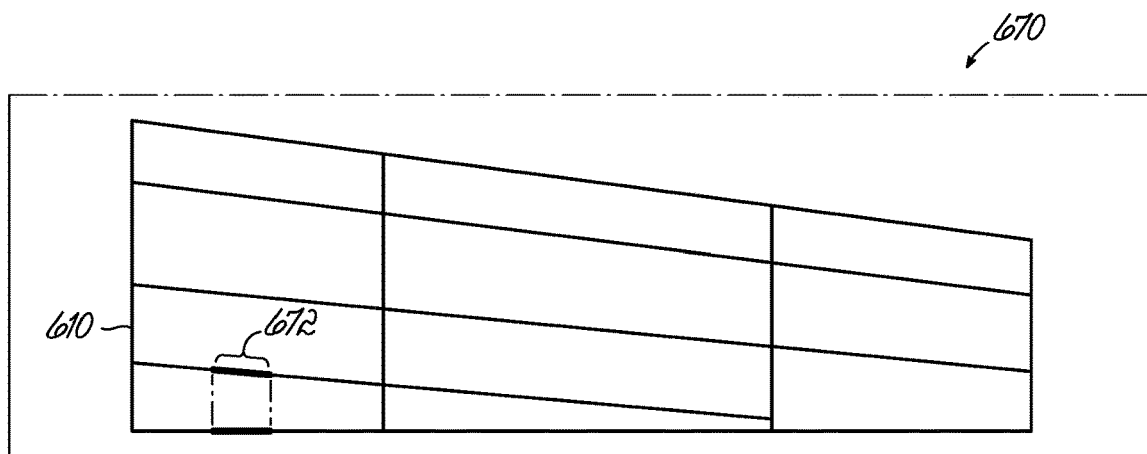
FIG. 33 is a display representation that illustrates a display representation 670 in which a color component of at least a portion of the simulated model of FIG. 27 has been adjusted to indicate a lapse in coverage of aligned NDE data with the simulated model.

During inspection of an asset, at least a portion of NDE data for the asset may not be captured, leading to lapses in coverage. For example, an inspection may involve capturing a plurality of datasets of NDE data from a plurality of portions of an asset. In some embodiments, the inspection involves capturing NDE data from overlapping portions of an asset. However, when a portion of the asset is not captured, there is a lapse of coverage of the asset. As such, embodiments of the invention are configured to indicate that at least a portion of the simulated model is not aligned with NDE data. By way of example, FIG. 32 illustrates a display representation 660 of the simulated model 610 in which at least a portion of the display representation 662, and specifically at least a portion of the background thereof, has been highlighted to indicate a lapse in coverage of aligned NDE data with the simulated model 610. In specific embodiments, the color component of the portion of the display representation 662 that aligned NDE data on the simulated model 610 is supposed to cover, but that is otherwise not covered, may be adjusted. In this manner, the lapse in coverage may be easily located. By way of alternative example, FIG. 33 illustrates a display representation 670 in which at least a portion 672 of the simulated model 610 has been highlighted to indicate a lapse in coverage of aligned NDE data with the simulated model 610. In specific embodiments, the color component of the portion 672 of the simulated model 610 may be adjusted.

Example 4

Figure 34:
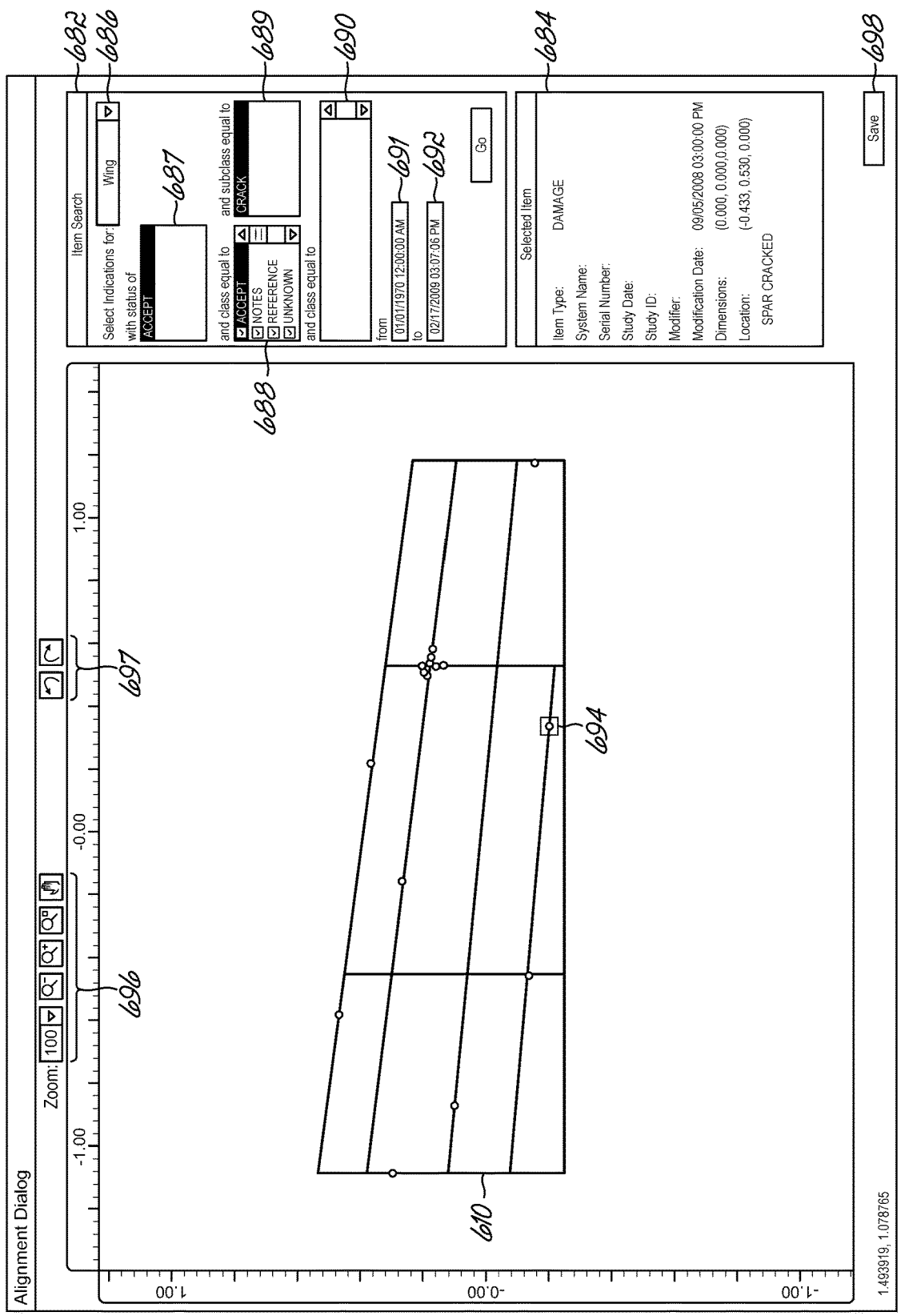
FIG. 34 is a display representation of the simulated model of FIG. 27 in which a plurality of indications have been visually represented.

In some embodiments, it may be advantageous to illustrate a plurality of indications of a plurality of portions of the same type of asset, such as indicate a plurality of indications of a right wing of a fleet of similar aircraft. As such, embodiments of the invention are configured to determine at least one indication, and a location thereof, associated with NDE data and/or inspection information from the plurality of portions of the same type of asset. Embodiments of the invention are further configured to visually represent that at least one indication on the NDE data of the plurality of portions of the same type of asset and/or visually represent that at least one indication on a simulated model associated with the plurality of portions of the same type of asset. Indications may be searched and/or selectively filtered and a display representation may visually represent the searched and/or selectively filtered indications. By way of example, FIG. 34 illustrates a display representation 680 of the simulated model 610 in which a plurality of indications have been visually represented. The plurality of indications may be from a plurality of portions of the same type of asset, and thus illustrated on the simulated model 610 associated with that portion of the same type of asset. Specifically, the display representation 680 illustrates a search and filter component 682 (hereinafter, "search/filer" component 682) and a selected indication information component 684. In some embodiments, the user may interact with the search/filter component 682 to search through and/or selectively filter the plurality of indications. At least one searched and/or filtered indication may then be displayed. As illustrated in FIG. 34, the search/filter component 682 includes selectable components 686-689 (e.g., components that search and/or filter indications based on that selection) as well as specifiable components 690-692 (e.g., components that search and/or filter indications based on the data entered into those components).

As illustrated in FIG. 34, the selected indication information component 684 illustrates information associated with a selected indication as at 694. It will be appreciated that the selected indication information component 684 may populate information fields with information from the NDE data and/or inspection information associated with the selected indication 694 automatically in response to user interaction to select the selected indication 694. In addition to the search/filter component 682 and the selected indication information component 684, the display representation 680 may also include controls 696-697 to enlarge, reduce, pan and/or rotate the visual representation of the simulated model 610 and the indications. A button to save the current alignment, including saving the current zoom level, rotation, searched and/or filtered indications, as well as other alignment information, may be provided as at 698.

Example 5

Figure 35:
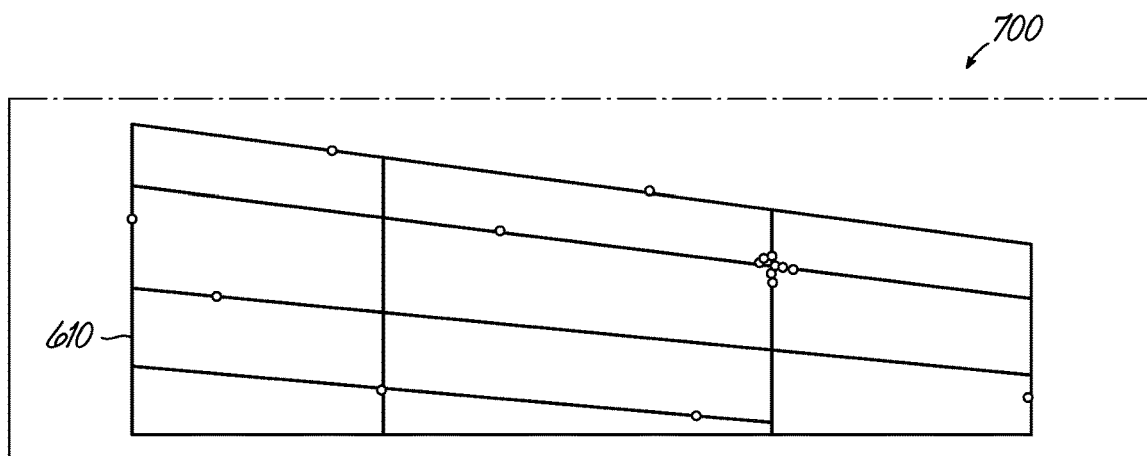
FIG. 35 is a display representation of the simulated model of FIG. 27 in which a first plurality of indications have been visually represented.
Figure 36:
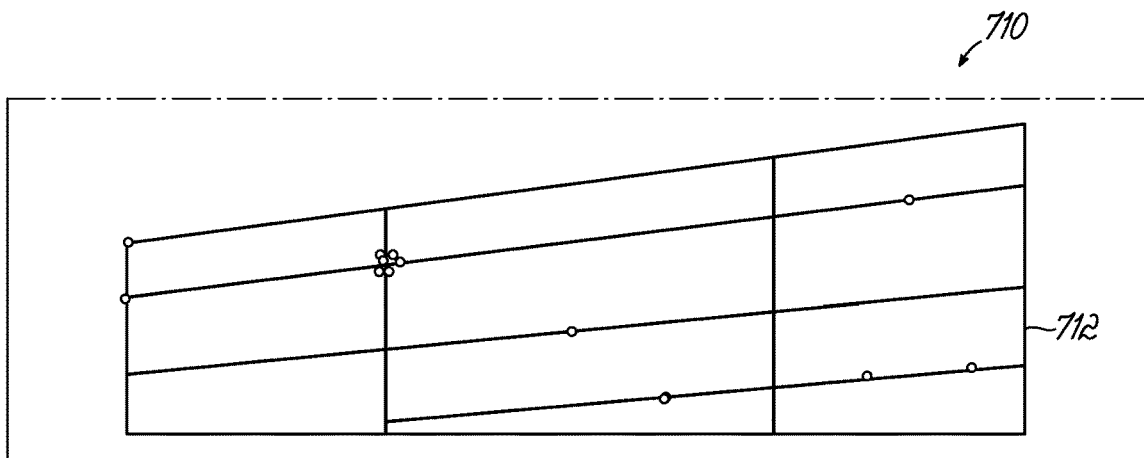
FIG. 36 is a display representation of a second simulated model in which a second plurality of indications have been visually represented consistent with embodiments of the invention.
Figure 37:
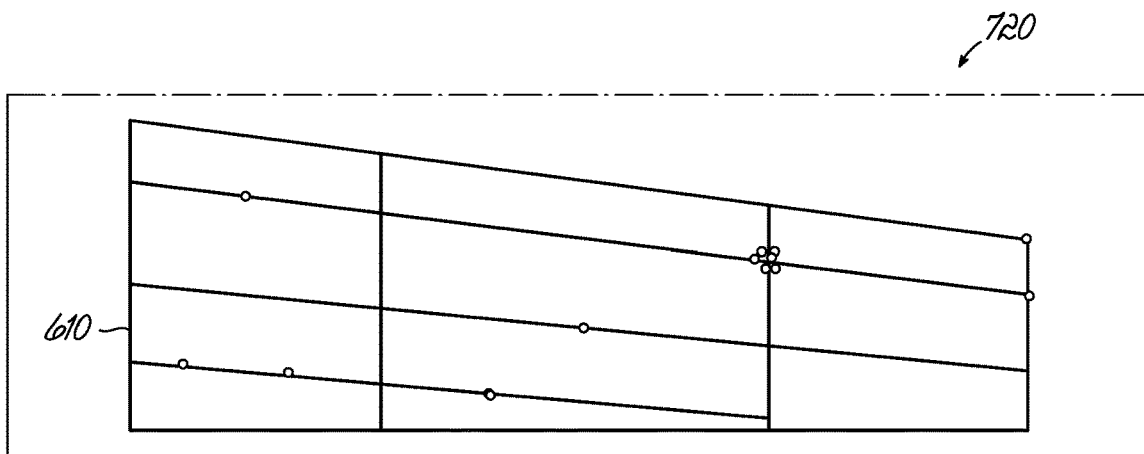
FIG. 37 is a display representation of the second plurality of indications visually represented on the simulated model of FIG. 27.
Figure 38:
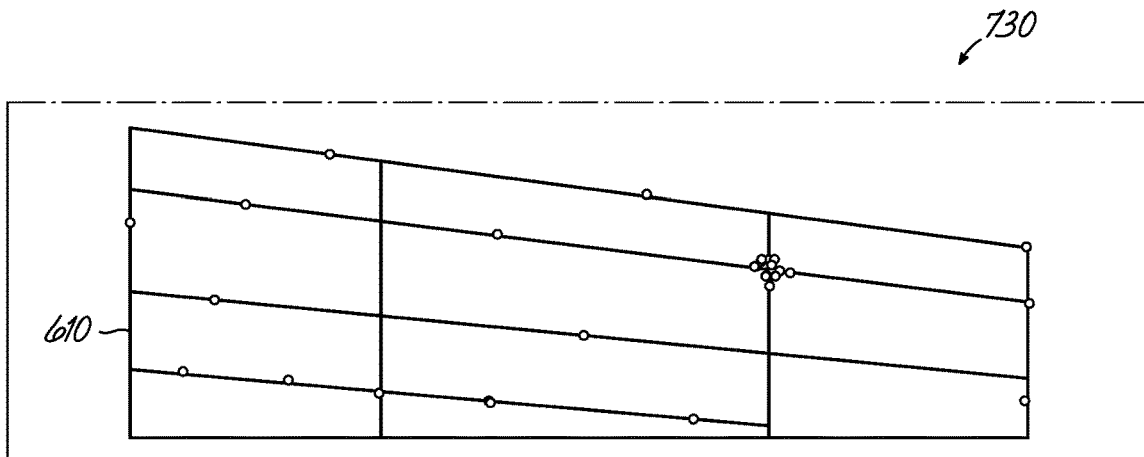
FIG. 38 is a display representation of the first plurality of indications of FIG. 35 and the second plurality of indications of FIG. 37 visually represented on the simulated model of FIG. 27.

In some embodiments, it may be advantageous to translate the location of at least one indication associated with a first part of an asset to a substantially symmetrical location on a second part of an asset, the second part of the asset being substantially symmetrical to the first part of the asset. For example, it may be advantageous to view indications associated with a left wing and a right wing on a simulated model of either the left or right wings. By way of example, FIG. 35 is a display representation 700 of the simulated model 610 in which a first plurality of indications have been visually represented. The simulated model 610 of FIG. 35 is associated with right wing of an aircraft. FIG. 36, on the other hand, is a display representation 710 of a simulated model 712 in which a second plurality of indications have been visually represented. The simulated model 712 of FIG. 36 is associated with a left wing of an aircraft. It may be advantageous to view the first and second plurality of indications on the same simulated model. As such, the locations for each of the second plurality of indications on the simulated model 712 of FIG. 36 may be transformed to locations on the simulated model 610. FIG. 37 is a display representation 720 illustrating the second plurality of indications at their transformed locations on the simulated model 610. The second plurality of indications may then be visually represented with the first plurality of indications to view trends in indications across the substantially symmetrical first and second parts of the asset. To that end, FIG. 38 is a display representation 730 of the first and second plurality of indications on the simulated model 610.

Although not illustrated, one having ordinary skill in the art will appreciate that the location of one indication may be transformed from a second part of an asset to a first part of an asset substantially symmetrical with the second part. Thus, although Example 5 is disclosed with regard to a first and second plurality of indications, it will be appreciated that at least one indication for either of the first and second parts may be transformed without departing from the scope of the invention. Moreover, one having ordinary skill in the art will appreciate that indications may be shown on simulated models associated with either the first or second substantially similar part consistent without departing from the scope of the invention.

Example 6

Figure 39:
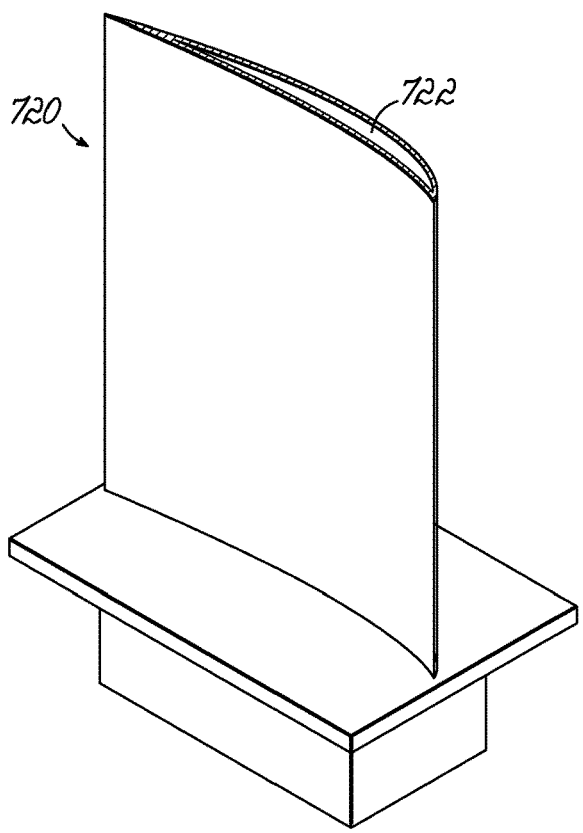
FIG. 39 is a diagrammatic illustration of at least a portion of a fan blade of a jet engine.

In some embodiments, it may be advantageous to align a first dataset of NDE data with a second dataset of NDE data to determine the location of an indication of a potential problem with either the first or second datasets of NDE data. By way of example, FIG. 39 is a diagrammatic illustration of at least a portion of a fan blade 720 of a jet engine. In some configurations, at least a portion of the fan blade 720 is hollow as indicated at void 722. Inasmuch as the fan blade 720 is configured to withstand harsh conditions during its use, imperfections in the fan blade 720 may be intolerable. As such, after fabrication of a fan blade 720, it may be desirable to inspect the fan blade 720. Thus, the fan blade 720 may be inspected by various NDE data collection devices.

Figure 40:
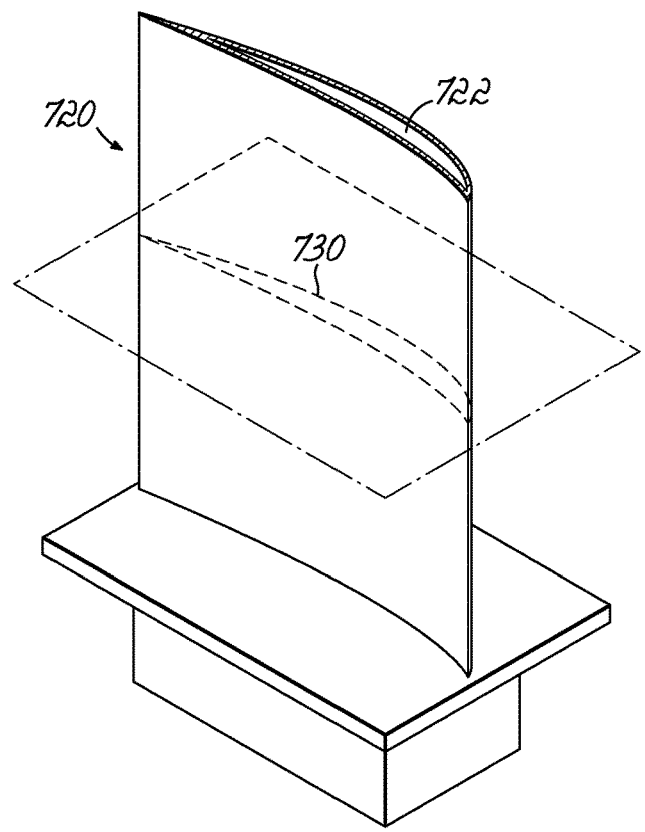
FIG. 40 is a diagrammatic illustration of the fan blade of FIG. 39 and the location of a CT slice taken through the fan blade consistent with embodiments of the invention.
Figure 41:
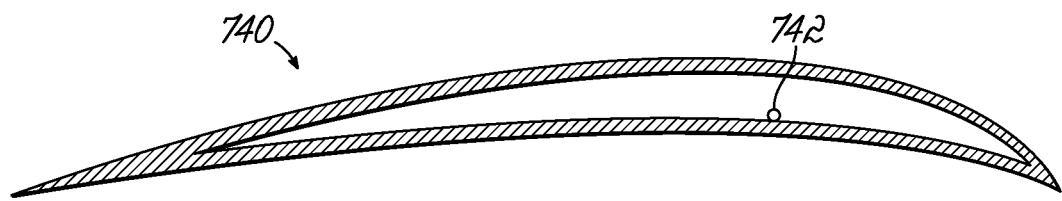
FIG. 41 is a display representation of at least a portion of a dataset of NDE data associated with the CT slice of FIG. 40.

In some embodiments, the fan blade 720 may be inspected through computed tomography ("CT") to produce a plurality of slices of the blade that indicate the external and internal characteristics of that fan blade at that slice. By way of example, FIG. 40 is a diagrammatic illustration of the fan blade 720 and the location of a CT slice as at 730 taken through the fan blade 720. FIG. 41 is a display representation of at least a portion of a dataset of NDE data 740 associated with the CT slice 730. As illustrated in FIG. 41, the NDE data 740 may be associated with at least one indication 742 of a potential problem. In particular, and as illustrated, the indication 742 may be internal to the fan blade 720 and, for example, may be an accumulation of material on the inner surface of the fan blade 720.

Figure 42:
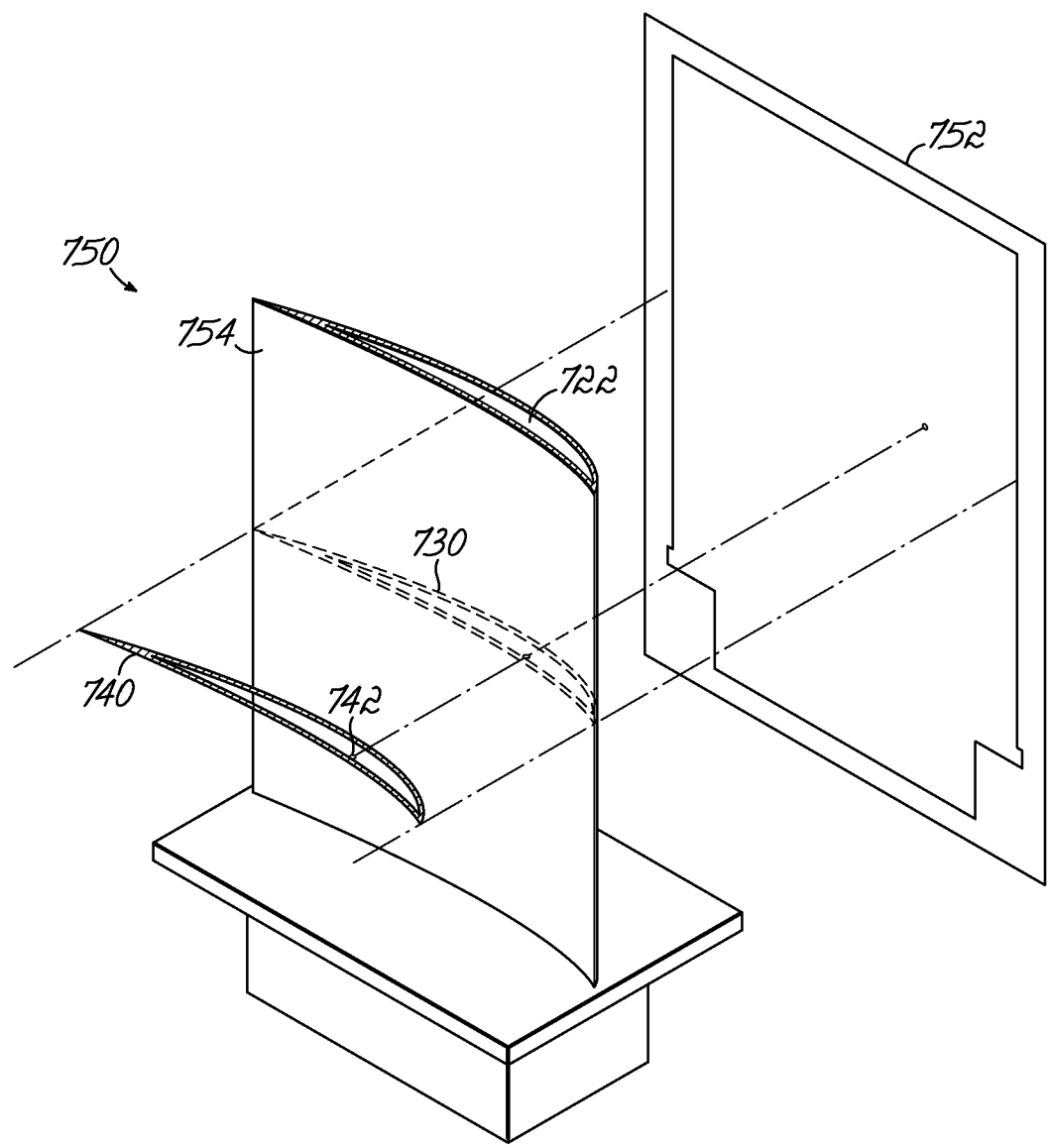
FIG. 42 is a diagrammatic illustration of a projection of the NDE data of FIG. 41 through a second dataset of NDE data associated with the fan blade of FIG. 39 and a three-dimensional simulated model of the fan blade of FIG. 39.
Figure 43A:
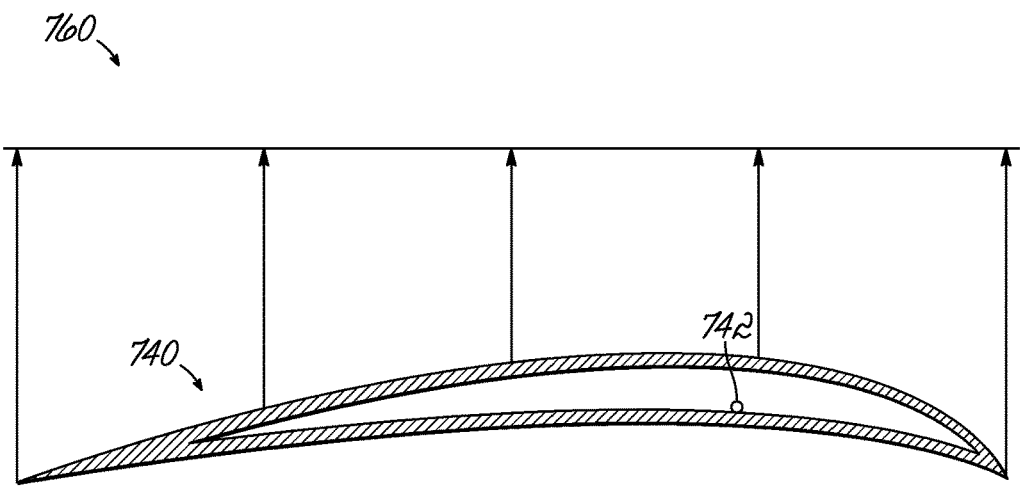
FIG. 43A and FIG. 43B are respective projections of the NDE data of FIG. 41 through the second dataset of NDE data and/or the simulated model of FIG. 42.
Figure 43B:
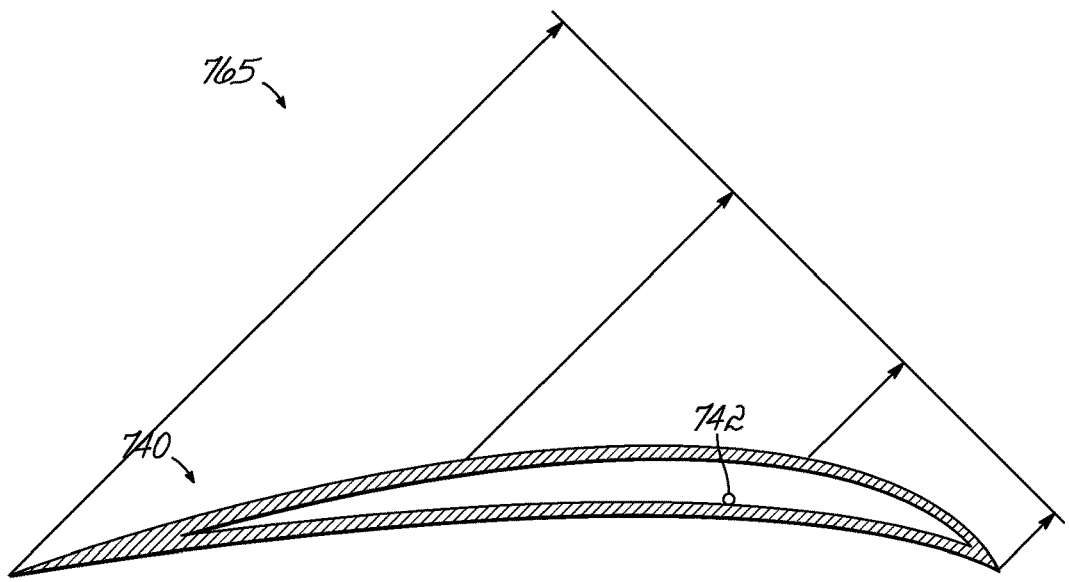

After capturing the NDE data 740, it may be advantageous to align the NDE data 740 (e.g., first NDE data 740) with additional NDE data (e.g., second NDE data) and/or a simulated model associated with the fan blade 720. Specifically, it may be desirable to associate the first NDE data 740 with the second NDE data and determine the location of the indication 742 on both. To associate the datasets of NDE data, a plurality of projections of the first NDE data 740 through the second NDE data may be generated. By way of example, FIG. 42 is a diagrammatic illustration 750 of a projection of the first NDE data 740 through second NDE data of the fan blade 752 (e.g., an x-ray of the fan blade 720 face-on) and a three-dimensional simulated model of the fan blade 754 while FIG. 43A and FIG. 43B are respective projections 760 and 765 of the first NDE data 740 through the second NDE data 752 illustrating various manners in which the first NDE data 740 may be projected through the second NDE data 752 and/or simulated model 754. A projection of the first NDE data 740 that results in an acceptable alignment on the second NDE data 752 and/or simulated model 754 may be chosen. In this manner, the location of the indication 742 on the second NDE data 752 and/or the simulated model 754 may be determined. It will be appreciated that FIGS. 39-42 and FIGS. 43A and 43B are merely exemplary to illustrate the process to align first NDE data to second NDE data and/or a simulated model associated with both the first and second NDE data. Thus, it will be appreciated that FIGS. 39-42 and FIGS. 43A and 43B may or may not be displayed consistent with embodiments of the invention, and as such the FIGS. 39-42 and FIGS. 43A and 43B are merely illustrated of the Applicant's broader inventive concept.

Example 7

Figure 44:
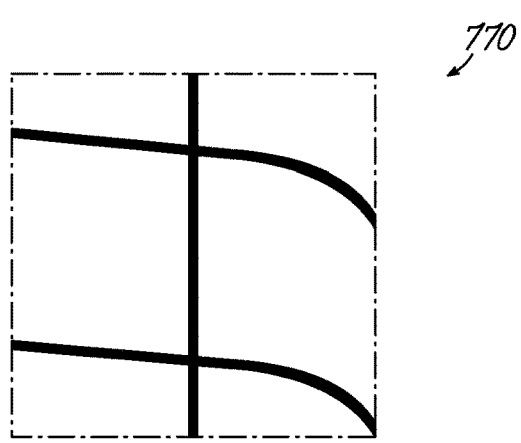
FIG. 44 is a display representation of at least a portion of a dataset of distorted NDE data consistent with embodiments of the invention.
Figure 45:
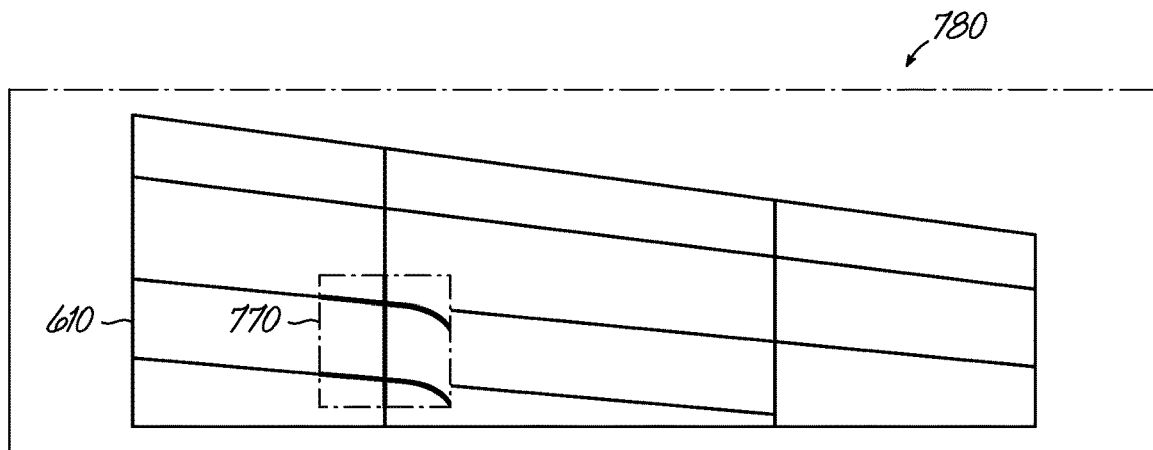
FIG. 45 is a display representation of the distorted NDE data of FIG. 44 aligned with and on the simulated model of FIG. 27.
Figure 46:
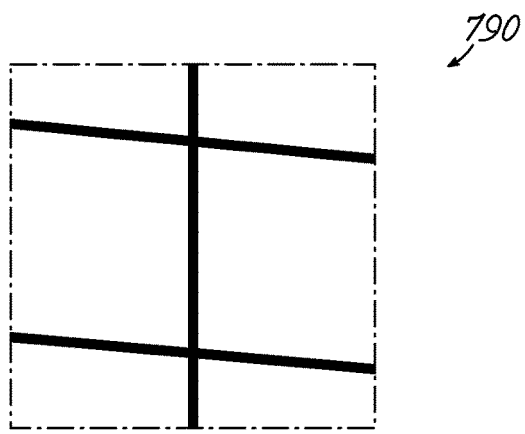
FIG. 46 is a display representation of the distorted NDE data of FIG. 44 after at least a portion thereof has been adjusted consistent with embodiments of the invention.
Figure 47:
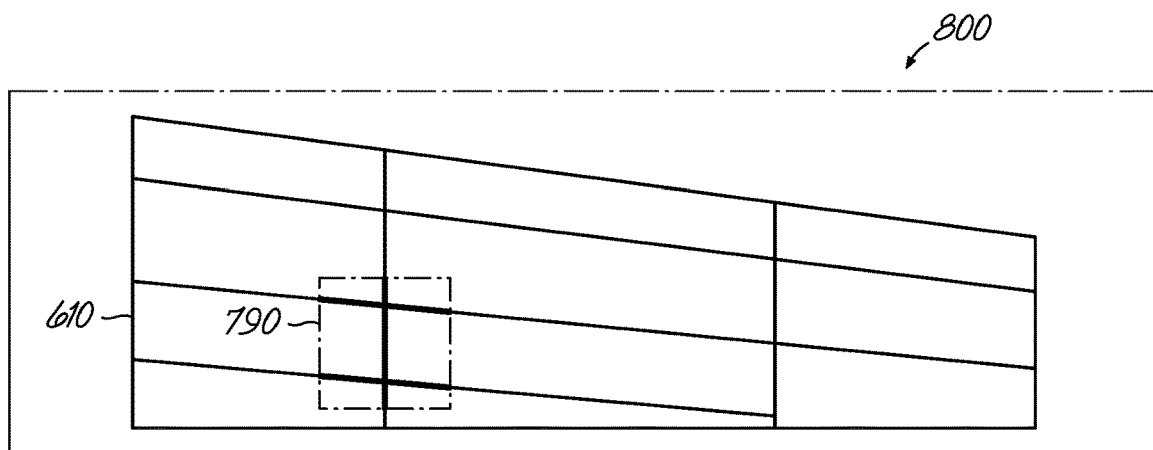
FIG. 47 is a display representation of the adjusted NDE data of FIG. 46 aligned with and on the simulated model of FIG. 27.

In some embodiments, it may be advantageous to distort at least a portion of captured NDE data. By way of example, FIG. 44 is a display representation of NDE data 770, and FIG. 45 is a display representation 780 the aligned NDE data 770 of FIG. 45 aligned with a simulated model 610 consistent with embodiments of the invention. However, it may be determined that the aligned NDE data 770 does not completely align with the simulated model 610. As such, and consistent with embodiments of the invention, at least a portion of the NDE data 770 may be determined to be locally distorted. As such, the local distortion may be analyzed to determine whether can be adjusted with a non-rigid alignment algorithm and/or a local deformation algorithm. The local distortion may then be adjusted. FIG. 46 is a display representation of NDE data that has had at least a portion adjust to account for local distortion 790 (e.g., "adjusted" NDE data 790). Specifically, FIG. 46 illustrates the NDE data 770 of FIG. 45 after it the local distortion thereof has been adjusted. It will be appreciated that the adjusted NDE data 790 may be re-aligned with the simulated model 610. FIG. 47 is a display representation 800 of the adjusted NDE data 790 aligned with the simulated model 610 consistent with embodiments of the invention.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, one having skill in the art will appreciate that multiple filters may be used without departing from the scope of the invention. Moreover, one having skill in the art will appreciate that a plurality of datasets of NDE data from a plurality of portions of a plurality of assets over a plurality of sessions may be filtered as well as searched without departing from the scope of the invention, and thus embodiments of the invention should not be limited to the filtering and searching examples disclosed herein.

Additionally, and regarding highlighting a lapse in coverage, one having ordinary skill will appreciate that the lapse in coverage may be alternatively indicated other than adjusting a color component of a display representation. For example, the lapse in coverage may indicated by circling or otherwise drawing a line around the boundary of an area of a display representation associated with missing coverage, applying a texture or pattern to an area of a display representation associated with missing coverage, or other manners in highlighting an area of a display representation associated with missing coverage. Moreover, and regarding determining missing coverage, one having ordinary skill will appreciate that "coverage" may refer to selective coverage or one or more portions of an asset. It may be advantageous to merely determine if specific parts of a portion of an asset are covered. Thus, "coverage" may refer to whether specific parts of a portion of an asset are associated with NDE data. For example, it may be advantageous to determine if specific fasteners associated with a wing of an airplane are each associated with NDE data. As such, "coverage" of the fasteners may include datasets of NDE data associated the fasteners and their immediate surroundings, but otherwise fail to include portions of the wing that are not salient to the coverage analysis. Thus, one having skill in the art will appreciate that determining coverage of a simulated model may include determining coverage of one or more distinct portions of the simulated model while ignoring other portions of the simulated model.

Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of managing non-destructive evaluation (NDE) data in a system of the type that includes at least one processing unit and a memory, the method comprising:
   retrieving a plurality of datasets of NDE data for at least a portion of one or more assets of a particular type of asset, wherein the one or more assets comprises a physical object from which the plurality of datasets of NDE data is collected during non-destructive evaluation of the one or more assets;
   the plurality of datasets containing inspection information for the asset wherein the inspection information of a dataset includes information that is generated by an inspection tool and has data indicative of a potential problem at a location in the NDE data of the dataset;
   selecting a corresponding plurality of data structures for alignment of the plurality of datasets of NDE data to an independent simulated model of the at least a portion of an asset of the particular type of asset and using the plurality of data structures for aligning the plurality of datasets to a location on the independent simulated model, the model being a previously existing computer depiction of a geometrical representation of the physical object of the particular type of asset, the simulated model further being independently generated with respect to the NDE data of the plurality of datasets using at least one of golden NDE data or data from a CAD/CADD program;
   processing the plurality of datasets of NDE data to determine one or more potential problems and corresponding locations of the one or more potential problems on the independent simulated model;
   using the at least one processing unit, overlaying the one or more potential problems on the independent simulated model.

2. The method of claim 1, wherein at least one of the plurality of datasets of NDE data is retrieved in response to a request from a user to retrieve a dataset of NDE data.

3. The method of claim 1, further comprising:
   retrieving the independent simulated model; and
   generating a display representation that visually represents the retrieved plurality of datasets of NDE data aligned on the geometrical representation of the independent simulated model.

4. The method of claim 1, further comprising:
   retrieving an indication of a potential problem associated with the plurality of datasets of NDE data; and
   retrieving a determined location for the indication of the potential problem on the independent simulated model.

5. The method of claim 1, further comprising:
   retrieving a first dataset of NDE data for at least a portion of a first asset of a particular type of asset and first inspection information associated with the first dataset for the at least a portion of a first asset, wherein the first inspection information includes at least one of data that is usable to align the first dataset of NDE data, data that indicates a potential problem with the at least a portion of the first asset, or data about the at least a portion of the first asset;
   retrieving a second dataset of NDE data for at least a portion of a second asset of the same particular type of asset and second inspection information associated with the second dataset for the at least a portion of a second asset, wherein the second inspection information includes at least one of data that is usable to align the second dataset of NDE data, data that indicates a potential problem with the at least a portion of the second asset, or data about the at least a portion of the second asset; and
   using the at least one processing unit, determining a trend that is reflective of repeated indications of the one or more potential problems on the independent simulated model of a portion of the particular type of asset across the multiple assets;
   wherein determining the trend that is reflective of repeated indications of a potential problem in a portion of the particular type of asset is based at least in part on the first inspection information and the second inspection information.

6. The method of claim 1, further comprising:
   retrieving inspection information associated with the at least a portion of the one or more assets, wherein the inspection information includes at least one of data that is usable to align the first dataset of NDE data, data that indicates a potential problem with the at least a portion of the first asset, or data about the at least a portion of the first asset.

7. The method of claim 4, further comprising exporting information associated with the retrieved indication.

8. The method of claim 5, wherein the trend that is reflective of repeated indications of a potential problem in a portion of the particular type of asset is a population-wide trend for the particular type of asset.

9. The method of claim 5, wherein the trend that is reflective of repeated indications of a potential problem in a portion of the particular type of asset is a population-wide trend for the particular type of asset.

10. A method of managing non-destructive evaluation (NDE) data for manufacturing and/or maintenance purposes, the method comprising:
    retrieving, by at least one processor, a plurality of datasets of NDE data for at least a portion of one or more assets of a particular type of asset in a population of assets, the plurality of datasets of NDE data having previously been collected during non-destructive evaluation of the asset;
    the plurality of datasets containing inspection information for the asset wherein the inspection information of a dataset includes information that is generated by an inspection tool and has data indicative of a potential problem at a location in the NDE data of the dataset;
    selecting a corresponding plurality of data structures for alignment of the plurality of datasets of NDE data to an independent simulated model of at least a portion of an asset of the particular type of asset and using the plurality of data structures for aligning the plurality of datasets to a location on the independent simulated model, the simulated model being independently generated with respect to the NDE data of the plurality of datasets using at least one of golden NDE data or data from a CAD/CADD program;
    processing the plurality of datasets of NDE data to determine one or more potential problems and corresponding locations of the one or more potential problems on the independent simulated model;
    overlaying, by the at least one processor, the one or more potential problems on the independent simulated model.

11. The method of claim 10, further comprising:
generating, on a display, a representation of the plurality of datasets of NDE data aligned to a geometrical representation of the independent simulated model.

12. The method of claim 10, further comprising:
aligning a first dataset of the plurality of datasets of NDE data to the independent simulated model with one selected data structure for alignment; and
aligning a second dataset of the plurality of datasets of NDE data to the independent simulated model with another different selected data structure for alignment.

13. A computer program product for use in manufacturing and/or maintenance comprising:
a non-transitory computer-readable storage medium; and
instructions stored on the non-transitory computer-readable storage medium that, when executed by at least one processor, cause the at least one processor to:
retrieve a plurality of datasets of NDE data for a portion of one or more assets of a particular type of asset, the plurality of datasets of NDE data containing inspection information that is generated by an inspection tool and has data indicative of a potential problem at a location in the NDE data of the one or more datasets;
select a corresponding plurality of data structures for alignment of the plurality of datasets of NDE data to an independent simulated model of at least a portion of an asset of the particular type of asset and use the plurality of data structures for aligning the plurality of datasets to a location on the independent simulated model, that is a previously existing computer depiction of a geometrical representation of the physical object of the particular type of asset, wherein the first dataset of NDE data is collected during non-destructive evaluation of the first asset;
the simulated model being independently generated with respect to the NDE data of the plurality of datasets using at least one of golden NDE data or data from a CAD/CADD program;
process the plurality of datasets of NDE data to determine one or more potential problems and corresponding locations of the one or more potential problems on the independent simulated model;
overlay the one or more potential problems on the independent simulated model.

14. The computer program product of claim 13, wherein the instructions, when executed by the at least one processor, further cause the at least one processor to:
generate, on a display, a representation of the plurality of datasets of NDE data aligned to a geometrical representation of the independent simulated model.

15. The computer program product of claim 13, wherein the instructions, when executed by the at least one processor, further cause the at least one processor to:
retrieve a first dataset of NDE data for at least a portion of a first asset of a particular type of asset and first inspection information associated with the first dataset for the at least a portion of the first asset, wherein the first inspection information includes at least one of data that is usable to align the first dataset of NDE data, data that indicates a potential problem with the at least a portion of the first asset, or data about the at least a portion of the first asset;
retrieve a second dataset of NDE data for at least a portion of a second asset of the same particular type of asset and a second inspection information associated with a dataset for the at least a portion of a second asset, wherein the second inspection information includes at least one of data that is usable to align the second dataset of NDE data, data that indicates a potential problem with the at least a portion of the second asset, or data about the at least a portion of the second asset; and
determine a trend that is reflective of repeated indications of the one or more potential problems on the independent simulated model of a portion of the particular type of asset across the multiple assets;
wherein determining the trend is based at least in part on the first inspection information and the second inspection information.

16. The computer program product of claim 13, wherein the instructions, when executed by the at least one processor, further cause the at least one processor to:
retrieve a dataset of NDE data for a portion of a first asset of a particular type of asset and inspection information associated with the portion of the first asset, wherein the inspection information includes at least one of data that is usable to align the dataset of NDE data, data that indicates a potential problem with the portion of the first asset, or data about the portion of the first asset.

* * * * *